(12) United States Patent
Adler et al.

(10) Patent No.: US 10,161,093 B2
(45) Date of Patent: Dec. 25, 2018

(54) METHOD AND SYSTEM FOR A RETRACTABLE FLOODWALL SYSTEM

(71) Applicant: RSA PROTECTIVE TECHNOLOGIES, LLC, Claremont, CA (US)

(72) Inventors: Richard S. Adler, Claremont, CA (US); Risto Salo, Valencia, CA (US); Diego Porqueras, San Dimas, CA (US)

(73) Assignee: RSA Protective Technologies, LLC, Claremont, CA (US)

( * ) Notice: Subject to any disclaimer, the term of this patent is extended or adjusted under 35 U.S.C. 154(b) by 14 days.

(21) Appl. No.: 15/621,800

(22) Filed: Jun. 13, 2017

(65) Prior Publication Data
US 2017/0356149 A1    Dec. 14, 2017

Related U.S. Application Data

(60) Provisional application No. 62/392,895, filed on Jun. 13, 2016, provisional application No. 62/493,078, (Continued)

(51) Int. Cl.
*E02B 7/26* (2006.01)
*E02B 7/28* (2006.01)
(Continued)

(52) U.S. Cl.
CPC ............... *E02B 3/102* (2013.01); *E02B 7/26* (2013.01); *E02B 7/36* (2013.01)

(58) Field of Classification Search
CPC ... E02B 7/20; E02B 3/102; E02B 7/26; E02B 3/106; E02B 5/082; E02B 7/42;
(Continued)

(56) References Cited

U.S. PATENT DOCUMENTS

| 1,163 | A | * | 6/1839 | Lake | ........................ E02B 7/36 |
| | | | | | 405/106 |
| 944,210 | A | * | 12/1909 | Rhodes | ................... E04H 17/00 |
| | | | | | 49/10 |

(Continued)

FOREIGN PATENT DOCUMENTS

| EP | 0 684 342 A2 | 11/1995 |
| EP | 1 586 707 A2 | 10/2005 |

(Continued)

OTHER PUBLICATIONS

International Search Report and Written Opinion issued (dated Oct. 18, 2017) in corresponding International Application No. PCT/US2017/037305.

(Continued)

*Primary Examiner* — Benjamin F Fiorello
*Assistant Examiner* — Edwin J Toledo-Duran
(74) *Attorney, Agent, or Firm* — Haug Partners LLP

(57) ABSTRACT

The present invention relates to a retractable floodwall unit that comprises a foundation unit having a plurality of guide tracks along side walls of the foundation unit, a floodwall panel stowed in the foundation unit; and a power system for raising and lowering the floodwall panel. The foundation unit includes a first housing unit enclosing an actuator of the power system, and the floodwall panel includes a plurality of guides that mate with the guide tracks of the foundation unit.

34 Claims, 44 Drawing Sheets

Related U.S. Application Data filed on Jun. 21, 2016, provisional application No. 62/493,779, filed on Jul. 18, 2016, provisional application No. 62/495,404, filed on Sep. 12, 2016, provisional application No. 62/495,990, filed on Sep. 29, 2016, provisional application No. 62/496,324, filed on Oct. 13, 2016, provisional application No. 62/496,500, filed on Oct. 18, 2016, provisional application No. 62/600,771, filed on Feb. 28, 2017, provisional application No. 62/601,648, filed on Mar. 27, 2017, provisional application No. 62/602,718, filed on May 3, 2017, provisional application No. 62/603,159, filed on May 17, 2017.

(51) Int. Cl.
  *E02B 7/50* (2006.01)
  *E02B 8/00* (2006.01)
  *E02B 3/10* (2006.01)
  *E02B 7/36* (2006.01)

(58) Field of Classification Search
  CPC . E02B 9/027; E02B 3/104; E02B 7/28; E02B 7/36; E02B 7/50; E02B 8/00; E04H 9/145
  USPC ....... 405/71, 80–87, 90–92, 94, 95, 99, 100, 405/103–106; 49/10–12, 386
  See application file for complete search history.

(56) References Cited

U.S. PATENT DOCUMENTS

| | | | | |
|---|---|---|---|---|
| 1,841,747 A | * | 1/1932 | Lun | E02B 7/44 405/102 |
| 1,938,675 A | * | 12/1933 | Young | E02B 7/46 405/101 |
| 2,108,065 A | * | 2/1938 | Kotrbaty | E04B 1/24 52/11 |
| 2,192,510 A | * | 3/1940 | Smith | E02B 7/36 405/101 |
| 2,229,629 A | * | 1/1941 | Anderson | E02B 7/26 405/104 |
| 2,322,846 A | * | 6/1943 | Growdon | E02B 7/42 405/100 |
| 2,434,457 A | * | 1/1948 | Cruikshank | E02B 7/20 405/107 |
| 2,485,755 A | * | 10/1949 | Loosli | E02B 13/00 405/106 |
| 2,617,263 A | * | 11/1952 | Hill | E02B 7/42 405/100 |
| 3,290,888 A | * | 12/1966 | Palmer | E02B 7/26 405/105 |
| 3,807,120 A | * | 4/1974 | Viandon | E04G 1/22 182/178.5 |
| 4,114,381 A | * | 9/1978 | Lundh | E02B 7/205 405/101 |
| 4,133,074 A | * | 1/1979 | Schack | E05F 1/123 109/64 |
| 4,455,106 A | * | 6/1984 | Johnson | E02B 7/44 405/101 |
| 4,582,451 A | * | 4/1986 | Hollander, Jr. | E02L 37/54 251/328 |
| 4,657,434 A | * | 4/1987 | Woolnough | E02B 7/44 405/81 |
| 4,877,352 A | * | 10/1989 | Tuttle | E02B 7/20 405/104 |
| 4,921,373 A | * | 5/1990 | Coffey | E02B 3/108 256/13 |
| 5,178,490 A | * | 1/1993 | Snowberger | E02B 7/44 405/100 |
| 5,199,812 A | * | 4/1993 | McClellan | E02B 7/44 405/101 |
| 5,222,834 A | * | 6/1993 | Schultz | E02B 7/44 405/102 |
| 5,310,284 A | * | 5/1994 | Snowberger | E02B 7/44 405/102 |
| 5,433,555 A | * | 7/1995 | Parizot | E02B 7/16 405/100 |
| 5,460,462 A | * | 10/1995 | Regan | E02B 3/104 405/96 |
| 5,472,293 A | * | 12/1995 | Roller | E02B 8/045 405/87 |
| 5,592,702 A | * | 1/1997 | Gillebaard, Jr. | E04H 4/0056 4/506 |
| 5,647,693 A | * | 7/1997 | Carlinsky | B63B 35/44 405/229 |
| 5,709,502 A | * | 1/1998 | Obermeyer | B60C 15/02 405/114 |
| 5,713,699 A | * | 2/1998 | Obermeyer | E02B 7/005 405/115 |
| 5,725,326 A | * | 3/1998 | Van den Noort | E02B 3/104 405/104 |
| 5,758,989 A | * | 6/1998 | Snowberger | E02B 7/44 405/100 |
| 5,775,847 A | * | 7/1998 | Carlinsky | E02D 27/32 405/229 |
| 5,826,397 A | * | 10/1998 | Arnold | G09F 15/0068 52/646 |
| 5,904,446 A | * | 5/1999 | Carlinsky | B63B 35/44 405/229 |
| 6,042,301 A | * | 3/2000 | Sovran | E02B 7/22 405/112 |
| 6,338,594 B1 | * | 1/2002 | Adler | B82Y 10/00 405/104 |
| 6,347,487 B1 | * | 2/2002 | Davis | E04H 9/145 52/1 |
| 6,623,209 B1 | | 9/2003 | Waters, Jr. | |
| 6,840,711 B1 | * | 1/2005 | Martinez | E02B 3/106 405/107 |
| 7,658,572 B2 | * | 2/2010 | Miyao | E02B 7/205 405/104 |
| 7,815,397 B1 | * | 10/2010 | Dung | E02B 7/54 405/104 |
| 7,972,081 B2 | | 7/2011 | Linares | |
| 7,997,828 B2 | * | 8/2011 | Rijlaarsdam | E02B 3/102 256/13 |
| 8,500,365 B1 | | 8/2013 | Vecherin et al. | |
| 9,267,254 B2 | * | 2/2016 | Gujer | E02B 3/104 |
| 9,376,803 B1 | * | 6/2016 | Anderson, Jr. | E04B 1/70 |
| 9,458,588 B2 | * | 10/2016 | Waters, Jr. | E02B 3/102 |
| 9,670,633 B1 | * | 6/2017 | Thieding | E04H 9/145 |
| 9,903,081 B2 | * | 2/2018 | Yoshiki | E02B 3/104 |
| 2001/0006591 A1 | | 7/2001 | Nomura et al. | |
| 2003/0026658 A1 | * | 2/2003 | Wu | E02B 7/30 405/87 |
| 2003/0143027 A1 | * | 7/2003 | Obermeyer | E02B 3/102 405/115 |
| 2003/0156903 A1 | * | 8/2003 | Wiseman | E02B 3/106 405/115 |
| 2005/0262776 A1 | * | 12/2005 | Smushkovich | E04H 9/145 52/64 |
| 2006/0250258 A1 | * | 11/2006 | Anhamm | E02B 7/44 340/610 |
| 2007/0116522 A1 | * | 5/2007 | Boudreaux, Jr. | E02B 3/108 405/114 |
| 2007/0189854 A1 | * | 8/2007 | Forrest | E02B 3/102 405/107 |
| 2007/0237585 A1 | * | 10/2007 | Frantz | E02B 3/102 405/107 |
| 2009/0148237 A1 | * | 6/2009 | Linares | E02B 3/104 405/105 |
| 2009/0169302 A1 | * | 7/2009 | Alpern | E02B 3/104 405/33 |
| 2009/0169306 A1 | * | 7/2009 | Rijlaarsdam | E02B 3/102 405/114 |
| 2009/0220301 A1 | * | 9/2009 | Miyao | E02B 7/205 405/21 |
| 2011/0110722 A1 | | 5/2011 | van den Noort | |
| 2012/0148346 A1 | * | 6/2012 | Eftekharzadeh | E02B 3/104 405/92 |

(56) References Cited

U.S. PATENT DOCUMENTS

| | | | |
|---|---|---|---|
| 2012/0163916 A1 | 6/2012 | Waters, Jr. | |
| 2012/0163917 A1* | 6/2012 | Waters, Jr. | E02B 3/102 405/114 |
| 2012/0219360 A1* | 8/2012 | Morii | E02B 7/44 405/100 |
| 2012/0275863 A1* | 11/2012 | Goldwasser | E02B 7/28 405/103 |
| 2013/0209173 A1 | 8/2013 | Quek | |
| 2013/0314254 A1* | 11/2013 | Neff | E01F 13/06 340/907 |
| 2014/0140770 A1* | 5/2014 | Nakayasu | E02B 7/44 405/107 |
| 2014/0328628 A1* | 11/2014 | Nakayasu | E02B 7/44 405/26 |
| 2014/0369754 A1* | 12/2014 | Waters, Jr. | E02B 3/104 405/16 |
| 2015/0117952 A1* | 4/2015 | Gujer | E02B 3/104 405/96 |
| 2015/0337583 A1* | 11/2015 | Fukagawa | E02B 3/104 49/23 |
| 2016/0010298 A1* | 1/2016 | Waters, Jr. | E02B 3/102 405/96 |
| 2016/0097212 A1* | 4/2016 | Waters, Jr. | E05F 1/02 49/13 |
| 2016/0244927 A1* | 8/2016 | Adler | E02B 7/26 |
| 2016/0298335 A1* | 10/2016 | Anderson, Jr. | B01D 17/0214 |
| 2016/0369469 A1 | 12/2016 | Kelly | |
| 2017/0234001 A1* | 8/2017 | Anderson, Jr. | E04B 1/7076 405/92 |
| 2018/0128002 A1* | 5/2018 | Quek | E04H 9/145 |

FOREIGN PATENT DOCUMENTS

| | | |
|---|---|---|
| GB | 231 346 A | 4/1925 |
| GB | 2 371 584 | 7/2002 |
| JP | 60123611 | 7/1985 |
| JP | 2010-138668 | 6/2010 |
| WO | WO 00/01892 | 1/2000 |
| WO | WO 00/31347 | 6/2000 |

OTHER PUBLICATIONS

International Search Reportand Written Opinion issued (dated May 20, 2016) in corresponding International Application No. PCT/US2016/017879.

* cited by examiner

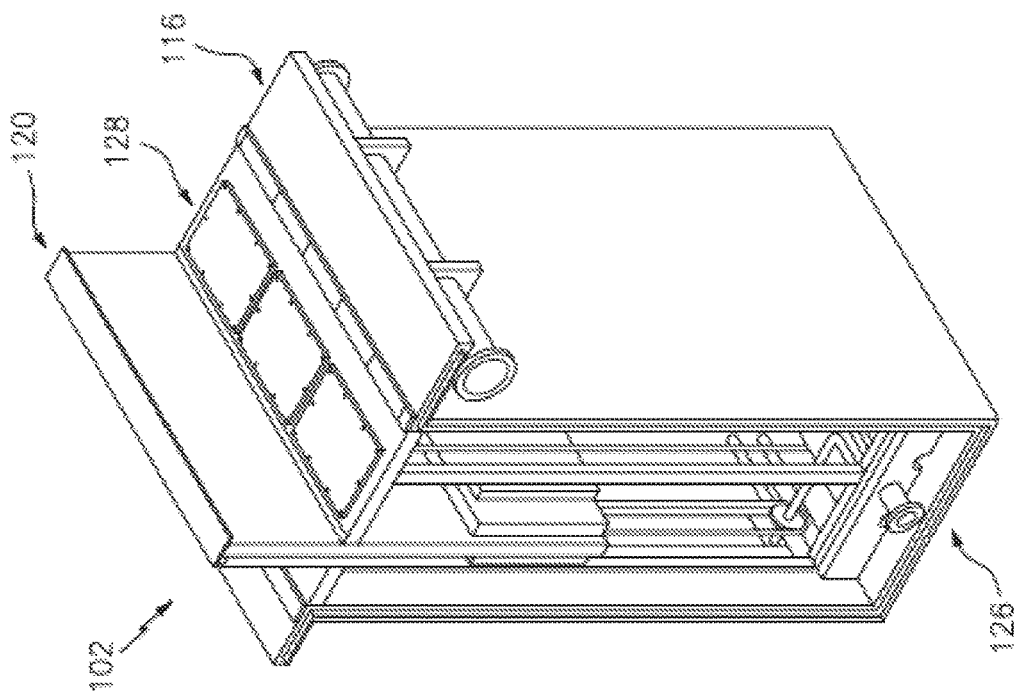
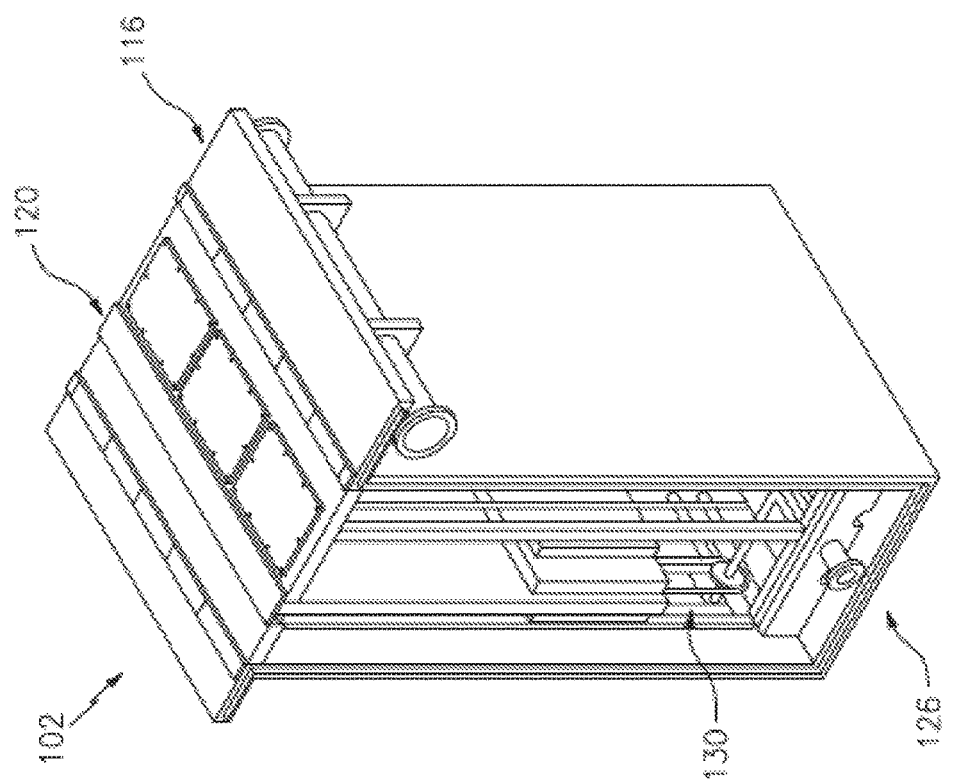

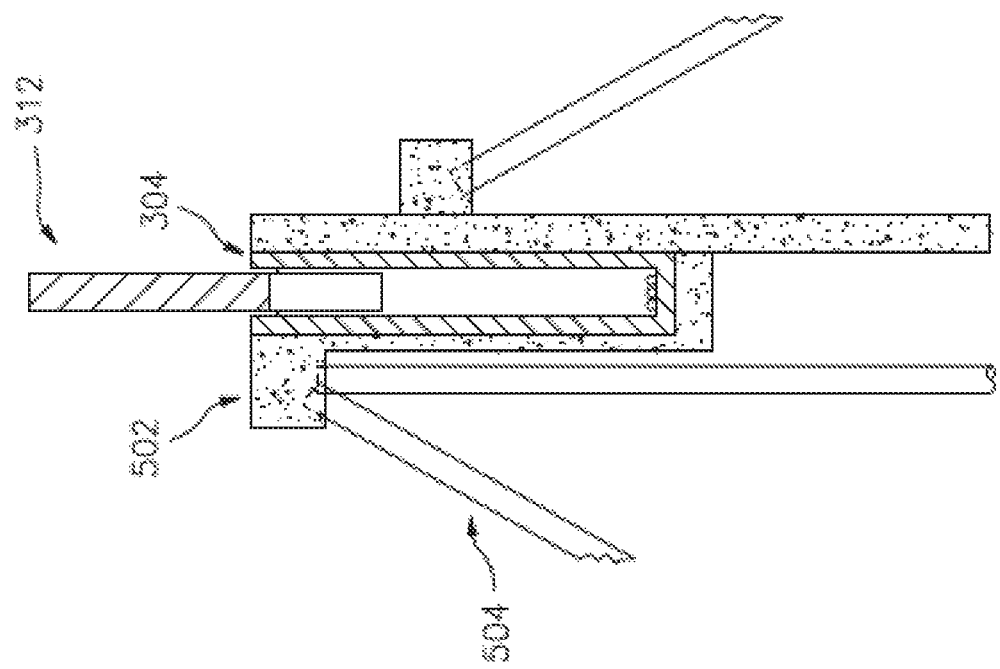
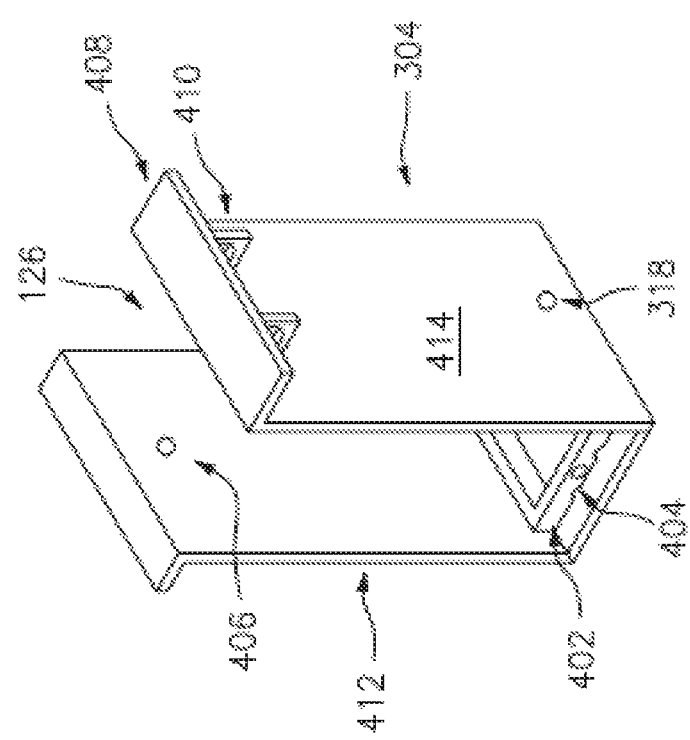

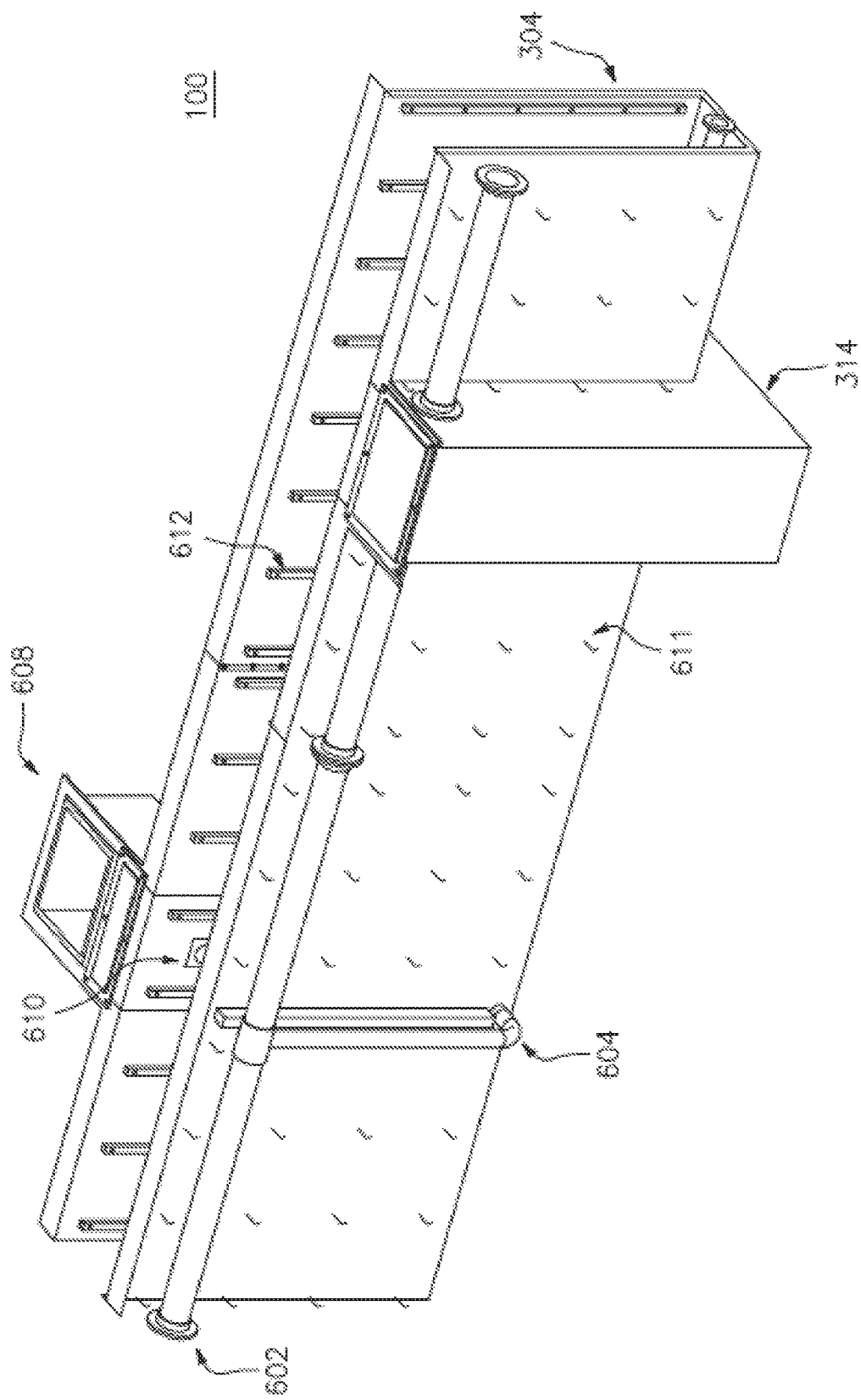

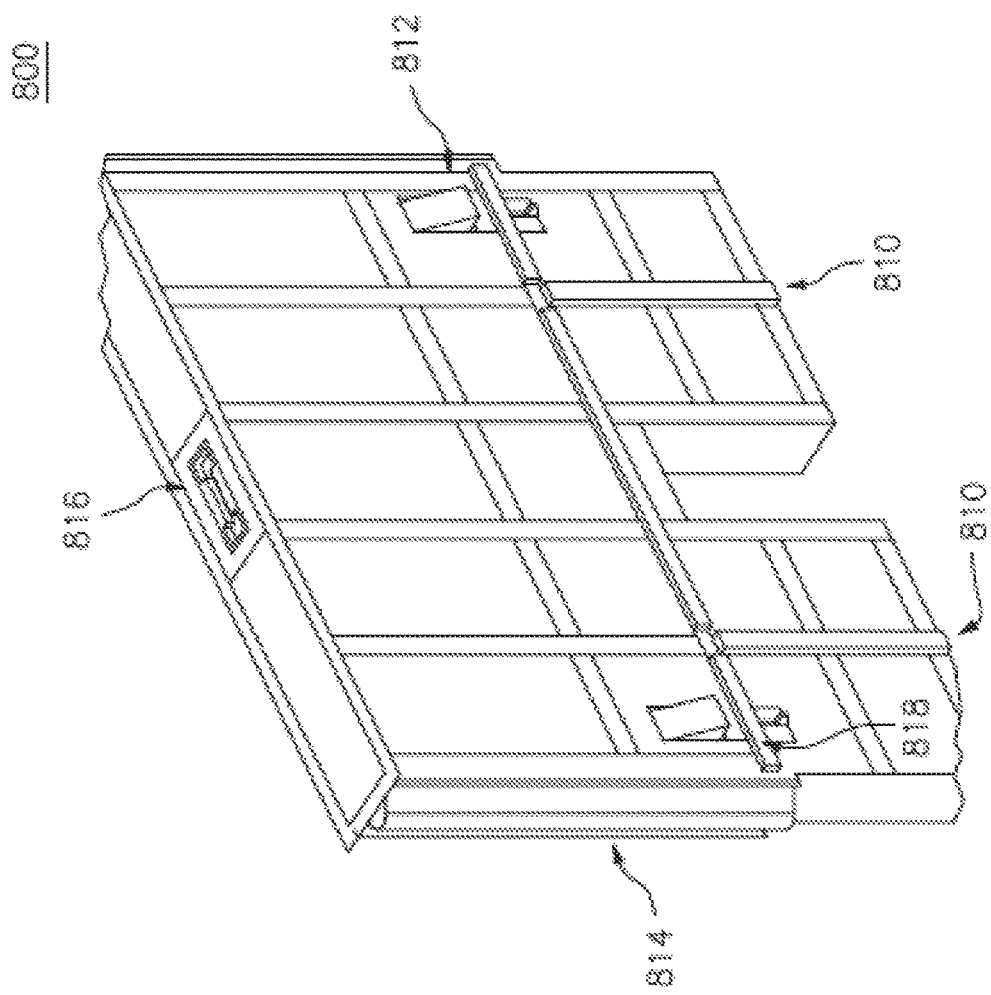
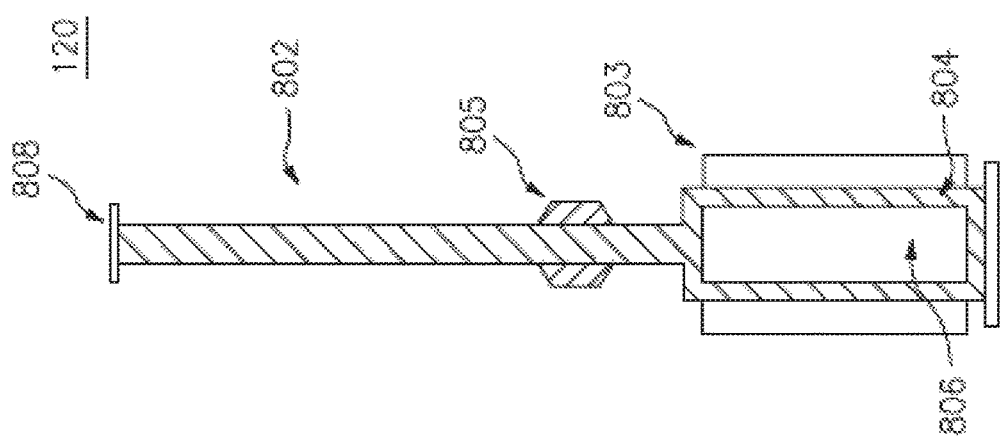

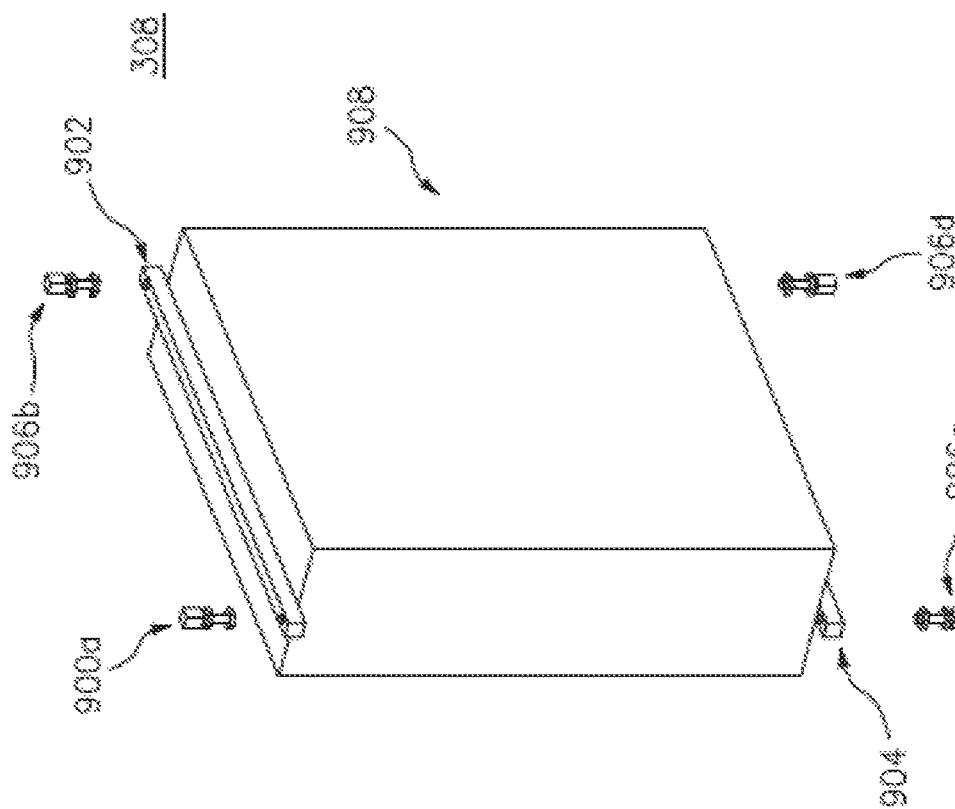
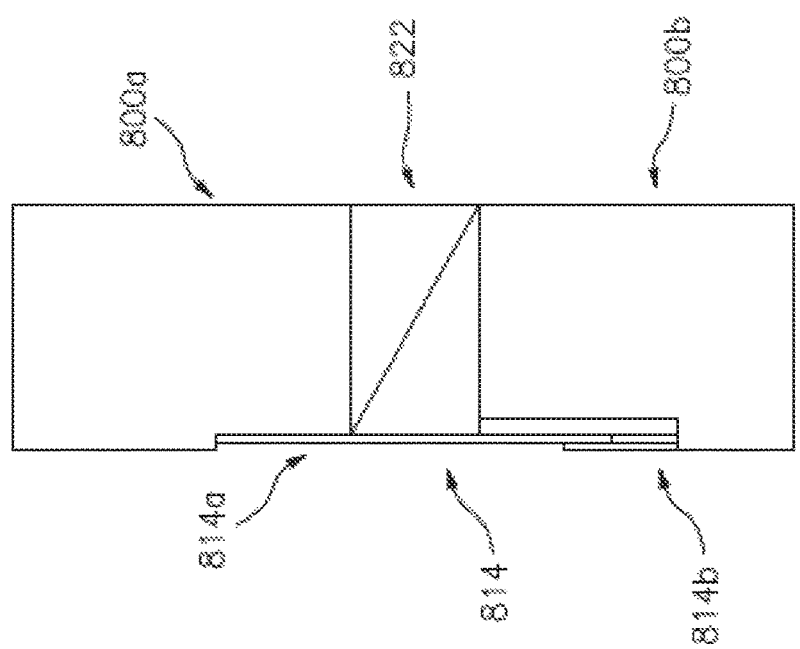

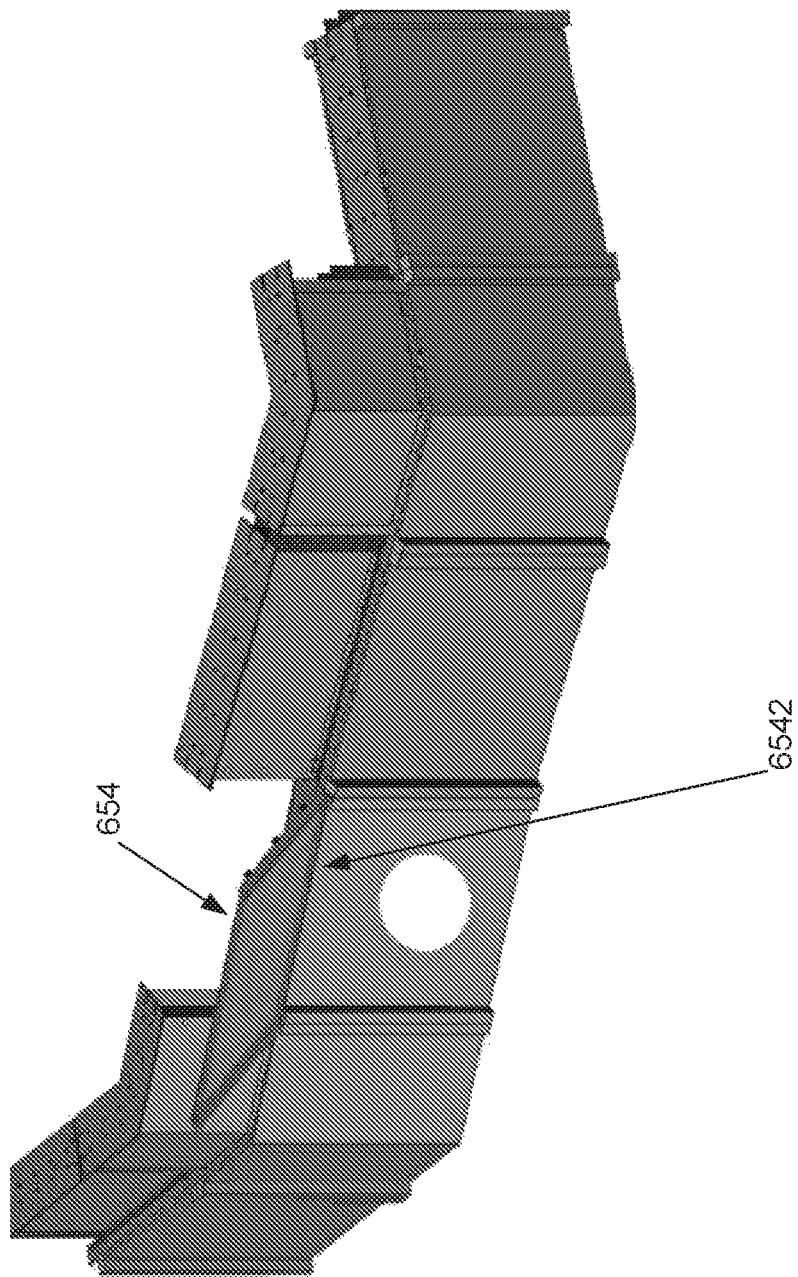

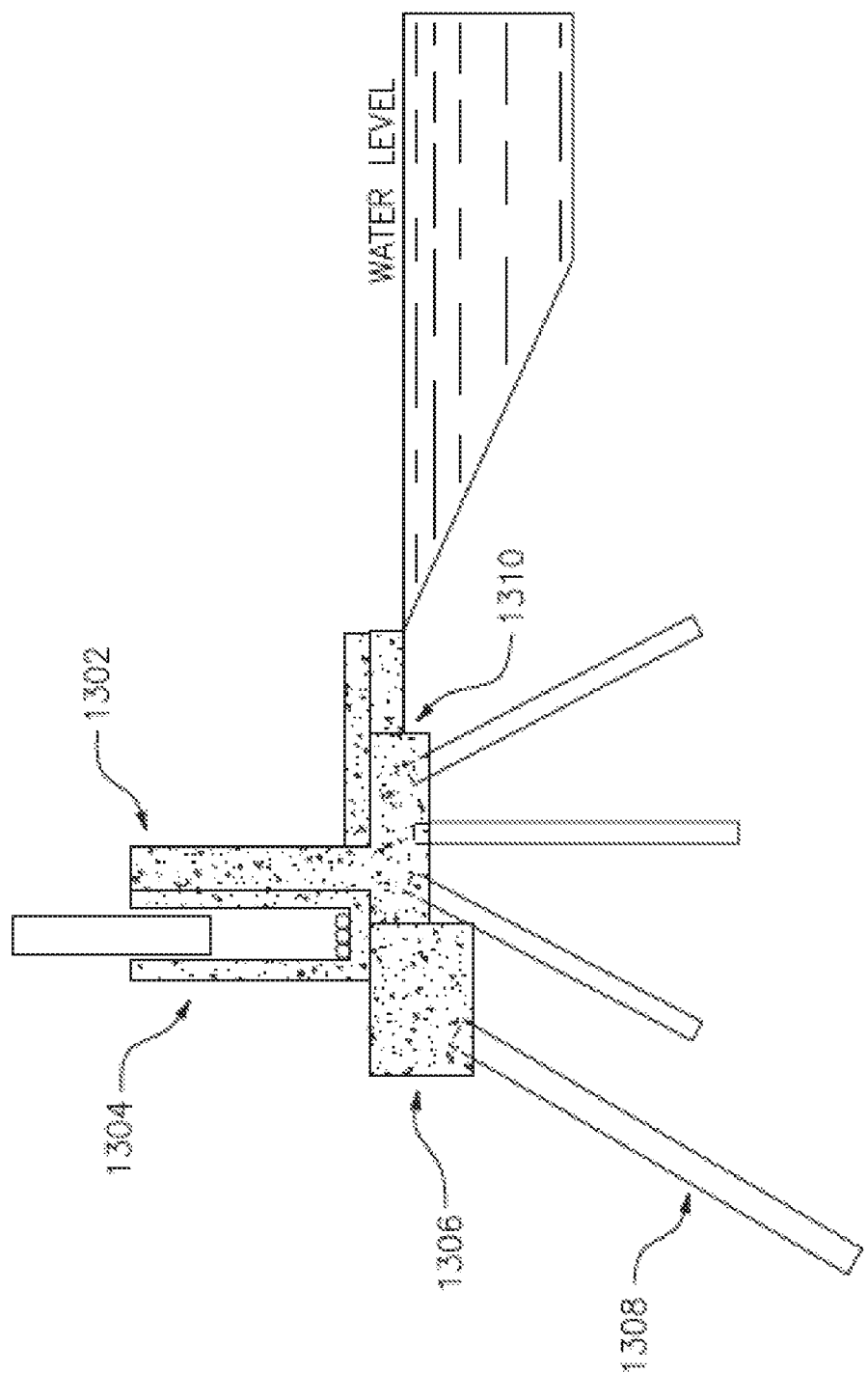

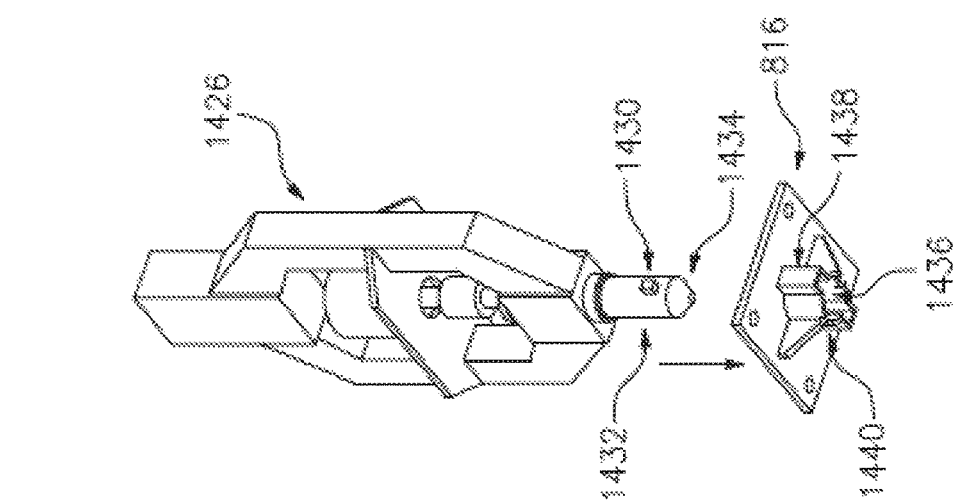
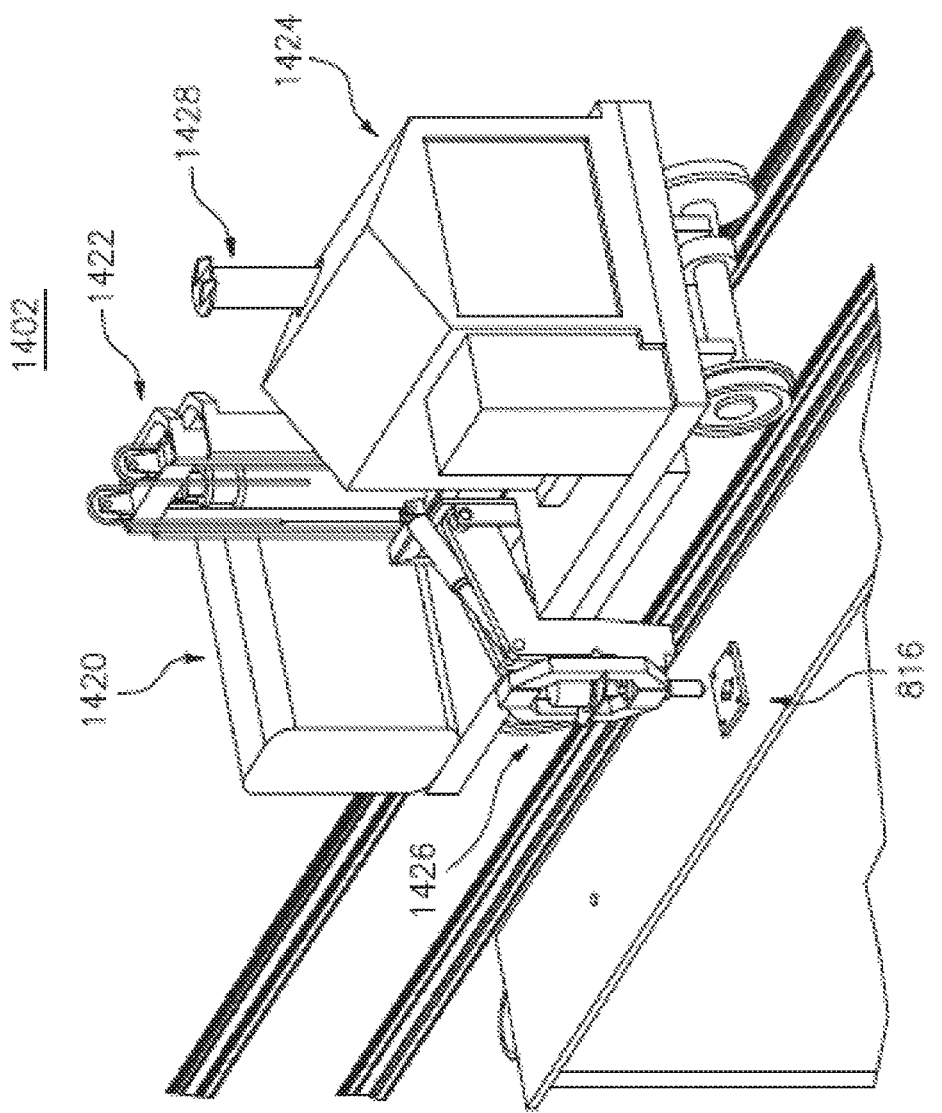
FIG. 14b
FIG. 14a

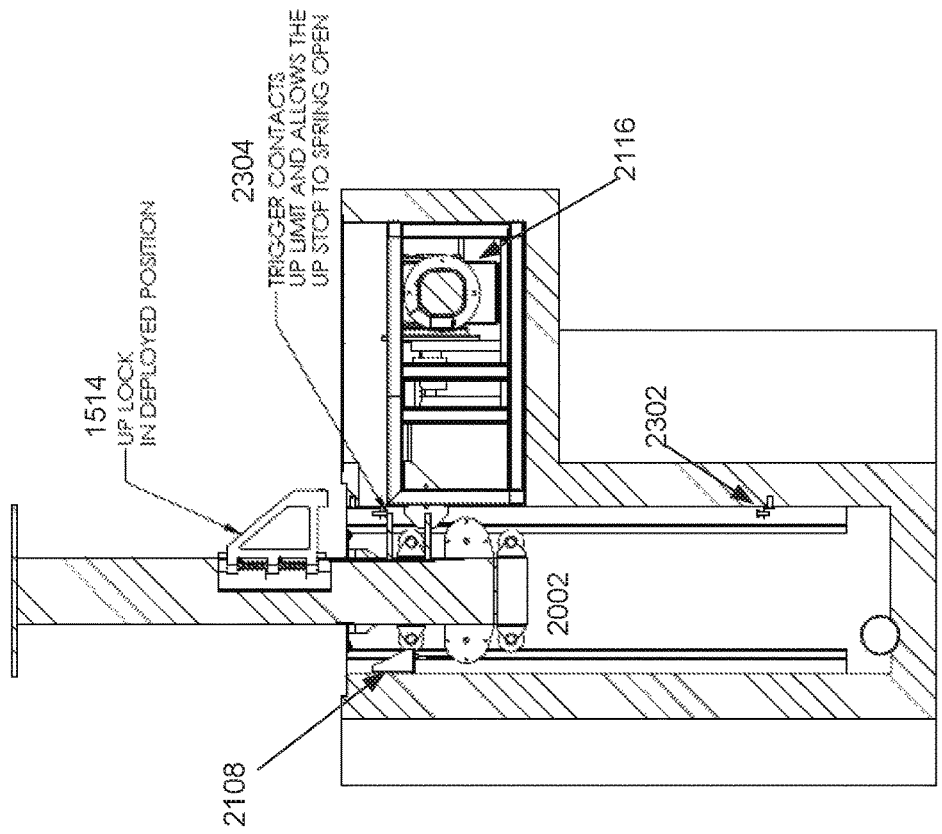
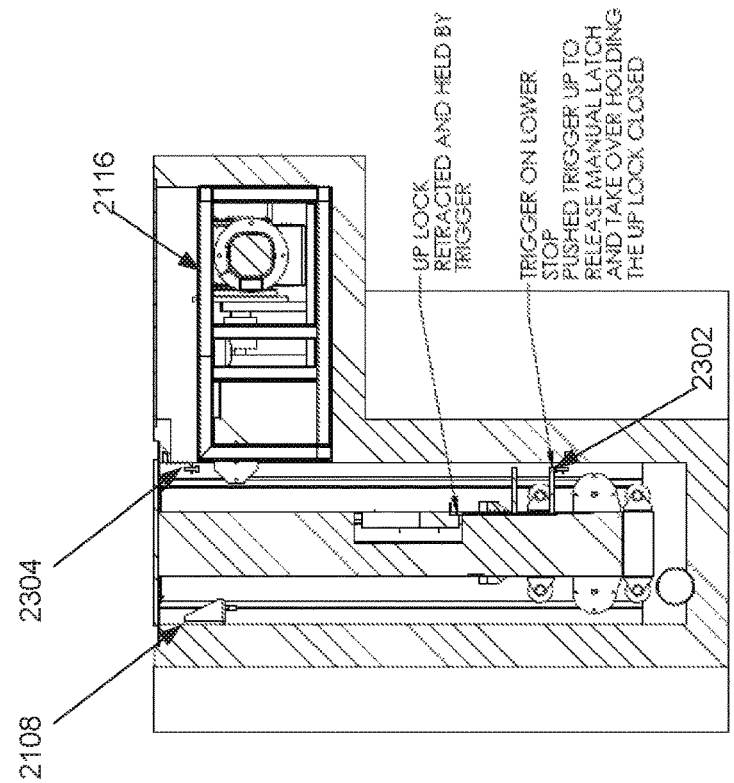

METHOD AND SYSTEM FOR A RETRACTABLE FLOODWALL SYSTEM

RELATED APPLICATIONS

The present application also claims benefits to Provisional Application No. 62/392,895 filed on Jun. 13, 2016, Provisional Application No. 62/493,078 filed on Jun. 21, 2016, Provisional Application No. 62/493,779 filed on Jul. 18, 2016, Provisional Application No. 62/495,404 filed on Sep. 12, 2016, Provisional Application No. 62/495,990 filed on Sep. 29, 2016, Provisional Application No. 62/496,324 filed on Oct. 13, 2016, Provisional Application No. 62/496,500 filed on Oct. 18, 2016, Provisional Application No. 62/600,771 filed on Feb. 28, 2017, Provisional Application No. 62/601,648 filed on Mar. 27, 2017, Provisional Application No. 62/602,718 filed on May 3, 2017, and Provisional Application No. 62/603,159 filed on May 17, 2017, the entireties of which are incorporated herein by reference.

FIELD OF THE INVENTION

The invention disclosed herein relates generally to a retractable floodwall system for flood prevention. Specifically, the retractable floodwall system includes counterbalanced and deployable floodwall panels that can be raised to a desired height in anticipation of a flooding event.

BACKGROUND

In general, conventional floodwalls represent permanent structures with fixed heights to protect buildings or lands from flood damage. Although these permanent structures are functional in providing the flood protection, they do not aesthetically blend well with adjacent environment and can negatively impact scenery. In addition, permanent floodwalls obstruct pedestrian and automobile traffic. Therefore, there is a need for a floodwall system that can be deployed quickly before a storm and can be displaced or concealed when no storm is imminent.

Flood plains, where regions surrounding rivers are often flooded, also require protections. An effective way to protect flood plains is to increase the height of the riverbanks or shoreline just prior to a flood event in order to contain the water inside the water channel or prevent a coastal breach of the shoreline. One way to accomplish this task is through temporary structures that are brought to the site and set up according to their design. Many of these available temporary systems rely on "passive means" to raise flood-preventing structures, such as the use of the flooding water itself to raise the flood barrier. But, a system relying on "passive means" does not offer an easy way to test the reliability of the operation because special equipment to deliver the water needed for the operation has to be taken to the site for testing. There is a need for a flood protection system whose operation can be easily tested.

SUMMARY

The retractable floodwall system as set forth in the present invention provides a solution to the need for an on-demand floodwall system with retractable floodwall panels. The floodwall panels are deployed when a flood threat is anticipated and concealed when the flood threat is gone. According to one embodiment, the floodwall panels are configured to be stored in a stowed position inside a housing unit that is part of the floodwall system when flood protection is not needed. In case of a flooding threat, the floodwall panels of the embodiment are raised to a desirable height by an actuating mechanism, for example, electric motors, hydraulic motors, buoyant force, or human power, to provide flood protection. The lower portion of the floodwall panel is configured as a cantilever being in contact with the housing unit, thus preventing the raised floodwall panel from wobbling due to the impact of floodwater and the debris. The floodwall system of the embodiment has counter-balance weights connected with the floodwall panels so that the required force to raise the floodwall panel is substantially reduced. According to another embodiment, the floodwall system has a plumbing system to fill the housing unit with water, either from the flood itself or from a potable water source, to create buoyant force to raise the floodwall panel and to drain the water after use. The floodwall system according to an embodiment includes a controller connected with the components of the system from a remote location, for example by radio signal. In this way, an operator is able to remotely control the actuating mechanism, valves, pumps, and sensors of the floodwall system.

According to an embodiment of the present invention, a retractable floodwall system comprises a floodwall panel installed in a housing unit. The floodwall panel is connected with a counter-balance weight, and an actuation mechanism to raise and lower the floodwall panel out from and into the housing unit. According to an aspect, the floodwall panel includes a buoyant hollow inner space located at a lower section of the floodwall panel. The hollow portion reduces the weight of the floodwall panel and increases its buoyancy. According to various aspects of the present invention, the buoyant lower portion of the floodwall panel includes a plurality of guides. The floodwall panel includes a solid upper section. The floodwall panel may also include a plurality of support legs to maintain the floodwall panel when it is raised from the housing unit. The floodwall panel may also include a latch mechanism.

According to other aspects, the retractable floodwall system includes an actuation mechanism installed to lift and lower the floodwall panel. The actuation mechanism may be an electric motor or a hydraulic motor which works together with a counter-balance weight so only a small powered motor is required to raise or lower the panels. The retractable floodwall system may also include a plumbing system that delivers a fluid into the housing unit. According to this aspect, buoyant force is used to raise and lower the floodwall panel. The retractable floodwall system may also include a floodwater inlet that allows floodwater to enter the housing unit. The flood water inlet may be configured so that the floodwall panel is raised when flood water reaches a predetermined height without the need for human intervention. The retractable floodwall system may also include an exit segment having an underground post with a plurality of openings for utility lines to pass through. The above ground wall on top of the underground utility post can be a fixed monument, a removable panel, or a hinged up flat plate to seal the gap between adjacent panels. The retractable floodwall system may also include an automated deployment device that runs along a track from behind the floodwall system and raises the floodwall panel from the housing unit. Support legs are deployed to keep the floodwall in the raised position. According to this embodiment, water is not needed to move or lock the floodwall in place.

According to an aspect of the present invention, a method of flood protection comprises providing a floodwall panel in a housing unit; connecting the floodwall panel with a counter-balance weight; raising the floodwall panel from the housing unit for flood protection; and lowering the floodwall panel into the housing unit.

According to another aspect, there is provided a method comprising constructing a lower portion of the floodwall panel to be a buoyant portion, installing a plurality of support legs on the floodwall panel, the plurality of support legs supporting the floodwall panel on a surface in a raised position; installing a latch mechanism at a top surface of the floodwall panel; installing an actuator inside the housing unit for lifting and lowering the floodwall panel; installing a plumbing system for delivering a fluid into the housing unit; installing a floodwater inlet on the housing unit that allows floodwater to enter the housing unit; providing an automated deployment device that runs along a track for raising the floodwall panel; or providing a controller that is capable of controlling an operation of the floodwall panel from a remote location.

The present application also relates to a retractable floodwall unit comprising: a foundation unit having a plurality of guide tracks along side walls of the foundation unit; a floodwall panel stowed in the foundation unit; and a power system having a winch for raising and lowering the floodwall panel. The foundation unit includes a first housing unit enclosing the winch of the power system, and the floodwall panel includes a plurality of guides that mate with the guide tracks of the foundation unit.

According to some embodiments of the present application, the foundation unit is formed by pre-cast concrete, which may be supported by sheet piles. The first housing unit includes a frame that secures the winch. A plurality of support legs locked in a second housing unit of the floodwall panel are included in the floodwall unit. The plurality of support legs are spring loaded and have a latch bar configured to unlock the support legs. The side walls of the foundation unit include a plurality of first projections that trigger the latch bar to unlock the support legs. The plurality of the first projections are arranged at an upper portion of the side walls. The side walls of the foundation unit further include a plurality of second projections that trigger the latch bar to relock the support legs. The plurality of the second projections are arranged at a lower portion of the side walls. The power system includes a single-purchase winch system. the winch system includes a winch connected with a plurality of cable terminations that are attached to the side walls of the foundation unit, and the winch system includes a sheave attached to the bottom of the floodwall panel. The power system comprises a hydraulic system having a pump stored in the first housing unit, and the hydraulic system further includes a plurality of hydraulic cylinders concealed in the floodwall panel.

According to some embodiments, the floodwall unit may also include a plumbing system configured to remove water from the foundation unit to a wet side of the floodwall unit. The plumbing system further includes a one-way check valve at an outlet of the wet side to prevent water from entering the plumbing system. The plumbing system further includes an inlet at a dry side of the floodwall unit to let water in the dry side to enter the foundation unit. The plumbing system is configured to back flash the foundation unit to remove silt or deposit from the foundation unit. The plumbing system includes a sparger pipe arranged at the bottom of the foundation unit.

According to some embodiments, the retractable floodwall unit is concealed underground. The floodwall unit may also include a water repellent impregnant in the floodwall panel for slowing corrosion and an impact resistant layer at the wet side of the floodwall panel to absorb impact from sea water. The power system is configured to be remotely controlled. The floodwall unit may include a plurality of vertical seals along a side of the floodwall panel to prevent water leakage through gaps between adjacent floodwall panels and a plurality of horizontal seals along a horizontal direction of the floodwall panel to prevent water leakage through gaps between the floodwall panel and the foundation unit. Both the vertical seals and the horizontal seals of the floodwall unit are planar-shaped to ease fabrication and installation of these seals.

The present application also relates to an entrance unit comprising the present floodwall unit. A flood shelter for establishing a flood-free area comprising a plurality of the present floodwall units are also disclosed in the present application. The flood shelter may further include underground posts that allow utility lines to enter the flood-free area and a hinged panel on top of the underground posts to form a watertight contact with adjacent floodwall units and an entrance unit across a road that and being formed by the plurality of the present floodwall units. The flood shelter may also include a corner unit having similar configurations with the present floodwall unit and an end unit configured to form a watertight contact between the floodwall unit and an existing structure.

The present application also relates to a retractable floodwall system comprising a foundation that supports the retractable floodwall system; a floodwall section having a straight floodwall units, a corner unit, an entrance unit, and a hinged panel adjacent to the entrance unit; and an underground post underneath the hinged panel that has a plurality of utility openings. Each of the straight floodwall unit, the corner unit, and the entrance unit has a retractable floodwall panel, which, in a stowed position, is substantially underground, and the retractable floodwall panel includes a plurality of support legs being capable of supporting the floodwall panel in a raised position.

According to some embodiments, the retractable floodwall system includes a power system arranged in the foundation for moving the retractable floodwall panel. The power system is remotely controlled to raise or lower the retractable floodwall panel simultaneously or sequentially. The retractable floodwall system may further include an engagement unit configured to engage with a power system that is external to the retractable floodwall system, the engagement unit being connected with the floodwall panel with a pulley system to use the power system to move the retractable floodwall panel. The retractable floodwall panel is capable of being manually raised or lowered, and the internal power system of the floodwall system is capable of being deactivated to allow a manual operation of the retractable floodwall panel.

BRIEF DESCRIPTION OF DRAWINGS

To the accomplishment of the foregoing and related ends, certain illustrative embodiments of the invention are described herein in connection with the following description and the annexed drawings. These embodiments are indicative, however, of but a few of the various ways in which the principles of the invention may be employed and the present invention is intended to include all such aspects and their equivalents. Other advantages, embodiments and novel features of the invention may become apparent from the following description of the invention when considered in conjunction with the drawings. The following description, given by way of example, but not intended to limit the invention solely to the specific embodiments described, may best be understood in conjunction with the accompanying drawings, in which:

FIG. 2a illustrates a floodwall unit in a stowed position according to an embodiment of the present invention.

FIG. 2b illustrates the floodwall unit of FIG. 2a in a raised position according to an embodiment of the present invention.

FIG. 4 illustrates a housing unit of a floodwall unit according to an embodiment of the present invention.

FIG. 5 illustrates a housing unit with a foundation according to an embodiment of the present invention, which includes additional foundation piles to support the housing unit.

FIG. 6a illustrates portions of the plumbing system connected with a housing unit of a floodwall segment according to an embodiment of the present invention.

FIG. 8 illustrates a cross section of the floodwall panel with a void in the lower portion for buoyancy according to an embodiment of the present invention.

FIG. 8a illustrates a floodwall panel according to an embodiment of the present invention.

FIG. 8b illustrates a vertical seal between adjacent floodwall panels according to an embodiment of the present invention.

FIG. 9 illustrates a counter-balance weight according to an embodiment of the present invention.

FIG. 12a illustrates an embodiment of the pillar 654 of FIG. 12.

FIG. 13 illustrates a floodwall system connected with an existing floodwall according to an embodiment of the present invention.

FIG. 14a illustrates the trolley of FIG. 14 according to an embodiment of the present invention.

FIG. 14b illustrates a latch mechanism to raise and lower the floodwall between a trolley and a floodwall panel according to an embodiment of the present invention.

FIG. 23a illustrates a floodwall panel in a stowed position according to an embodiment of the present invention.

FIG. 23b illustrates the floodwall panel of FIG. 23a in a fully raised position according to an embodiment of the present invention.

DETAILED DESCRIPTION

Figure 1B:
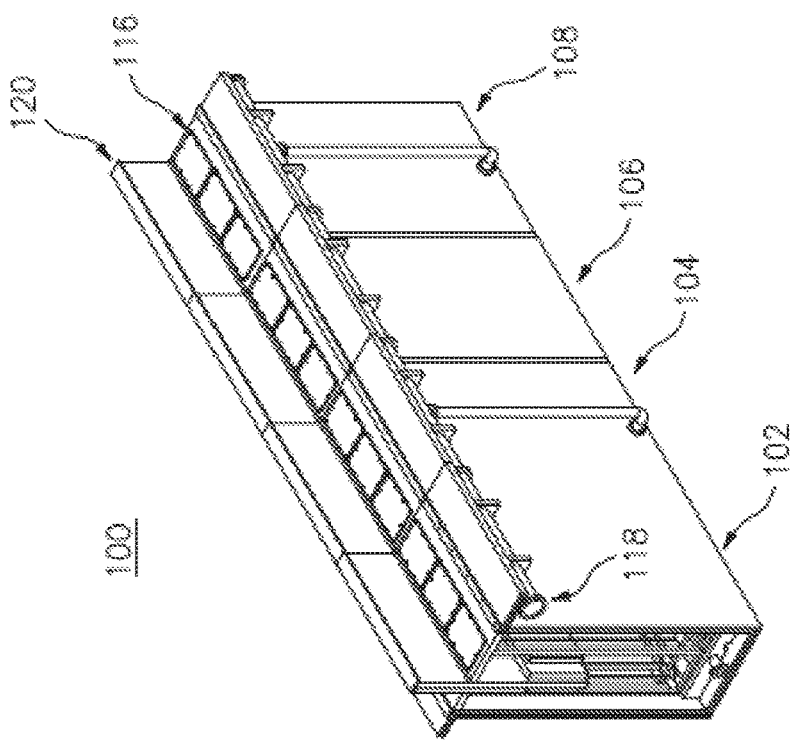
FIG. 1b illustrates the floodwall segment of FIG. 1a in a raised position according to an embodiment of the present invention.
Figure 1A:
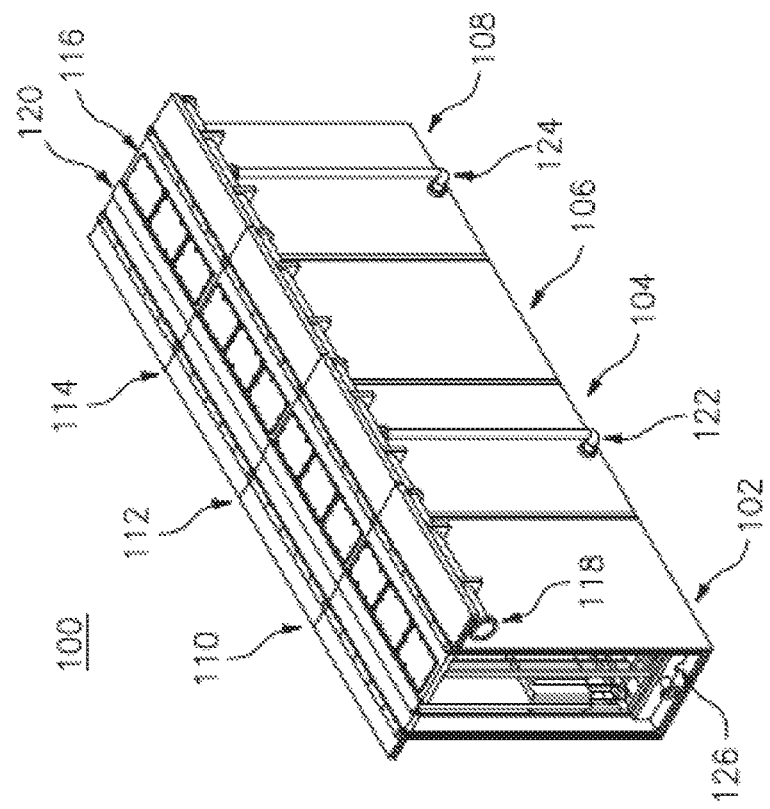
FIG. 1a illustrates a floodwall segment of a retractable floodwall system in a stowed position according to an embodiment of the present invention.

FIG. 1a illustrates a floodwall segment 100 of a retractable floodwall system according to an embodiment of the present invention. The segment 100 is formed by a plurality of individual units 102, 104, 106, and 108. The plurality of units 102, 104, 106, and 108 are attached with each other and form watertight connections 110, 112, and 114. In one embodiment, the plurality of units 102, 104 106, and 108 are disposed at an underground position with the top surface 116 of the segment 100 at about the grade level. In this way, the segment 100 of the floodwall system is concealed from the view and does not intrude on the surrounding environment. The top surface 116 and supporting structures are configured to have adequate strength to support transportation vehicles, including passenger cars, vans, and trucks that can pass over the floodwall system in the underground position. As shown in FIG. 1a, the plurality of units 102, 104, 106, and 108 are preferably at similar elevations to form a smooth top surface 116, along which shared openings between the units can be used for continuous water passage. In one embodiment, the plurality of units 102, 104, 106, and 108 may be placed at different elevations depending on the foundation conditions and variations in the level of the grade.

As shown in FIG. 1a, the floodwall segment 100 has a plumbing system 118 that controllably delivers water into the floodwall system. According to an aspect of the present invention, the plumbing system 118 delivers water into the floodwall system to create a buoyant force to lift a floodwall panel 120 to a desired height. The plumbing system 118 also removes water from the system to lower or retract the floodwall panel 120. As will be explained below, the plumbing system 118 may use either municipal water or floodwater for filling the floodwall system.

In one embodiment, every unit is filled simultaneously by the plumbing system 118. In another embodiment, the plumbing system 118 has selected filling or draining connections to the plurality of units 102, 104, 106, and 108. For example, as shown in FIG. 1a, the units 102 and 106 have neither filling connections nor draining connections with the plumbing system 118, which may be called a "plain unit." These "plain units" are hydraulically connected with adjacent units 104 and 108 to allow water to enter and exit. Each of the units 104 and 108 has a connection with the plumbing system such as connections 122 and 124. The connections 122 and 124 may be used for draining or filling water or both. Depending on the functions of connections with the plumbing system, the units 104 and 108 may be used as a draining unit or a filling unit or both. If the connection 122 of the unit 104 is used to drain water with a pump, such as a sump pump, the unit 104 may be called a "draining unit." If the connection 124 of the unit 108 is used to fill water, the unit 106 may be called a "filling unit." By providing units with various functions, the retractable floodwall system as set forth in the present invention can provide flood protections to different customer's needs at various levels of costs.

Each unit 102, 104, 106, and 108 has a compartment 126 that accommodates the movable floodwall panel 120, which is normally stored in a stowed position as shown in FIG. 1a. In the stowed position, the floodwall panel 120 is disposed inside the compartment and is concealed from the view. According to an embodiment, the movable floodwall panel 120 is raised from the compartment 126 and thus deployed to provide flood protection. The movable floodwall panel 120 may be deployed to different heights depending on the flood level. As shown in FIG. 1b, the floodwall panel 120 is raised partway from the compartment 126. In this position, about half of the floodwall panel 120 is above the top surface 116, while the other half of the floodwall panel 120 is still inside the compartment 126. The floodwall pane 120 may be raised by any suitable methods, including human labor, machine, and buoyant force.

FIGS. 2a and 2b show the unit 102 with the floodwall panel in a stowed position and a partway deployed position. Inside the compartment 126, the movable floodwall panel 120 is connected with a transmitting mechanism 130, such as pulleys, gears, chains, and cables, which are used to raise and lower the floodwall panel 120 to a counterweight located behind the floodwall panel. The unit 120 also has actuators inside the compartment 126. The actuator engages with the transmitting mechanism 130 and produces lifting or lowering forces that are transmitted to the floodwall panel. The transmitting mechanism also includes a counter-balance weight. By the use of the counter-balance weight, the lifting force or lowering force produced by the actuator may only need to be a fraction of the weight of the floodwall panel. The actuator may also be used to keep the floodwall at a desired height above grade less than the full stroke of the floodwall. This reduces the size of the actuator and its power requirement. The actuator may be activated by remote control from a smartphone or from a push button controller at the site. The actuator, the transmitting mechanism, and the counter-balance weight will be disclosed below.

Also shown in FIGS. 2a and 2b, the top surface 116 includes a plurality of access panels 128. When opened, these access panels 128 allow a maintenance crew to enter or reach into the compartment 126 to conduct examination and repair of the components inside the compartment 126.

Figure 3:
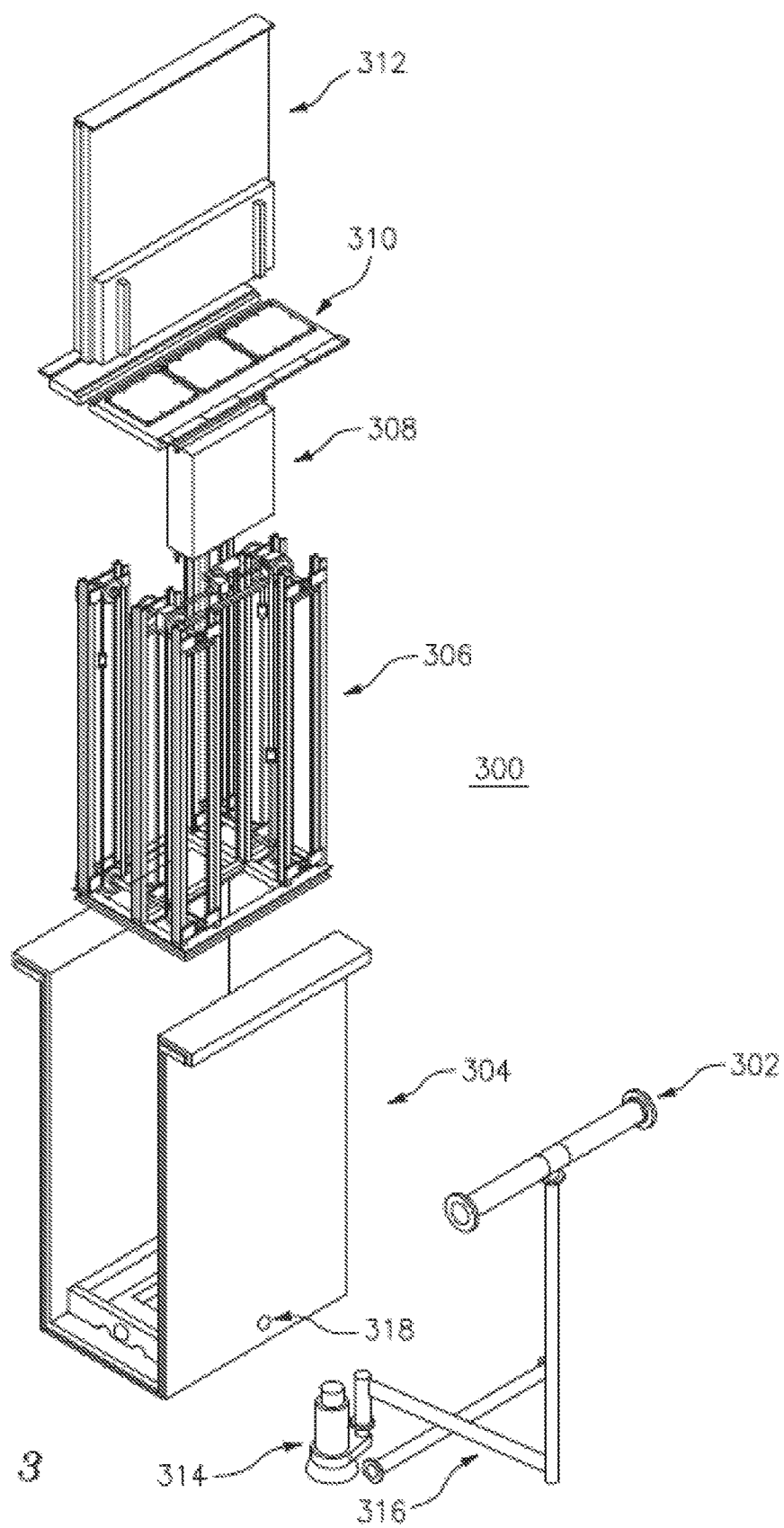
FIG. 3 illustrates an exploded view of a floodwall unit according to an embodiment of the present invention.

FIG. 3 shows an exploded view of a floodwall unit according to an embodiment of the present invention. The floodwall unit 300 includes a plumbing unit 302, a housing unit 304, a support frame 306, a counter-balance weight 308, a surface unit 310, and a floodwall panel 312. According to an embodiment, the plumbing unit 302 has a pump 314 that is disposed at the bottom of the housing unit 304 and is configured to pump water out of the housing unit 304. The plumbing unit 302 has one plumbing section 316 that enters the housing unit 304 via an opening 318 that is located at the bottom part of the housing unit 304. According to an embodiment, the plumbing section 316 may enter the housing unit 304 from the top or bottom part of the housing unit 304. When assembled, the housing unit 304 encloses the support frame 306, the counter-balance weight 308, and the floodwall panel 312 and protects them from outside damage. The support frame 306 supports the floodwall panel 312, the counter-balance weight 308, actuators, and transmitting mechanisms for raising and lowering the floodwall panel 312. The counter-balance weight 308 is connected with the floodwall panel 312 via the transmitting mechanism and balances the weight of the floodwall panel 312 such that the force required to raise or lower the floodwall panel 312 is reduced. The floodwall panel 312, when raised, provides flood protection to property enclosed by the floodwall system. The lower portion of the floodwall remains below grade inside the foundation 304 to reinforce the upper portion against the floodwater's impact, which pounds the exposed portion of the floodwall. The wider base of the lower portion also prevents the floodwall from floating out of the system when floodwater is used as the buoyant force to raise the floodwall.

The surface unit 310 conceals the components inside the housing unit 304 when the floodwall panel is not deployed and serves as a structural surface for regular usage, for example, to support the weight of persons and vehicles passing over the floodwall unit. The surface unit 310 has a plurality of seals configured to prevent water from entering the housing unit 304 when no flood event is occurring, for example, during a normal rain event. The seals may be placed at different locations, including between the surface unit 310 and the housing unit 304, between the surface 310 and the floodwall panel 312, and underneath the access panel 128. The plumbing system, the housing unit, the support frame, the floodwall panel, the counter-balance weight and the surface unit will be discussed below.

As shown in FIG. 3, the plumbing section 302 enters the housing unit 304 via a bottom opening 318 and then connects with a pump 314. In one embodiment, the pump 314 is a sump pump that is used to send water out of the housing unit 314. According to this embodiment, the floodwall unit as shown in FIG. 3 is a draining unit. According to another embodiment, the unit 300 without a pump and connections to the plumbing is a plain unit. Such a plain unit would be hydraulically connected with adjacent units. According to another embodiment, the unit 300 is connected with the plumbing unit but does not include a pump 314. This would be considered a fill unit.

FIG. 4 shows a housing unit 304 according to an embodiment of the present invention. FIG. 5 shows a housing unit 304 and a foundation 502 according to another embodiment of the present invention. The foundation 502 is configured to provide a strongback at the dry side, which has greater dimensions than the foundation close to the wet side.

As shown in FIG. 4, the housing unit 304 forms a compartment 126 to accommodate the floodwall panel and other components. The compartment 126 may be of any shape. In one embodiment, the compartment 126 has a substantially rectangular shape. The housing unit 304 has a plurality of horizontal projections 408. When the housing unit is installed, these projections 408 are flush with the grade level and extend in a horizontal direction. The projections 408 are supported by a plurality of structural ribs 410, which have pre-fabricated slots to support the plumbing unit 302. The housing unit 304 has a flood-side wall 412 and a safe-side wall 414. The flood-side wall 412 has an opening 406 at the top of the housing unit 304, which is used to receive flood water. The safe-side wall 414 has an opening 318 at the bottom of the housing unit 304, which is used to remove water from the housing unit 304 or to fill the housing unit with municipal water. At the bottom of the housing unit 304, a protective unit 402 with pre-set openings 404 is used to hold plumbing pipes and allow them to run through the openings 404. The protective unit 402 protects the plumbing pipes from being damaged as well as serving as the bottom of the foundation system that the floodwall sits on. This decreases the contacting surface area between the base of the floodwall and the bottom of the housing unit. The housing unit 304 may be constructed from any material that provides adequate mechanical integrity, including steel, concrete, polymers, composites, wood, or a combination thereof. In a preferred embodiment, the housing unit 304 is constructed from pre-cast reinforced concrete.

As shown in FIG. 5, a foundation 502 may be constructed to support the housing unit 304. When the foundation 502 is used, it may reduce the amount of settlement caused by the weight of the floodwall system, avoid misalignment among floodwall units, and increase the work life of the floodwall system. The foundation is preferably provided around all sides of the housing unit 304. According to an embodiment, the foundation 502 is made of pre-cast concrete and has an inside space similar with the shape of the housing unit 304 such that the housing unit 304 may be lowered into the foundation and fit to the foundation snugly. Fixing mechanisms, such as bolts, screws, concrete, or glues, may be used to attach the housing unit 304 with the foundation 502. In one embodiment, the foundation 502 is further supported by additional batter piles 504 that are driven into the ground. It is noted that the foundation 502 is optional in the present floodwall system. The floodwall system of the present invention can be installed and work properly even without a foundation.

Figure 6:
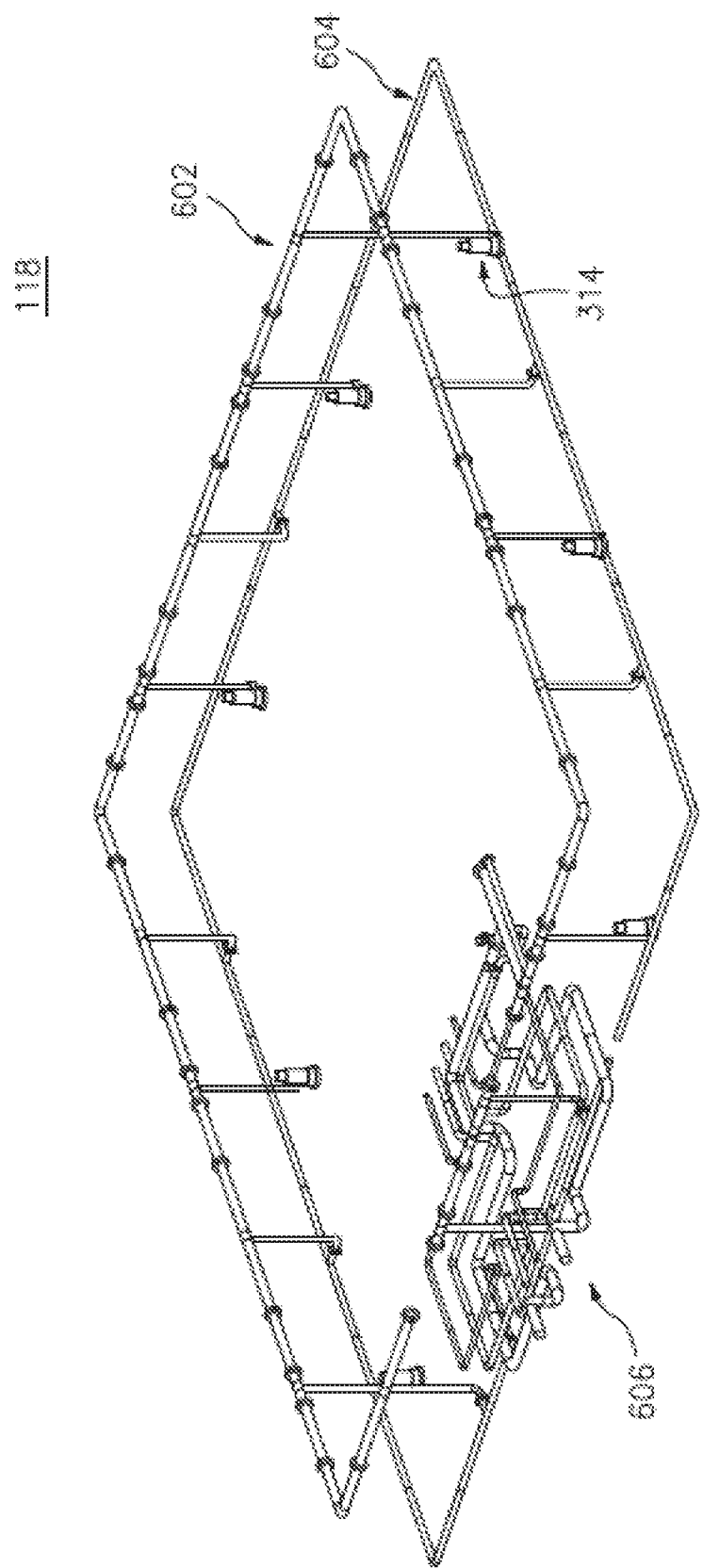
FIG. 6 illustrates a plumbing system of a floodwall system according to an embodiment of the present invention.

FIG. 6 shows the plumbing system 118 of a retractable floodwall system according to an embodiment of the present invention. The plumbing system 118 has an upper section 602 that runs along the upper part of the housing unit 304, a lower section 604 that runs along the bottom part of the housing unit 304, a plurality of pumps 314 that are disposed at the bottom of the housing unit 304, and a manifold section 606. In one embodiment, the upper section 602 is placed outside of the housing unit 304 and has a larger diameter than the lower section 604, which is placed inside the housing unit 304. The upper section 602 is also placed at the safe-side of the floodwall system. The upper section 602 may be connected with storm drains and municipal water via the manifold section 606. The plurality of pumps 314 pump water out of the housing unit 304. In one embodiment, the lower section 604 includes a plurality of sparger pipes to facilitate the removal of silt or other debris that may enter the housing unit.

FIG. 6a shows various parts of a floodwall segment 100 according to an embodiment of the present invention. In addition to the plumbing system 118 shown in FIG. 6, the floodwall segment 100 may also include a floodwater inlet 608 that is disposed at the flood-side of the floodwall system. The floodwater inlet 608 is connected with a shutoff valve 610 that regulates the floodwater intake. When the shutoff valve 610 is open, floodwater is allowed to enter the housing unit 304, which will reduce the use of municipal water to fill the housing to raise the floodwall panel. Also shown in FIG. 6a, the housing unit 304 includes a plurality of guides 612, which are used to guide the rising of the floodwall panel during the deployment. The surfaces of these guides are preferably treated to have low frictions against the floodwall panel. For example, these guides may have a low friction coating such as Teflon, a Polytetrafluoroethylene based polymer. In one embodiment, the guides are a plurality of projections on the sidewall of the housing unit. In another embodiment, the guides are a plurality of tracks inside the sidewall of the housing unit.

As shown in FIG. 6a, the outside of the housing unit has a plurality of spikes 611. In one embodiment, a steel unit, constructed from steel or another metallic material, has the required dimensions to enclose the housing unit. The steel unit also has a plurality of spikes. The steel unit is installed underground first. The spikes secure the steel unit in the surrounding soil. After the steel unit is secured, a pre-cast concrete unit that has the required inside dimension of the housing unit is inserted into the steel unit. The pre-cast concrete unit may also have a plurality of spikes 611 to securely connect the concrete unit to the steel unit. The attachment may be implemented using glue, grout, or poured concrete.

Figure 6B:
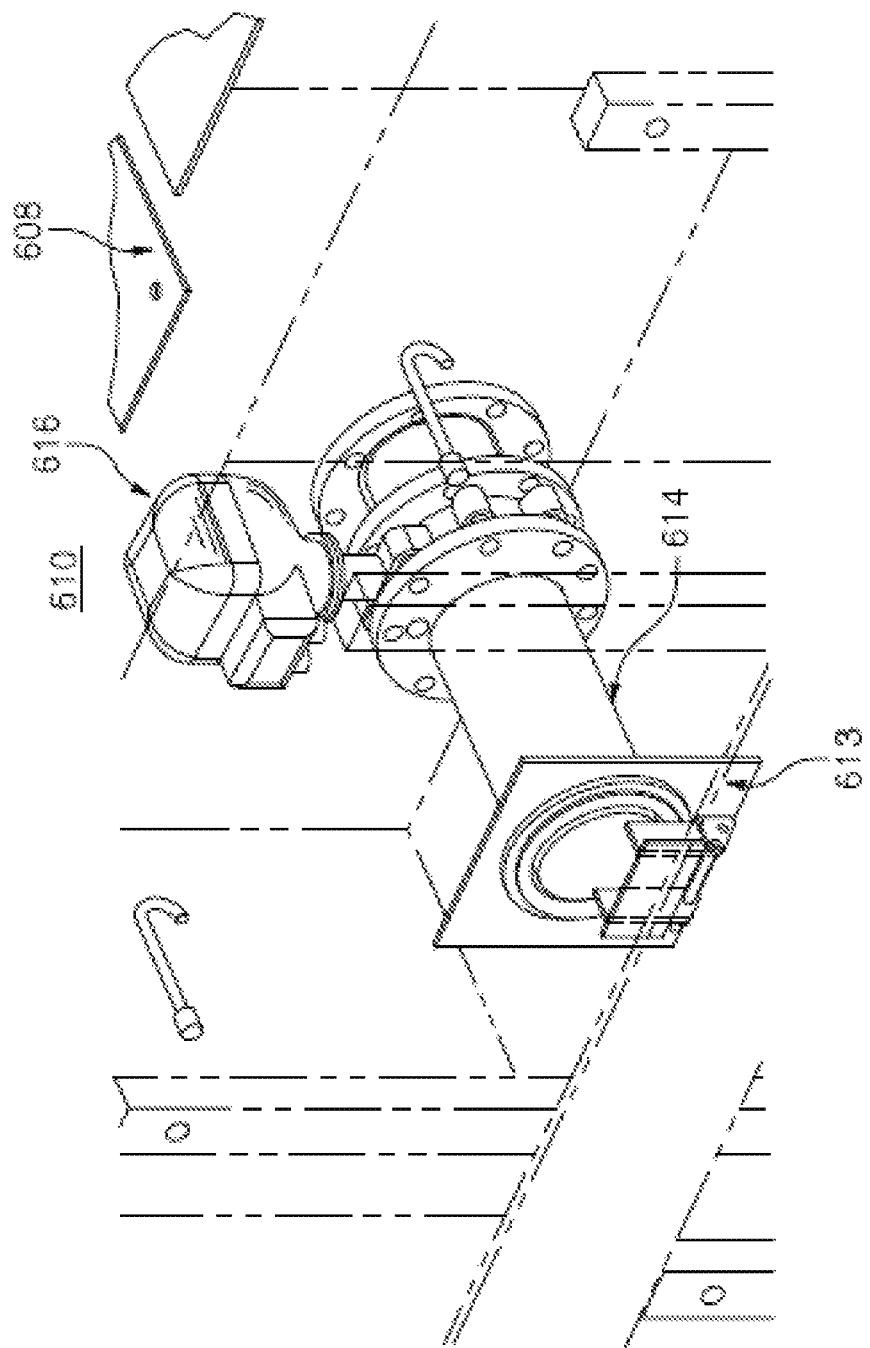
FIG. 6b illustrates a shutoff valve of the plumbing system according to an embodiment of the present invention.

FIG. 6b shows a shutoff valve 610 according to an embodiment of the present invention. The shutoff valve 610 includes a solenoid valve 616, an opening 614, and a flap gate 613. The solenoid valve 616 may be remotely controllable. For example, the valve 616 may be controlled wirelessly by a smartphone. The opening 614 provides a channel between the inside of the housing unit 314 and the floodwater inlet 608. The flap gate 613 is hinged at the bottom and is normally in an open position, thus allowing floodwater entering the housing unit 304 when the valve 616 is open. The flap gate 613 is moved to a closed position when the floodwall panel 120 is raised. The lower part of the floodwall panel 120 engages with the flap gate 613 when the panel nears its fully raised position. In this way, when the floodwall panel 120 is raised, the flap gate 613 is closed, thus preventing additional floodwater and its sediment from entering the housing unit 304.

Figure 6C:
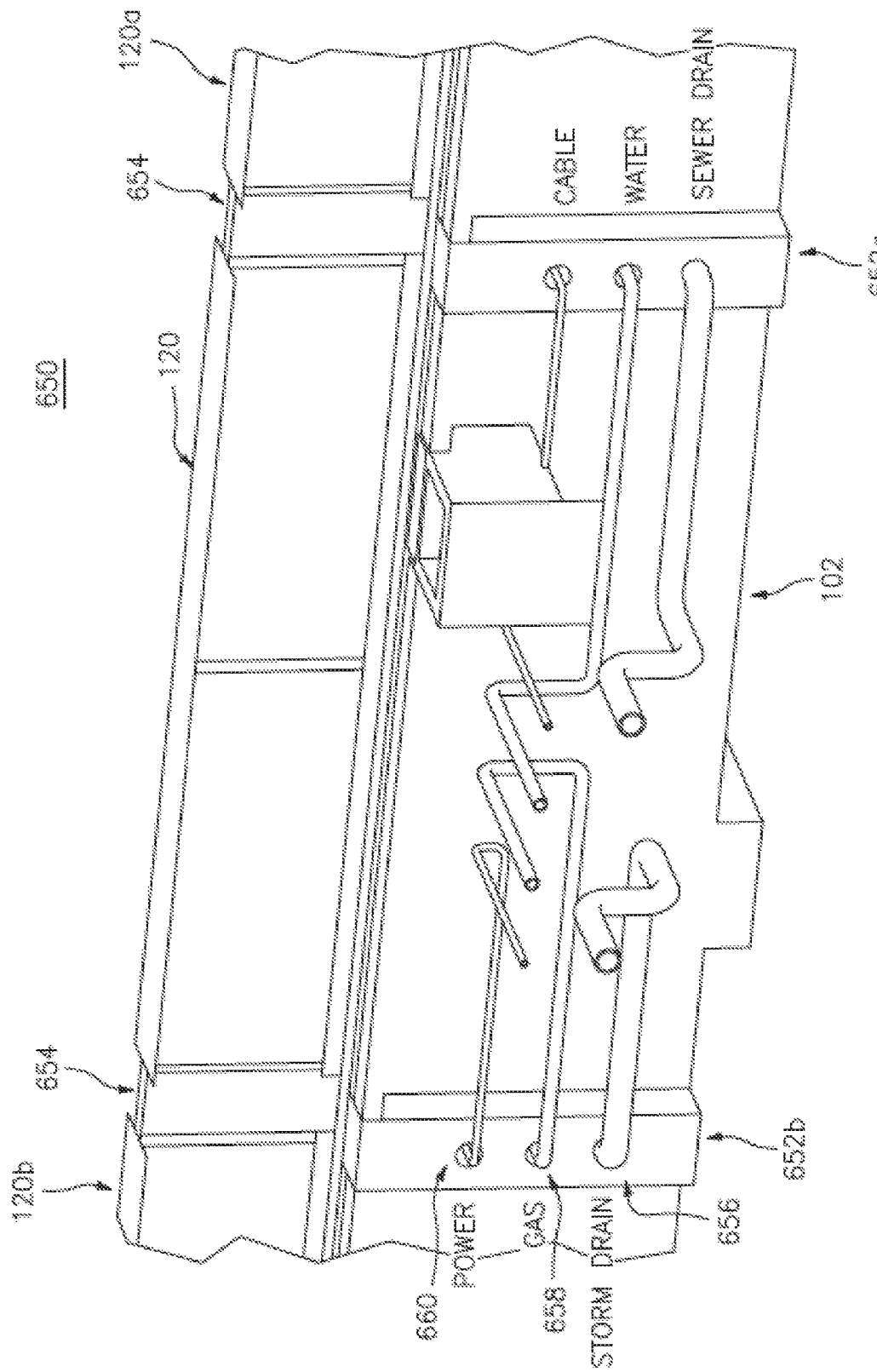
FIG. 6c illustrates an exit segment of a floodwall system according to an embodiment of the present invention.
Figure 6D:
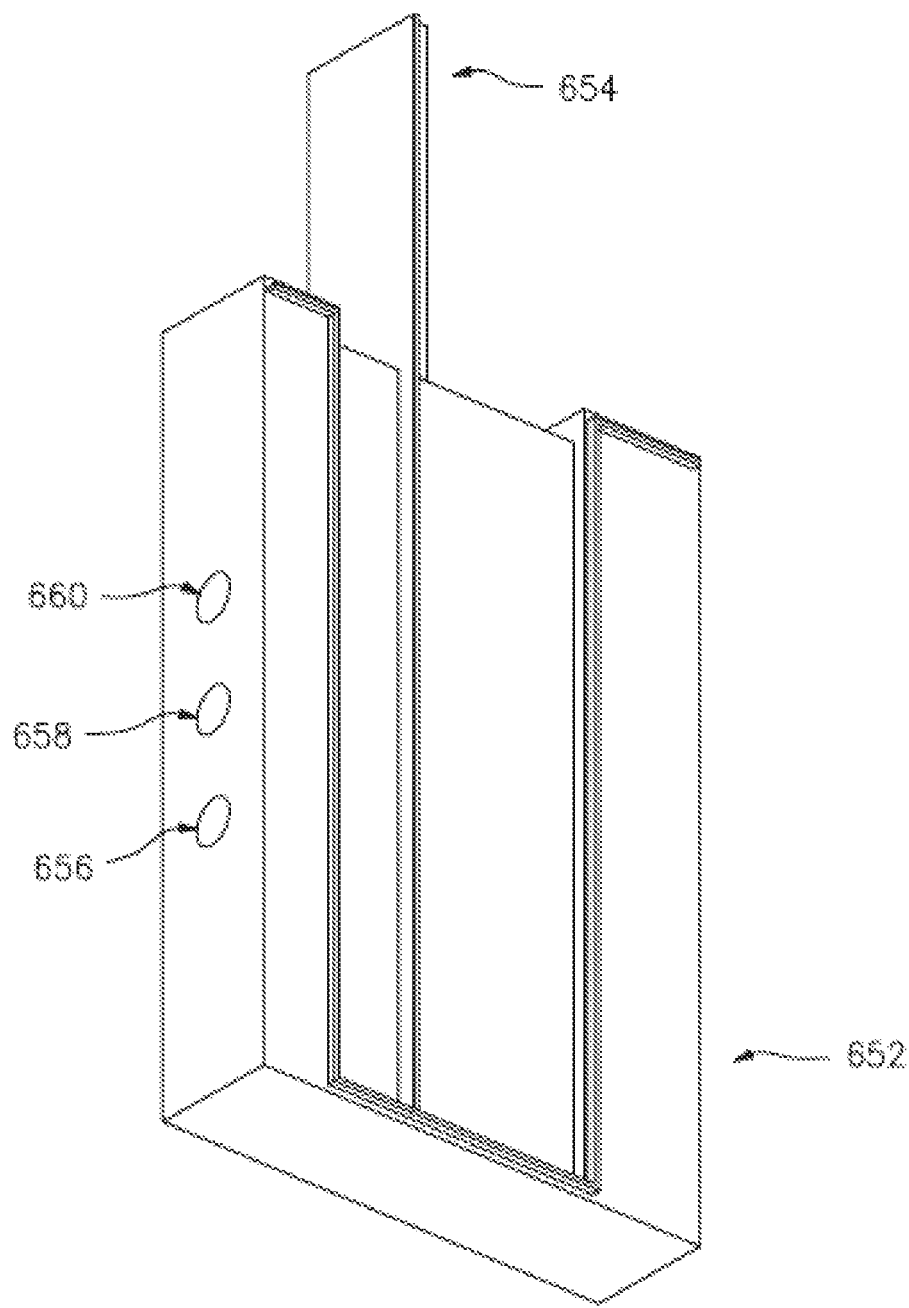
FIG. 6d illustrates a removable pillar and through openings of the exit segment according to an embodiment of the present invention.

FIG. 6c shows an exit unit of the retractable floodwall system according to an embodiment of the present invention. When the floodwall system is used to protect a building, an entrance and exit access needs to be maintained before the floodwall system fully encircles the building. In addition, the floodwall system needs to be configured to provide access for underground utility lines, such as water, gas, electric, and drain. As the utility lines cannot pass through a movable floodwall panel that will be raised and lowered from time to time, the floodwall system provides underground utility connections through a plurality of fixed underground posts 652a and 652b. These posts allow the passage of utility lines in a wide range of diameters. In one embodiment, a single post may be used for passing utility lines. The floodwall panel 120 of the exit unit 102 is placed between the fixed posts 652a and 652b that extend above and below the ground. The floodwall panel 120 is movable and when it is raised, it seals against the fixed posts 652a and 652b. The utility lines such as power lines, gas line, and storm drains may pass through the underground portion of the posts 652a and 652b via a plurality of openings 656, 658, and 660. According to one embodiment, fixed posts 652a and 652b and above-ground pillars 654 are attached and detached from the underground posts to provide a continuous connection between the floodwall panel 120 and adjacent panels. FIG. 6d shows an embodiment of the underground post 652 and the pillar 654.

Figure 7A:
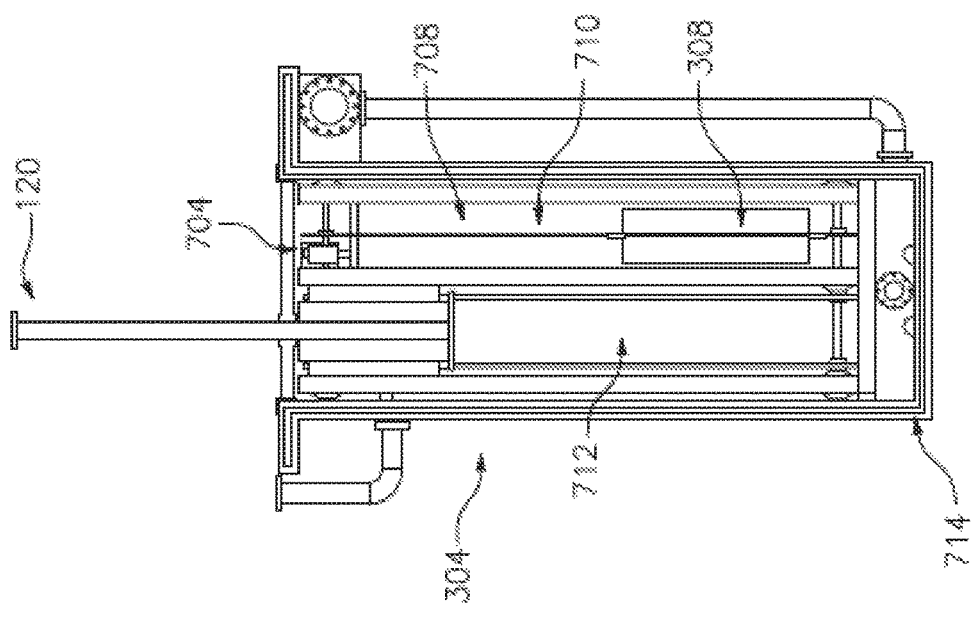
FIG. 7a illustrates the connection between a floodwall panel and a counter-balance weight according to an embodiment of the present invention.
Figure 7:
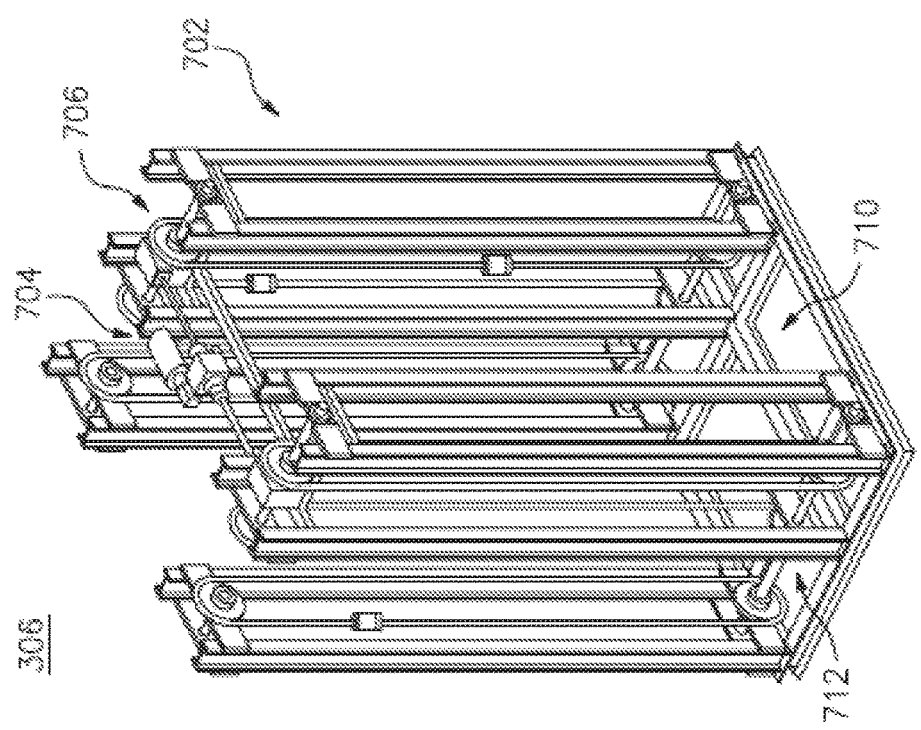
FIG. 7 illustrates a support frame inside a floodwall unit according to an embodiment of the present invention.

FIG. 7 shows the support frame 306 according to an embodiment of the present invention. The support frame 306 is configured to support the floodwall panel 120 and the counter-balance weight 308 in a first compartment 712 and a second compartment 710, respectively. In one embodiment, each of the two compartments has a height substantially the same as the housing unit 304. The two compartments may be arranged side by side. The support frame 306 further includes an actuator 704 that provides necessary force to raise the floodwall panel 120. The actuator may be any suitable mechanism that provides the needed force. For example, the actuator may be an electric motor. In one example, the torque or force produced by the actuator 704 is transmitted to the floodwall panel 120 and the counter-balance weight 308 by a plurality of pulleys 706 and a plurality of cables 708, which are attached to the floodwall panel 120 and the counter-balance weight 308. In one embodiment, the support frame 306 is made of a plurality of steel members 702 that forms a cage-like structure.

FIG. 7a shows the configuration of a floodwall unit when the floodwall panel is fully deployed according to an embodiment of the present invention. In the fully deployed position, the floodwall panel is raised to its highest point, while the counter-balance weight is at its lowest point. When the floodwall panel is retracted from the fully deployed position to the stowed position, the floodwall panel 120 is lowered into the housing unit, while the counter-balance weight rises to the upper part of the compartment 710. As also shown in FIG. 7a, the housing unit 304 may have slots or projections 714 at its two ends, which are used to mate with the slots and projections of an adjacent housing unit to form a fitted watertight connection.

FIG. 8 shows a floodwall panel according to an embodiment of the present invention. The floodwall panel 120 has an upper section 802, a lower section 804, a plurality of guides 803, a plurality of horizontal seals 805, and a top drive over seal 808. As shown in FIG. 8, the upper section 802 is preferably solid and has adequate mechanical integrity to resist the hydrodynamic, hydrostatic and debris impact forces of floodwater. The lower section 804 may be configured to have a greater dimension than the upper section 802 and may occupy as much space as possible inside the housing unit 304, thereby making it buoyant. The inside section 806 of the lower section 804 is preferably hollow to reduce the weight and increase buoyancy. The floodwall panel 120 may be constructed from various materials, including steel, concrete, polymers, composite materials, and a combination thereof. As the lower section 804 may not be subject to forces from the flood water that is imposed on the upper section 802, the lower section 804 and the upper section 802 may be constructed by different materials. For example, the upper section may be constructed by pre-cast concrete while the bottom section may be constructed by plastic. The top drive over seal 808 is configured to seal the housing unit 304 when the floodwall panel is in the stowed position. The plurality of horizontal seals 805 may be used to create a watertight contact between the floodwall panel and the top surface 116 or insides surfaces of the housing unit when the floodwall panel is in the raised position. The plurality of guides 803, similar with the guides 612 of the housing unit 304, contact the inside surface of the housing unit and direct the floodwall panel to raise in an upright direction.

FIG. 8a shows an embodiment of a floodwall panel 800. The floodwall panel 800 has a vertical seal 814, a lifting latch mechanism 816, a plurality of leg supports 812, a plurality of horizontal seals 818, and a plurality of guides 810. The vertical seal 814 is configured to seal the gaps between two adjacent floodwall panels 800. The vertical seal 814 may be made of any suitable material in any configuration as long as the vertical seal 814 is capable of stopping water from running through the gaps. According to a preferred embodiment, vertical and horizontal seals are formed from an elastomer such as Neoprene, a polychloroprene based polymer. In one embodiment, the vertical seal 814 has a tubular shape with a hollowed inner portion. In another embodiment, the vertical seal 814 has a finger-like configuration. The latch mechanism 816 provides an attachment point with an external device that can be used to raise the floodwall panel 800. For example, when the floodwall panel 800 is raised manually, a worker may fit a handle into the latch mechanism 816 and use the handle to lift the floodwall panel 800. The plurality of leg supports 812 are used to support the floodwall panel 800 in a raised position. The leg supports 812 are spring-loaded and are pressed inside the floodwall panel 800 when the panel is not raised. According to an aspect of the invention, the leg supports engages with a plurality of horizontal edges and the inside surface of the housing unit and form a ratchet mechanism. The leg supports 812 are released when the floodwall panel is raised to a predetermined height and press against the top surface 116 to support the raised floodwall panel. With the leg supports 812 engaged with the top surface, the floodwall panel will be maintained in the raised position without the requirement of the torque or force from the actuators. When the floodwall panel 800 is retracted from a raised position to a stowed position, the leg supports 812 may be pushed back into the floodwall panel 800 by a plurality of cams or beveled protrusions installed on the side walls of the housing unit 304. The horizontal seal 818, similar with the horizontal seal 805 in FIG. 8, is used to provide a watertight contact between the lower section of the floodwall panel 800 and housing unit. The guides 810 are constructed at locations corresponding to the guides 612 on the side walls of the housing unit 304. The guides 810 and the guides 612 work together to ensure that the floodwall panel 800 is raised along an upright direction.

FIG. 8b is a top view showing another embodiment of vertical seals 814 between two floodwall panels 800a and 800b. The vertical seal 814 includes two parts: a first part 814a attached to the floodwall panel 800a and a second part 814b attached to the floodwall panel 800b. The first part 814a is substantially planar and extends across the gap 822. The second part 814b is U-shaped, which sandwiches the first part 814b between the two legs of the "U", thus forming a watertight seal.

FIG. 9 shows an embodiment of a counter-balance weight 308. The counter-balance weight 308 has a body portion 908 that is designed to provide a substantial amount of mass. To reduce the amount of force used to lift the floodwall panel, the mass of the body portion 908 needs to be comparable with the floodwall panel. In one example, the mass of the body portion 908 is between about 50% to 150% of the mass of the floodwall panel or preferable between about 80% to 120% of the mass of the floodwall panel or preferably about 90% of the mass of the floodwall panel. In one embodiment, the body portion 908 may be constructed by the same material as that of the floodwall panel, such as pre-cast reinforced concrete. In one embodiment, the body portion 908 is made of a material that has a greater density than the floodwall panel. For example, the body portion 908 may be made of lead, while the floodwall panel may be made of pre-cast concrete. The counter-balance weight 308 also includes an attachment mechanism, such as a plurality of bars 902 and 904 and a plurality of connectors 906a, 906b, 906c, and 906d, that are used to attach the weight 308 to the transmitting mechanism of the actuator as shown in FIG. 7a. It is noted that the floodwall panel may have similar bars and connectors for attachment with the transmitting mechanism of the actuator.

Figure 10:
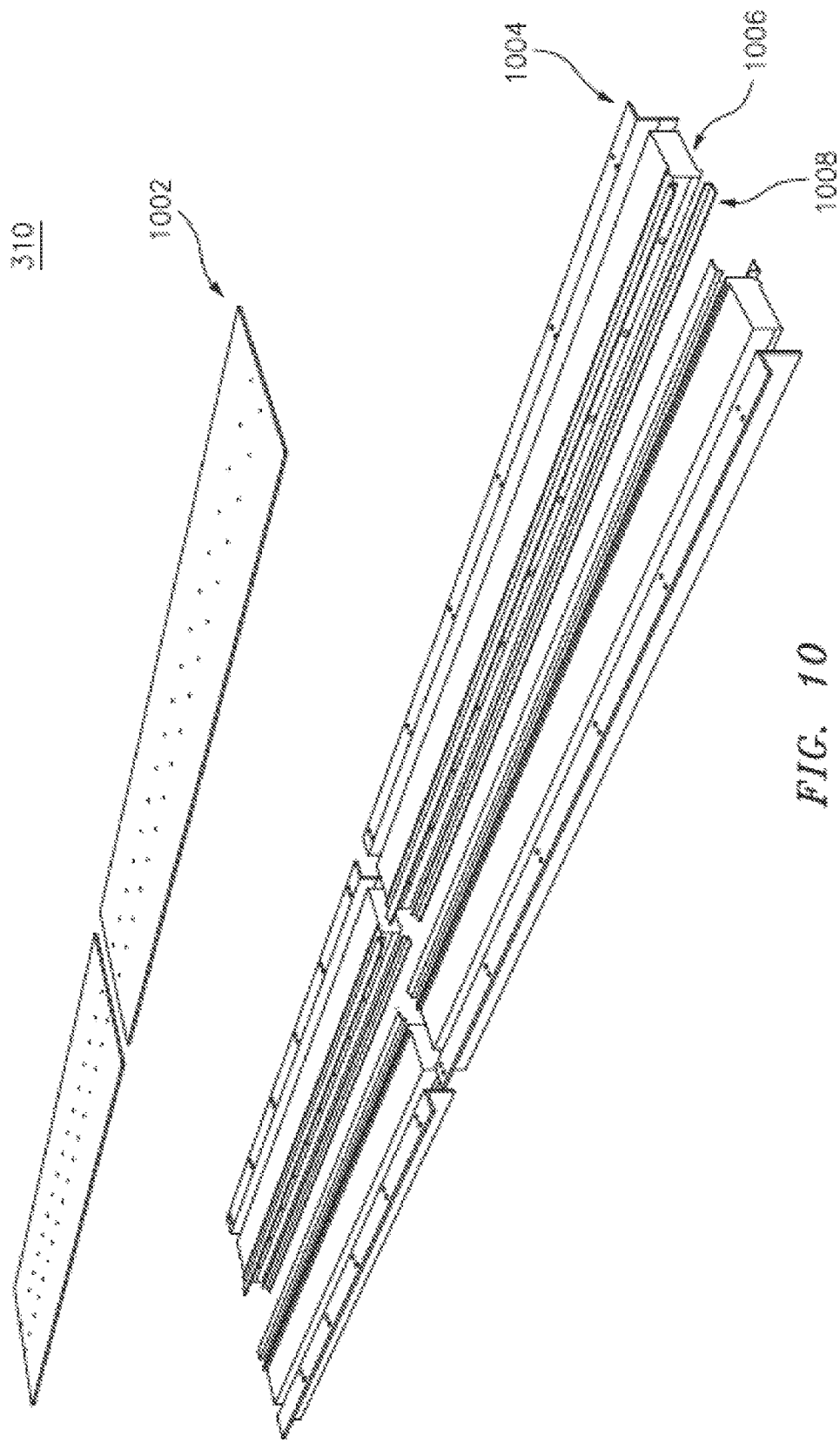
FIG. 10 illustrates a cover unit with watertight seals of a floodwall unit according to an embodiment of the present invention.

FIG. 10 shows a surface unit 310 according to an embodiment of the present invention. The surface unit 310 includes a cover plate 1002, an attachment part 1004, an extension part 1006, and a seal part 1008. The cover plate 1002 is configured to extend between the two attachment parts 1004, thus covering the housing unit 304 when the floodwall panel is retracted into the housing unit. The attachment part 1004 is used to attach the extension part 1006 to the housing unit 304. The extension part 1006 covers the gap between the upper section of the floodwall panel and the side walls of the housing unit 304 because the upper section of the floodwall panel may not occupy the entire span between two side walls of the housing unit 304. The seal part 1008 helps to form a watertight contact between the extension part 1006 and the floodwall panel 800. The extension part 1006 and the attachment part 1004 may be made of same materials or different materials. In one embodiment, the attachment part 1004 is made of a steel angle, and the extension part 1006 is made of plastic or rubber, such as Acetal. Acetal, whose chemical name is polyoxymethylene, is an engineering thermoplastic that has high stiffness, low friction and excellent dimensional stability.

Figure 10A:
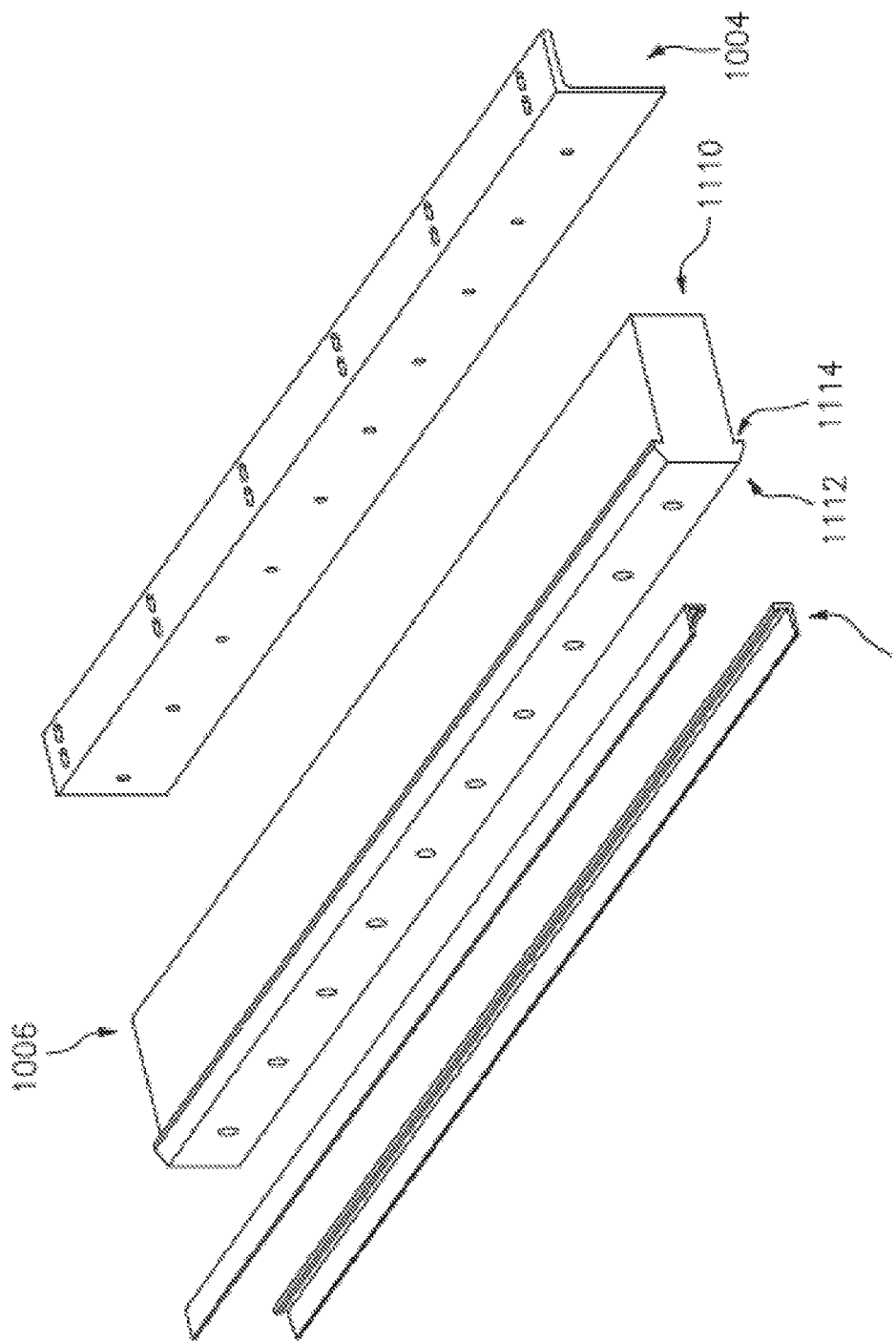
FIG. 10a illustrates seals of the cover unit of FIG. 10 according to an embodiment of the present invention.
Figure 10B:
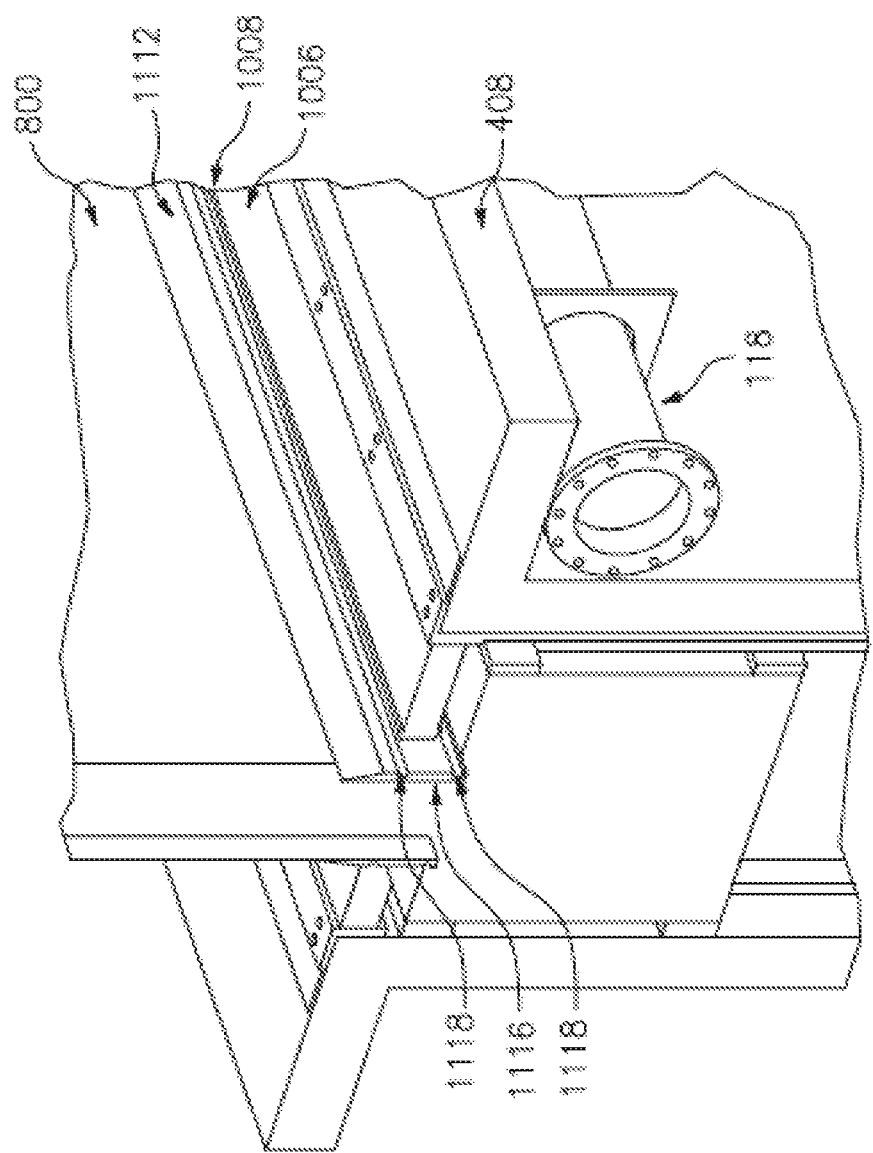
FIG. 10b illustrates the horizontal seals between the cover unit of FIG. 10 and the floodwall panel according to an embodiment of the present invention.

FIGS. 10a and 10b show the seal between the surface unit and the floodwall panel according an embodiment of the present invention. As shown in FIG. 10a, the extension part 1006 has a first end 1110 that fits tightly with the attachment part 1004. The extension part 1006 has a second end 1112 that is configured to retain the seal 1008. In one embodiment, the seal 1008 has a finger-like configuration, while the second end 1112 is T-shaped with a plurality of grooves 1114 that retain the seal 1008. As shown in FIG. 10b, when the floodwall panel 800 is in a raised position, the horizontal seal 1116 of the floodwall panel is in contact with the seal 1008 of the surface unit 310. The horizontal seal 1116 has a beveled part 1112 that is used to guide the seals 1008 into a plurality of grooves 1118. The extension part 1006 is also pushed tightly against the horizontal seal 1116 to prevent water from entering the housing unit.

Figure 11:
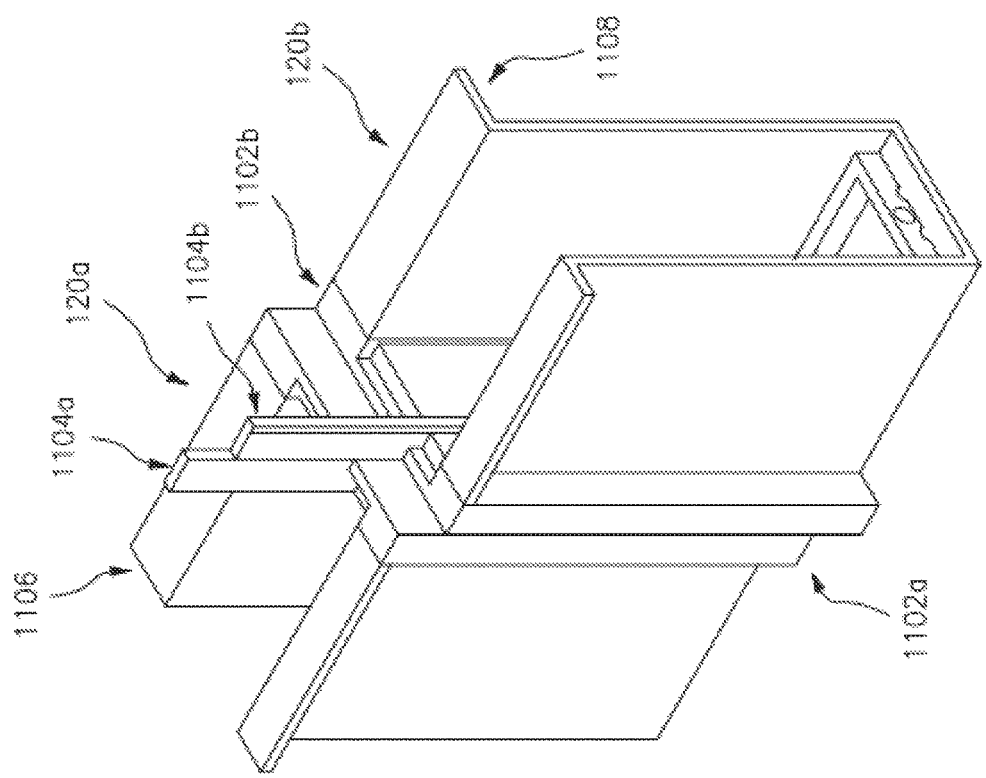
FIG. 11 illustrates connections between two floodwall units having different elevations according to an embodiment of the present invention.

FIG. 11 shows an attachment between adjacent housing units according to an embodiment of the present invention. The adjacent housing units 120a and 120b are placed at similar levels in most situations. But, they may be placed at different elevations due to the conditions of the foundation, such as the slope of the site, which causes the projections 1106 and 1108 on the respective housing unit to be offset from each other. This offset between two housing units 120a and 120b creates gaps between adjacent floodwall panels in raised positions. To address this issue, the housing units 120a and 120b may further include end parts 1102a and 1102b and two end posts 1104a and 1104b. The two end parts 1102a and 1102b mate with each other and form a watertight contact. The two end posts 1104a and 1104b are installed on top of the end parts to cover any gaps caused by the offset. When the floodwall panel is raised, the floodwall panel forms a watertight contact with the end parts 1102 and the posts 1104.

Figure 12:
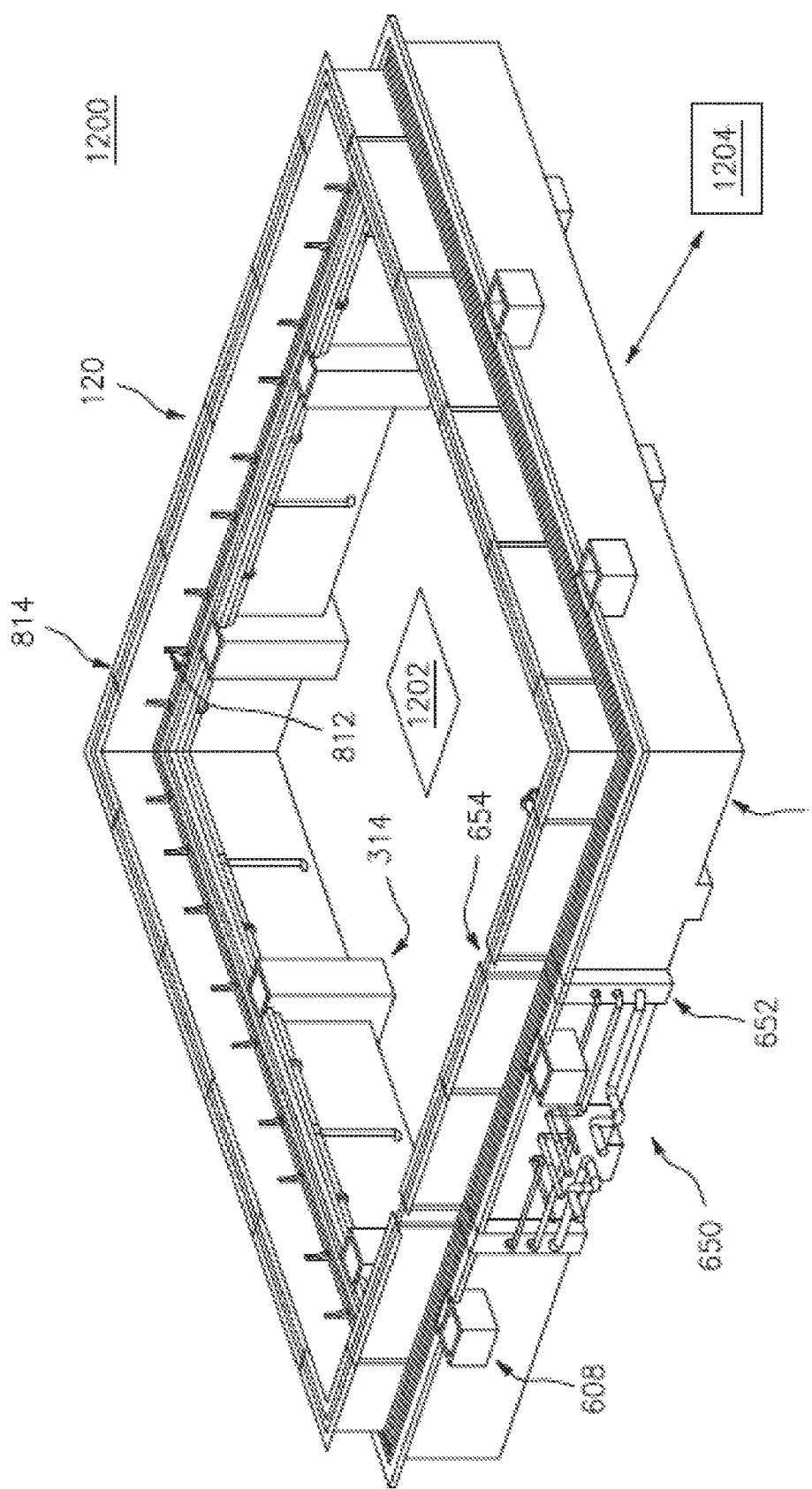
FIG. 12 illustrates a floodwall system forming an enclosure according to an embodiment of the present invention.

FIG. 12 shows a raised floodwall system 1200 forming an enclosure according to an embodiment of the present invention. The floodwall panels 120 are in a raised position with the support legs 812 released and engaged with the surface unit to support the floodwall panel 120. The floodwall panels have side seals 814 that cover gaps between adjacent floodwall panels. The exit segment 650 of the floodwall system is used as an ingress/egress point and provides utility openings in its fixed underground posts 652. The above-ground removable pillars 654 fit tightly with adjacent floodwall panels. The housing units 304 are buried underground. A plurality of pumps 314 are installed at predetermined locations. The passive inlets 608 are disposed at the flood-side of the floodwall system to allow flood water to enter the housing unit 304.

In one embodiment, the floodwall panels are raised manually by workers. In another embodiment, the floodwall panels are raised by a crane. In another embodiment, the floodwall panels are raised by the actuators inside the housing unit. In another embodiment, the floodwall panels are raised by water inside the housing unit, providing buoyant force. The water may be flood water, municipal water, or both. In another embodiment, the floodwall panels are raised by any combination of the above-discussed means.

The floodwall system 1200 as shown in FIG. 12 may be used to protect a building 1202 or even a city from flood damage. In one embodiment, the floodwall system 1200 may be controlled remotely by a controller 1204 that communicates with the floodwall system wirelessly. When the floodwall panels 120 need to be raised, an operator uses the controller 1204 to operate the floodwall system 1200. Upon receiving an instruction sent by the controller 1204, a local processor controls the actuators inside the housing units 318 to raise the floodwall panels sequentially or simultaneously. The height of the floodwall panel may be sensed and determined through a plurality of data, including the movement of the actuators, the number of rotations of the pulleys, or the travel distance of the cables/chains. In one embodiment, the controller may be a dedicated control center, a computer, a laptop, or a smartphone.

FIG. 12a illustrates an embodiment of the pillar 654 of FIG. 12. The pillar 654 includes a hinge 6542 at the bottom of the pillar 654. The pillar 6542 is rotatable around the hinge 6542 to ease the installation process. In addition, the pillar 654 further includes side seals that are in contact with adjacent floodwall panels to prevent water from entering a protect area. To further ease the installation process, a hydraulic actuator or an electric motor may be connected with the pillar 654 to facilitate the movement of the pillar 654.

FIG. 13 shows a retractable floodwall system installed on an existing floodwall structure according to an embodiment of the present invention. In this embodiment, the retractable floodwall system acts as both a levee extension and a levee support mounted behind the existing fixed floodwall. An existing floodwall structure 1302 is typically an above-ground and permanent structure with a fixed height. The structure 1302 can stop flood only when the water is below its height. The integrity of the structure 1302 may be reduced due to years of use and previous flood events, making it susceptible to failure, as when the flood protection system in New Orleans failed because of Hurricane Katrina. The floodwall system of the present invention may be used to strengthen and extend the height of an existing flood prevention structure.

As shown in FIG. 13, the retractable floodwall system 1304 may be attached to the existing structure 1302. To properly support the floodwall system 1304, additional foundation 1306 may be added to the existing foundation 1310. When needed, the foundation 1306 may also be supported by the batter piles 1308 that are driven into the ground. It is noted that the floodwall system 1304 in FIG. 13 is above the ground.

Figure 14:
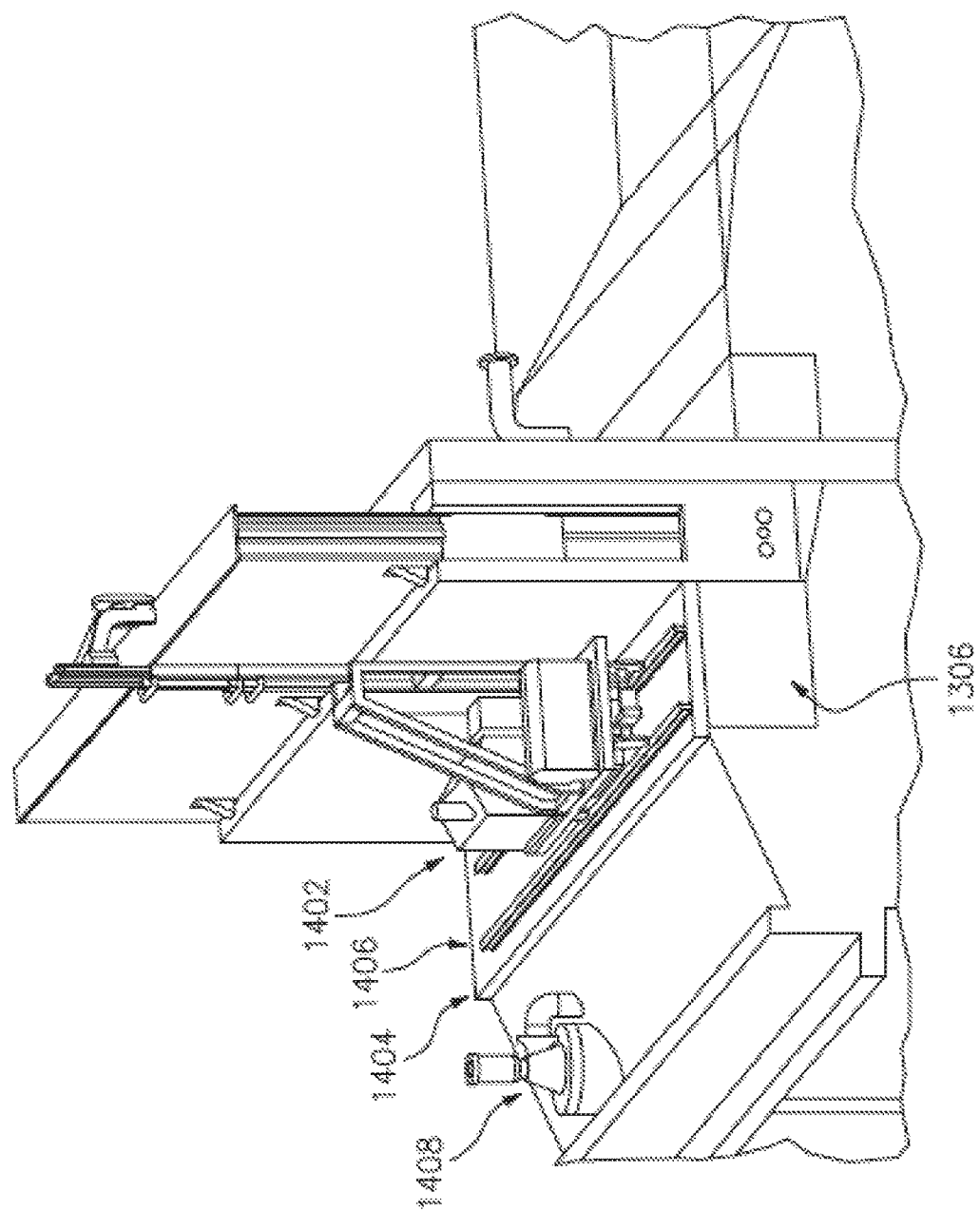
FIG. 14 illustrates a trolley for raising a floodwall panel according to an embodiment of the present invention.

FIG. 14 shows a deployment device for the floodwall system according to an embodiment of the present invention. As discussed above, the floodwall system may be used along bodies of water with a long shoreline, for example, along the banks of a river flowing through a city. In these situations, the floodwall system needs to cover a distance that is a few miles long or even hundreds of miles long. When each floodwall unit is equipped with an electro-mechanical mechanism, the construction and maintenance cost could be very high. In one embodiment shown in FIG. 14, the need for individual actuation mechanism is reduced. In this embodiment, the floodwall system may further include an automated deployment device to raise and lower the floodwall panels. As a result, actuators inside each individual housing unit become optional. The automated deployment device 1402 may be a trolley running along tracks 1406 and having an on-board lifting mechanism. The tracks 1406 are installed on a surface 1404, which sits on the foundation 1306. The foundation 1306, the surface 1404, and the tracks 1406 are constructed along the floodwall system. The automated deployment device 1402 can travel the length of the floodwall system along the tracks. The automated deployment device 1402, working like a train, may raise and lower the floodwall panels one by one without any intervention from a human worker. As the actuators inside the housing units are not required, this deployment device and method may lower the construction cost and reduce the maintenance expense associated with the floodwall system.

FIG. 14a shows the automated deployment device according to an embodiment of the present invention. The automated deployment device includes a fuel storage 1420, a lifting mechanism 1422, an actuator 1428, and a controller 1424. The fuel storage 1420 may be a fuel tank, a battery, or any other suitable source. The fuel storage 1420 provides fuel to the actuator 1428, which may be an engine or an electric motor. Alternatively, electrical power can be supplied to the deployment device via an electrified rail. The lift mechanism 1422, which is connected with the actuator 1428, lifts and lowers the floodwall panels. The controller 1424 may include a processor that controls the operation of the lifting mechanism 1422 and the actuator 1428. The controller may also include a plurality of sensors that obtain various operation data, including the amount of fuel in the fuel storage 1420, the status of the actuator 1428, the movement of the lifting mechanism, and the height of the floodwall panel. In one embodiment, a GPS (Global Position System) sensor may be used to determine the locations of the trolley and the panel. The controller 1424 may also include a communication interface that transmits information to a remote control center 1204 and receives instructions from the remote control center 1204. The lifting mechanism 1422 includes an arm 1426 that mates with the latch mechanism 816 of a floodwall panel. After the arm 1426 is securely attached with the latch mechanism 816, the floodwall panel can be safely lifted or lowered.

FIG. 14b shows the arm 1426 and the latch mechanism 816 according to an embodiment of the present invention. The arm 1426 includes a tubular member 1432 that has a projection 1430 and a beveled end 1434. The tubular member 1432 and the projection 1430 mate with a socket 1436 of the latch mechanism 816 of a floodwall panel. After the tubular member 1432 and the projection 1430 are received by the socket 1436, the arm 1426 rotates the tubular member 1432 and the projection 1430 from a receiving position 1438 to a locking position 1440, thus forming a secure attachment between the arm 1426 and the latch mechanism 816.

According to an embodiment of the present invention, the floodwall system includes floodwall panels that are stored beneath ground to provide unobstructed access and views of a protected area. The system may be deployed to create a watertight enclosure. The system may be designed to be formed by sections, which are individually raised. According to one embodiment, the panels are from 7 feet to 30 feet in length. According to a preferred embodiment, the panels are between 10 feet and 15 feet long. According to a most preferred embodiment, the panels are about 10 feet long. The height of each section may range from 1 foot to 30 feet. By providing a counter weight, each section may be lifted quickly by a relatively small electric motor. According to one embodiment, a panel can be lifted by a two horsepower motor in 30 seconds. As an alternative to or in addition to an electric motor, buoyant force provided by water; either municipal water or flood water may also be used to lift the wall panel by filling the housing unit with water. As the floodwall panel is configured to have hollow chambers, the buoyant force is able to lift the panel with or without the assistance of an electric motor.

Figure 15:
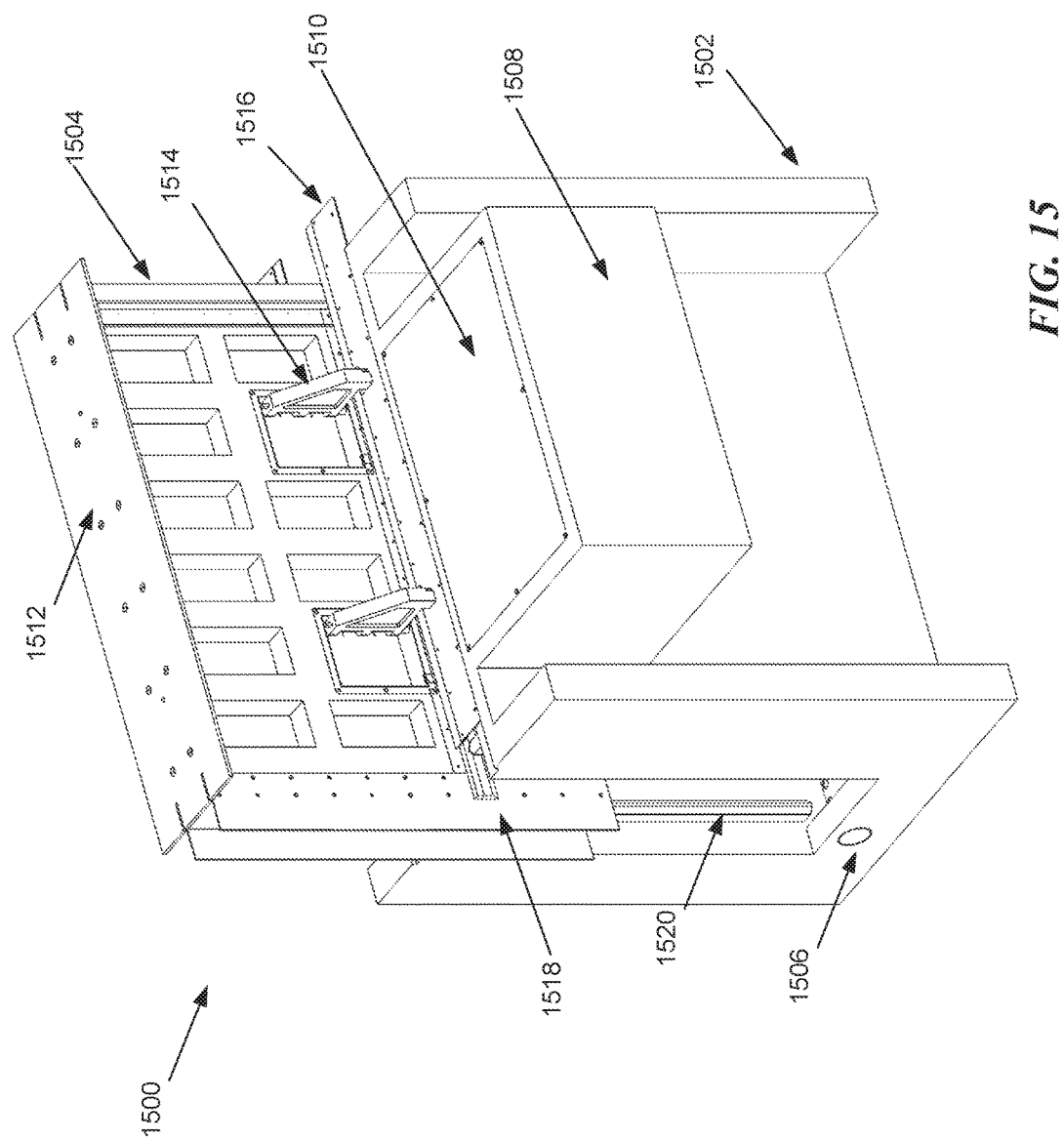
FIG. 15 illustrates a retractable floodwall unit according to an embodiment of the present invention.

FIG. 15 illustrates a retractable floodwall unit 1500 according to an embodiment of the present invention. The retractable floodwall unit 1500, which is raised full way, includes a foundation unit 1502, a floodwall panel 1504, and a plumbing system 1506. The foundation unit 1502 includes an enclosure 1508 that is covered by a lid 1510. The enclosure 1508 forms a housing unit that contains a power system (not shown in FIG. 15) of the floodwall unit. The power system raises and lowers the floodwall panel 1504. The plumbing unit 1506 is used to remove water from the foundation unit 1502. The foundation unit 1502 also has a plurality of guiding tracks 1520 that is attached to the side walls of the foundation unit and is used to guide the floodwall panel 1504 in its upright position. The foundation unit also has a plurality of seals 1516 that is flushed with the top surface of the foundation unit. The plurality of seals 1516 are in close contact with the horizontal seals 1518 of the floodwall panel when the flood wall panel is in a raised position such that water is prevent from entering the foundation unit. In addition, the plurality of seals 1516 are in close contact with the top seal 1512 positioned underneath the drive over top of the floodwall panel when the floodwall panel is in a stowed position (fully retracted into the foundation unit) such that the water is prevented from entering the foundation unit. As shown in FIG. 15, the floodwall panel 1504 has a plurality of support legs 1514 that sits on the seals 1516 to support the floodwall panel 1504 in a raised position.

Figure 16:
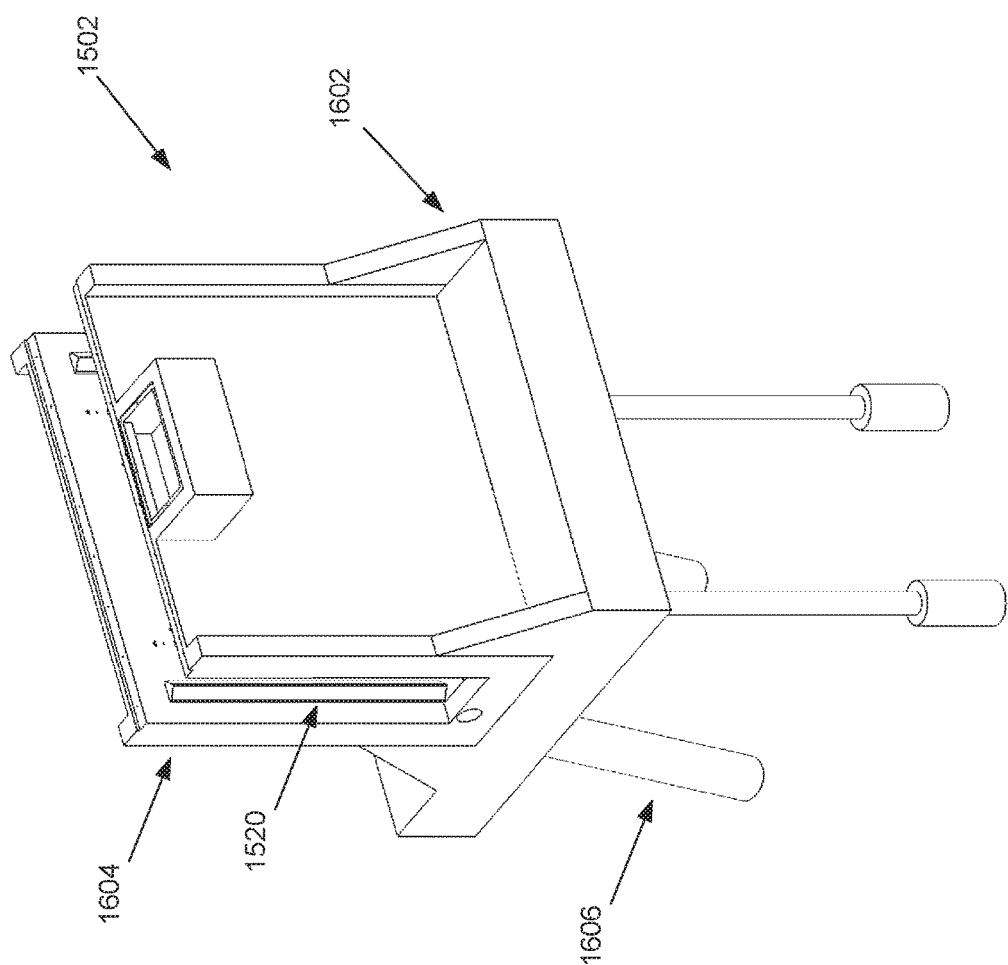
FIG. 16 illustrates a foundation unit according to an embodiment of the present invention.
Figures 16A, 16B, 16C:
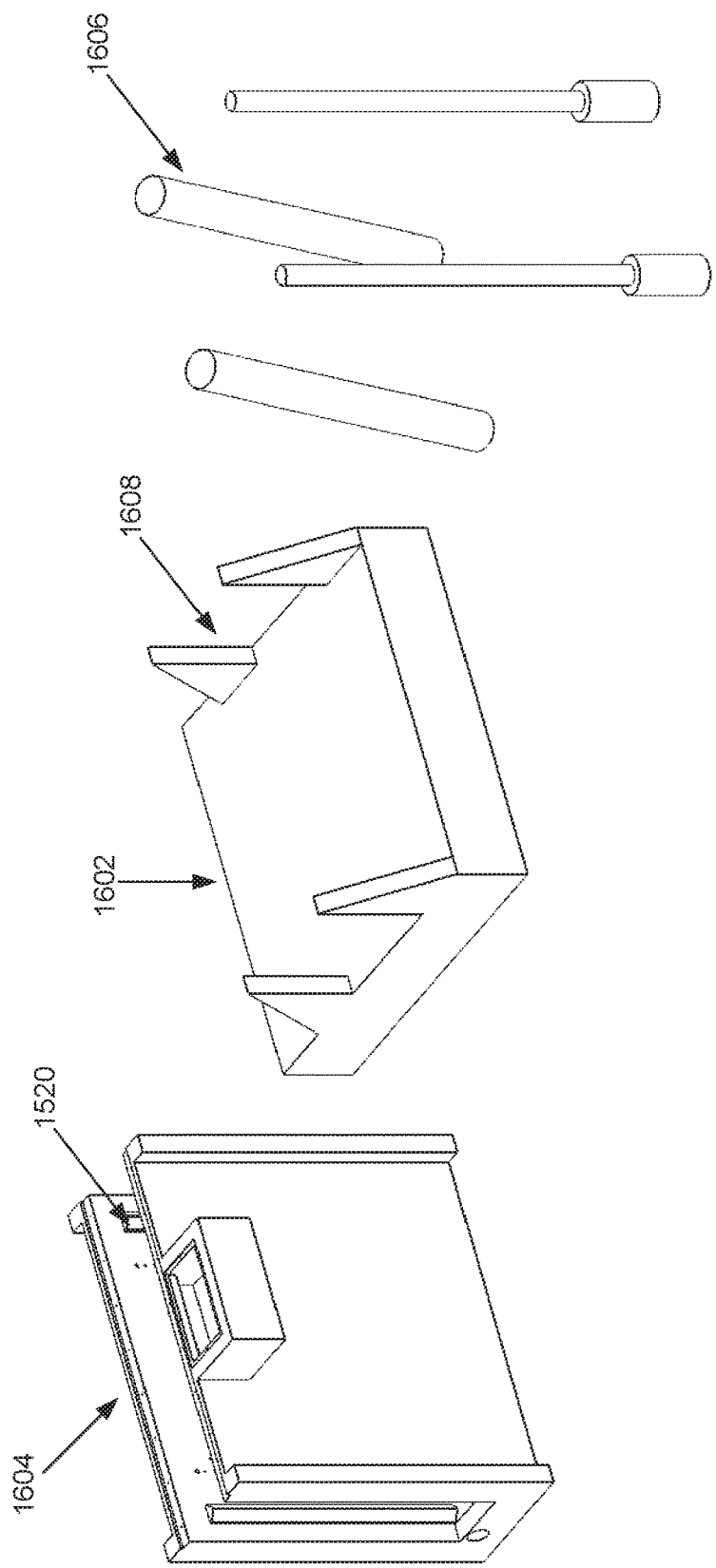
FIG. 16a illustrates a housing unit of the foundation unit according to an embodiment of the present invention.
FIG. 16b illustrates a base of the foundation unit according to an embodiment of the present invention.
FIG. 16c illustrates anchors of the foundation unit according to an embodiment of the present invention.
Figure 16D:
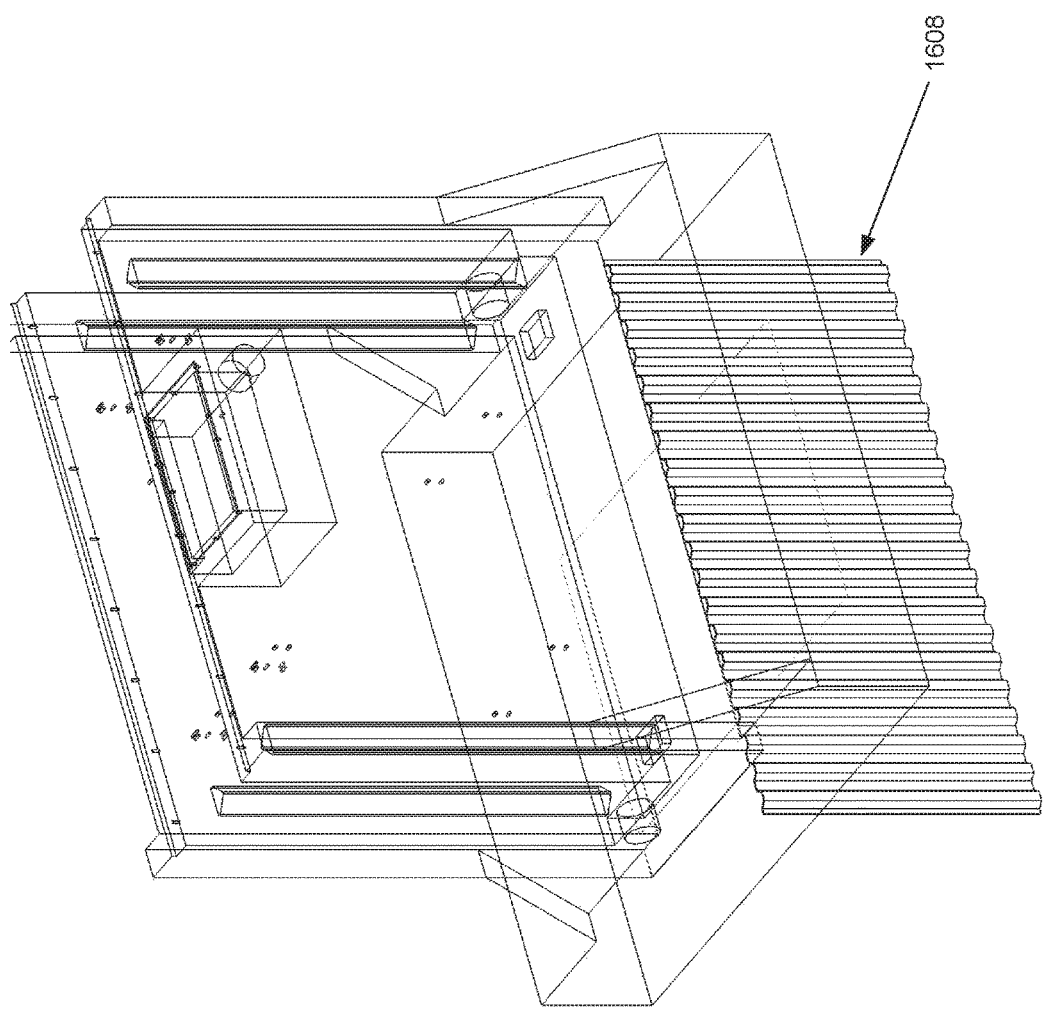
FIG. 16d illustrates sheet piles for supporting the foundation unit according to an embodiment of the present invention.

FIG. 16 illustrates a foundation unit 1502 according to an embodiment of the present invention. The foundation unit 1502 has three parts: a plurality of anchors 1606, such as batter piles, in the ground to support a base 1602, which, in turn, supports a housing unit 1604. The base and the housing unit may be pre-fabricated before installation and assembled at site or poured with concrete cast in place with temporary forms for long runs of the foundation. In one embodiment, the base and the housing unit may be made of stainless steel or pre-cast concrete. FIG. 16a illustrates the housing unit 1604. FIG. 16b illustrates the base unit 1602. The housing unit 1604 may be attached to the base unit 1602 in any suitable ways, such as by nuts and bolts or epoxy. In one embodiment, the base 1602 has pre-formed slot 1608 that mates the bottom section of the housing unit 1604 to secure the housing unit 1604 to the base 1602. FIG. 16c illustrates the plurality of anchors 1606. FIG. 16d illustrates another embodiment of the foundation, in which the base 1602 may be supported by a plurality of sheet piles 1608.

Figure 17:
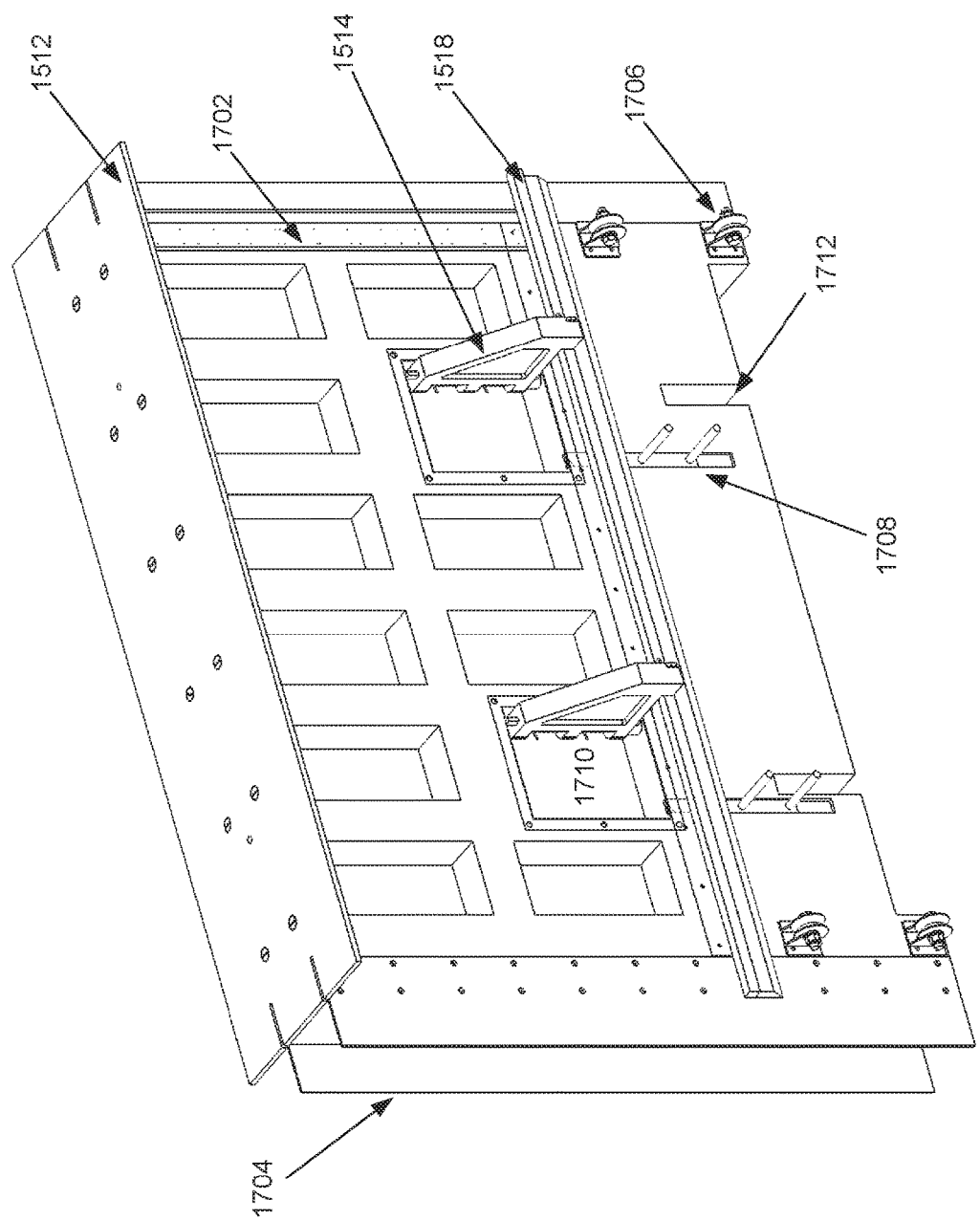
FIG. 17 illustrates a floodwall panel according to an embodiment of the present invention.

FIG. 17 illustrates a floodwall panel 1504 according to an embodiment of the present invention. The floodwall panel 1504 has a water-impermeable unit 1702 that is configured to stop water, a top seal 1512, a plurality of vertical seals 1704, and a plurality of horizontal seals 1518. In addition, the floodwall panel 1504 includes a plurality of support legs 1514 installed in the housing units 1710. The support legs 1514, when the floodwall panel is at the stowed position, is spring-loaded and locked in the housing units 1710 by a latch mechanism 1708. When the floodwall panel is raised, a latch mechanism 1708 may be triggered by a projection on the foundation unit, which allows the spring-loaded support legs to be released from the housing units 1710. The floodwall panel also has a plurality of guides 1706 that mate with the guide tracks 1520 to keep the floodwall panel in an upright position. In one embodiment, the plurality of guides 1706 may be guide rollers. In another embodiment, the floodwall panel also has a plurality of notches 1712 that are configured to secure actuation mechanism in the floodwall panel. In one embodiment, the horizontal seal 1518 includes by a gasket that is attached to a support based pre-formed in the water-impermeable unit 1702. In one embodiment, the vertical seals, the horizontal seals, and other seals of the floodwall unit are all planar-shaped to ease the fabrication and installation process. Other more complex shaped seals may also be used with the present floodwall unit, but would make the fabrication and installation process more complicated.

Figure 18:
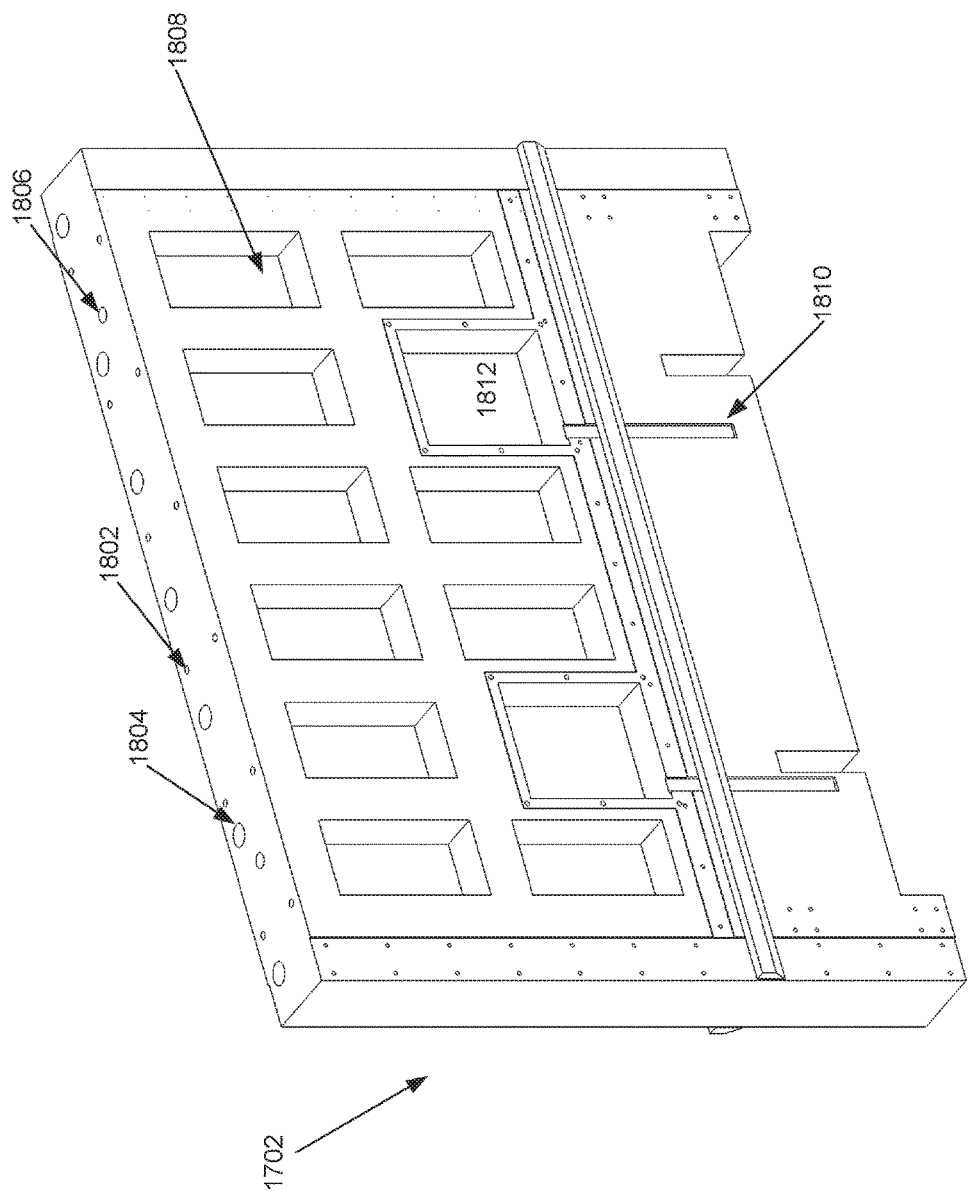
FIG. 18 illustrates a pre-formed concrete unit of the floodwall panel according to an embodiment of the present invention.

FIG. 18 illustrates the water-impermeable unit 1702 of the floodwall panel according to an embodiment of the present application. The water-impermeable unit 1702 may be made of any suitable materials, such as steel, concrete, and molded plastic. In a pre-preferred embodiment, the water-impermeable unit 1702 is made of pre-cast concrete. To reduce the weight of the unit 1702, a plurality of voids 1808 may be formed in the unit on the dry side. In addition, the unit 1702 has a slot 1810 for accepting the latch mechanism 1708, a recess 1812 for accepting the housing unit 1710, and a plurality of steel inserts 1802, 1804, and 1806 for accepting fasteners.

Figure 19:
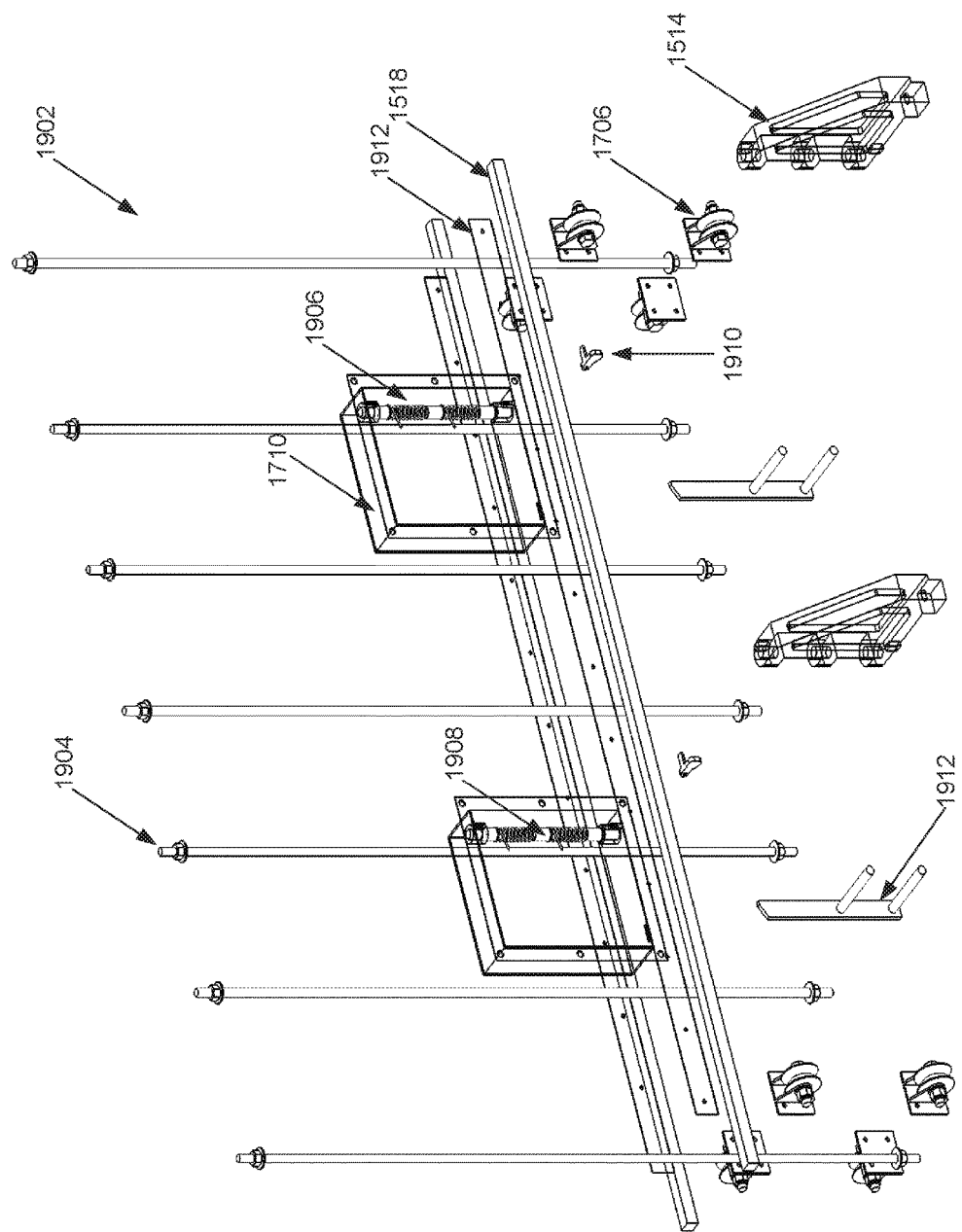
FIG. 19 illustrates a plurality of mechanical components of the floodwall panel according to an embodiment of the present invention.

FIG. 19 illustrates the mechanical components of the floodwall panel according to an embodiment of the present invention. The floodwall panel has a plurality of guide rollers 1706, a plurality of support legs 1514 that is spring loaded on an axle 1906 via a plurality of springs 1908 in the housing unit 1710, and a plurality of horizontal seals 1518 seated on top of horizontal projections molded into the full length of both sides of the flood wall. The horizontal seals are attached to the floodwall panel via a plurality of steel plates 1912 which act as smooth contact surfaces for the horizontal seals mounted below grade onto the foundation. The support legs are locked in the housing unit 1710 by a plurality of latch locks 1910, which may be released by a plurality of latching bar 1912. The floodwall panel also includes a plurality of post tension rods 1904 disposed in the steel inserts 1804.

Figure 20:
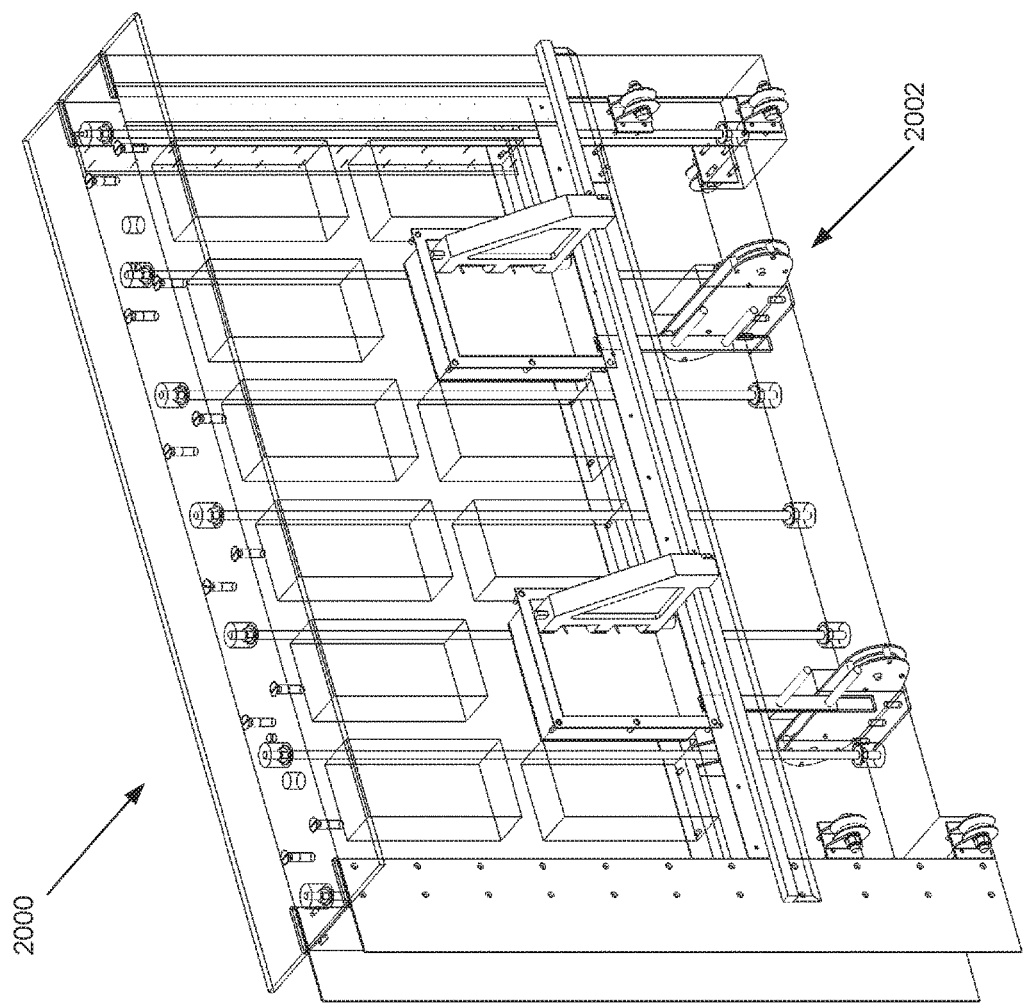
FIG. 20 illustrates a floodwall panel according to an embodiment of the present invention.

FIG. 20 illustrates a floodwall panel with installed mechanical parts according to an embodiment of the present invention. The floodwall panel 2000 further includes a lifting mechanism 2002 secured to the notch 1712. According to an embodiment, the lifting mechanism includes a lift sheave.

Figure 21:
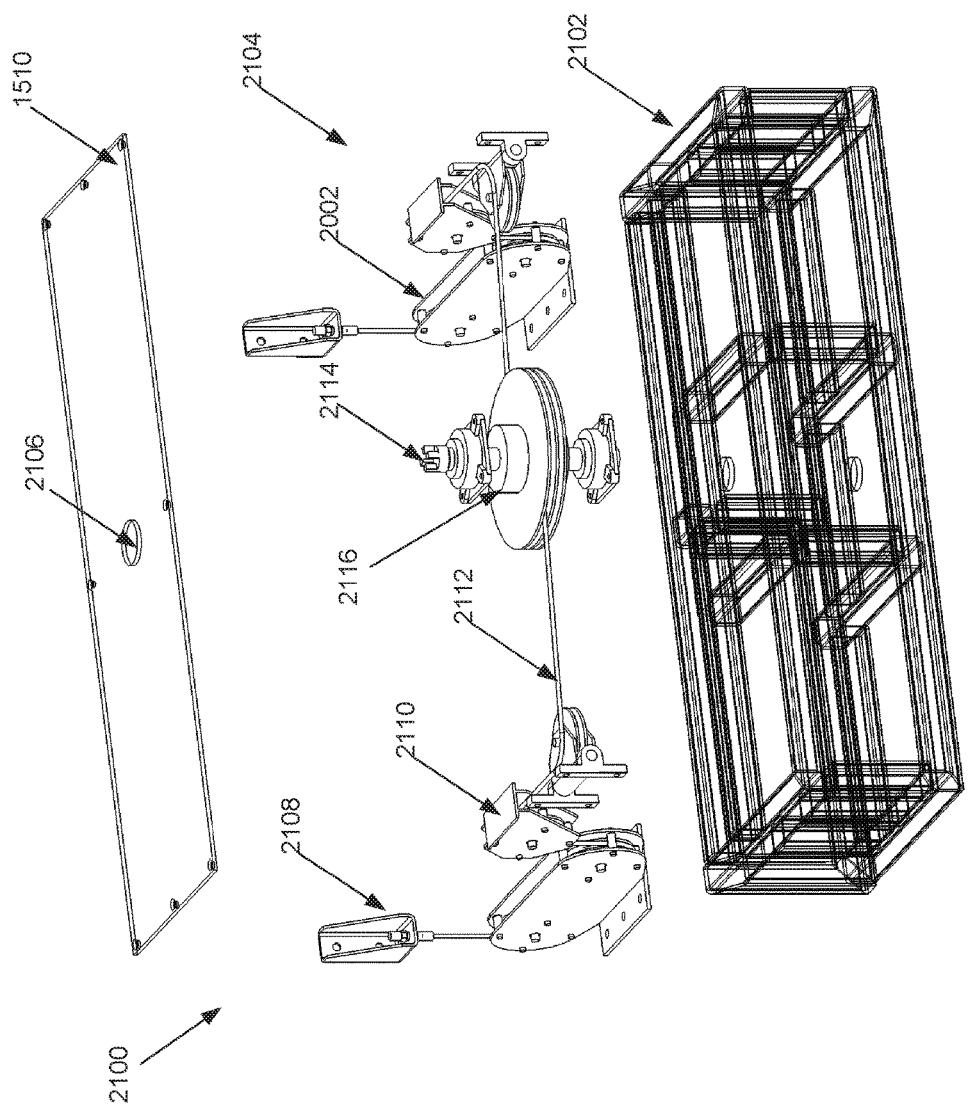
FIG. 21 illustrates a power system of the floodwall unit according to an embodiment of the present invention.

FIG. 21 illustrates a lifting system of the floodwall unit according to an embodiment of the present invention. The lifting system 2100 includes a frame 2102, a pulley system 2104, and a lid 1510. The frame 2102 is preferably made by steel to secure the mechanical components, such as a dual wire rope drum 2116, of the lifting system 2104 in the enclosure 1508 of the foundation unit. The lifting system 2104 includes a rotating unit 2116, such as a dual wire drum, that is connected with the sheave 2002 and a plurality of terminations 2108 and 2110 via a plurality of pulling cables 2112. The terminations 2108 and 2110 may be attached to side walls of the foundation unit, while the sheave 2002 is attached to the notch in the bottom of the floodwall panel. When the rotating unit 2116 is activated, the sheave 2002 will be raised or lowered, thus raising or lowers the floodwall panel. The rotating unit 2116 are connected with engagement means 2114 that are configured to engage with an external power system (not shown) to drive the rotating unit 2116. The lid 1510 has a perforation corresponding to the location of the engagement means to allow the external power system to engage the engagement means 2114.

Figure 21A:
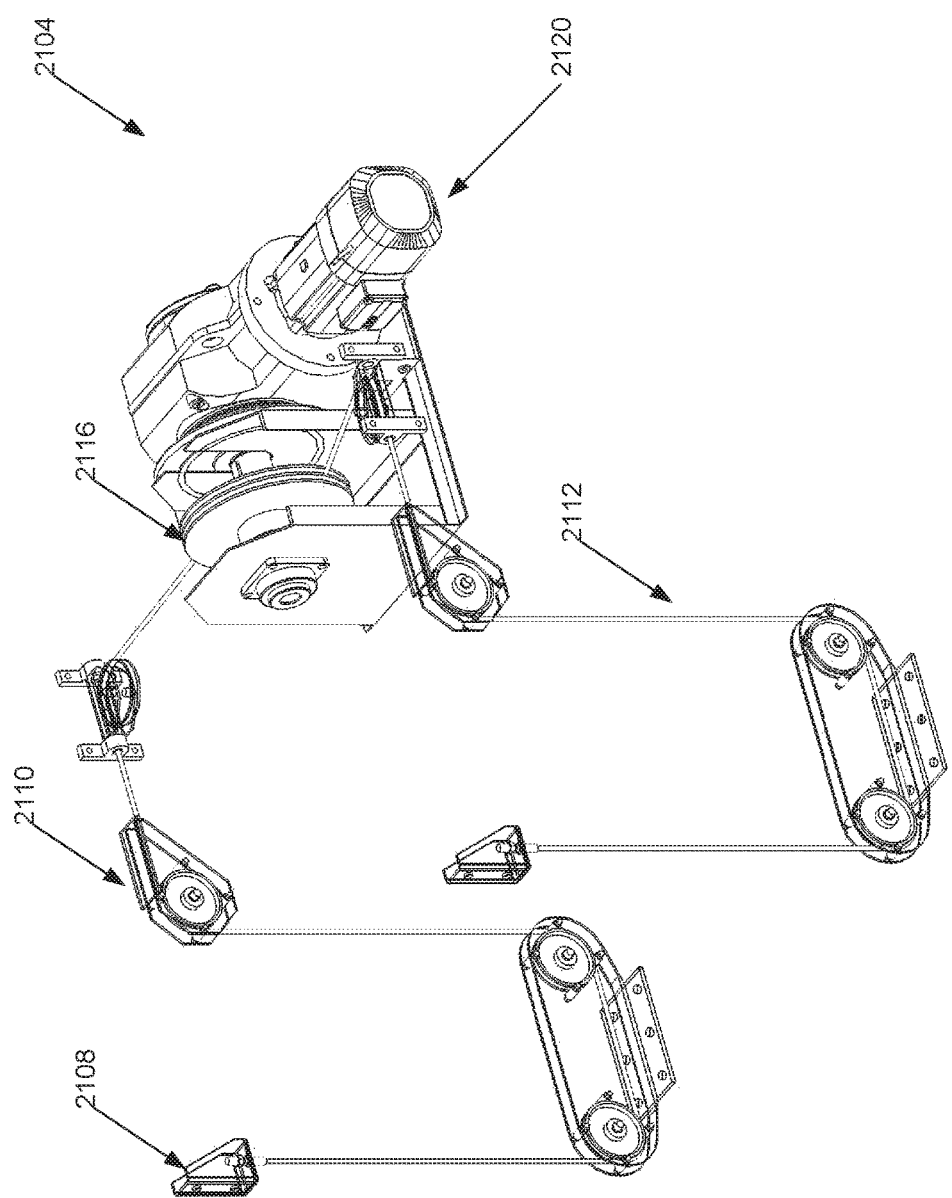
FIG. 21a illustrates a single-purchase winch system for operating the floodwall unit according to an embodiment of the present invention.

FIG. 21a illustrates a winch system for operating the floodwall unit according to an embodiment of the present invention. As shown in FIG. 21a, the rotating unit 2116 is now connected with a winch 2120 that is attached to the frame 2102. In this way, an external power system is not required to operate the floodwall unit. In an embodiment, the pulley system 2104 of FIG. 21a may further provide the engagement unit 2114, in addition to the winch 2120, such that the floodwall unit may be operable even when the winch fails. In one embodiment, the pulley system 2104 is a single purchase winch system in order to reduce the amount of power needed by the winch to raise or lower the floodwall panel.

Figure 22:
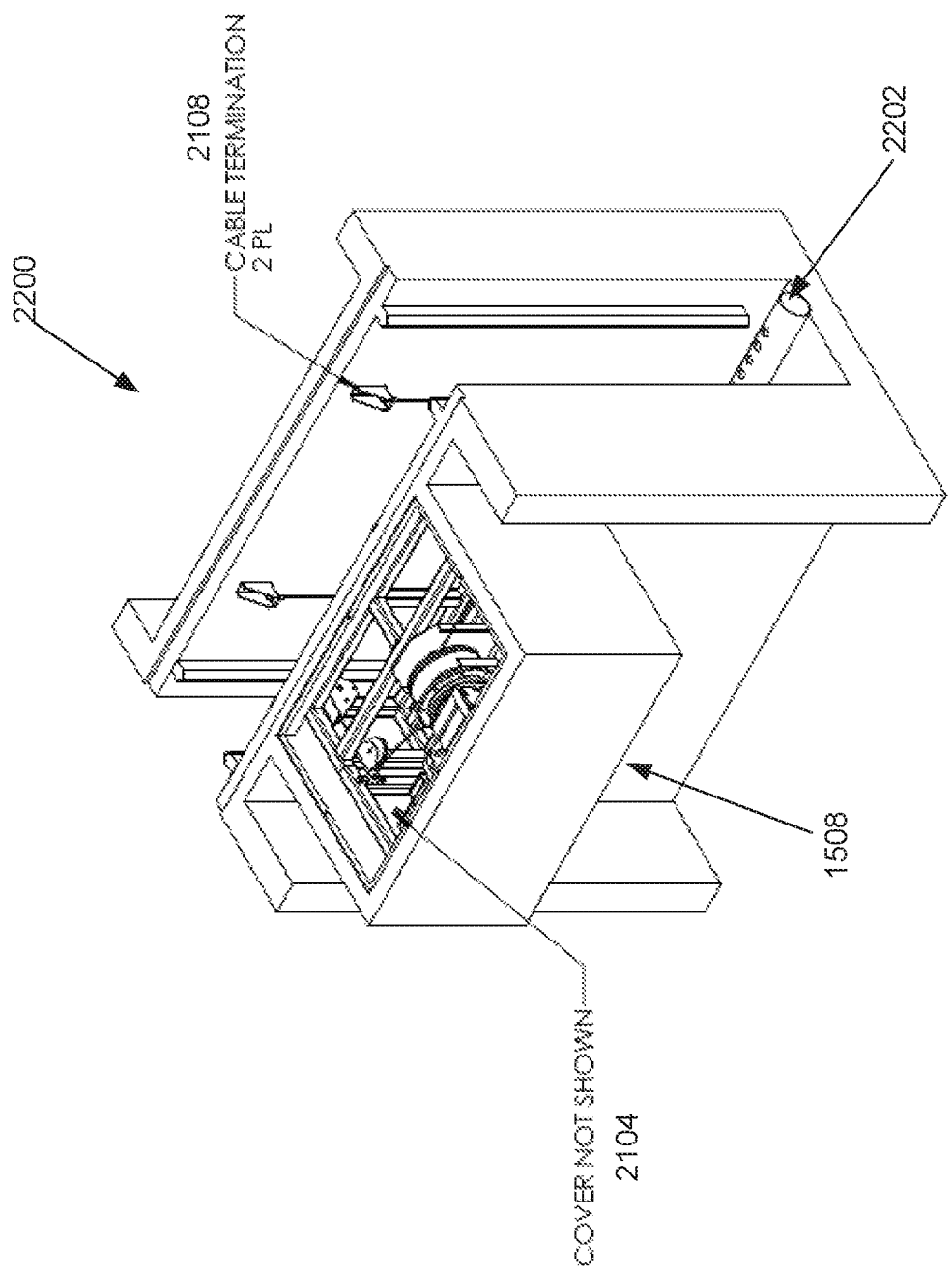
FIG. 22 illustrates an arrangement between the power system and the foundation of the floodwall unit according to an embodiment of the present invention.

FIG. 22 illustrates a foundation unit 2200 with installed power system according to an embodiment of the prevent invention. The actuator of the winch system 2104 is installed in the enclosure 1508 that is at the dry side of the floodwall unit. The terminations 2108 are fixed on the side walls of the foundation unit. As shown in FIG. 22, a sparger pipe is disposed at the bottom of the foundation unit to remove any water accumulated thereof.

FIG. 23a illustrates a floodwall panel in a stowed position according to an embodiment of the present invention. In a stowed position, the support legs 1514 are locked in the housing unit by the latch mechanism. As shown in FIG. 23a, the foundation unit includes an upper trigger contact 2304 that will stop the latching bar from moving upward, thus releasing the support legs 1514. The foundation unit also includes a lower trigger 2302 contact that will stop the latching bar from moving downward, thus pushing the latching bar into a locked position that locks the support legs 1514 in the housing unit. FIG. 23b illustrates a raised floodwall unit according to an embodiment of the present invention. Once the latch bar is triggered by the upper contact 2304, springs attached to the support legs push the support legs out of the housing unit and into the deployed positions to support the floodwall panel. To lower the floodwall panel into the stowed position, the support legs 1514 are manually pushed into the housing unit and temporarily locked by a trigger. When the latch bar together with the floodwall panel is lowered into the foundation and contacts the lower trigger 2302, the latch bar is pushed back into the housing unit to replace the temporary trigger as a long term locking mechanism.

Figure 24:
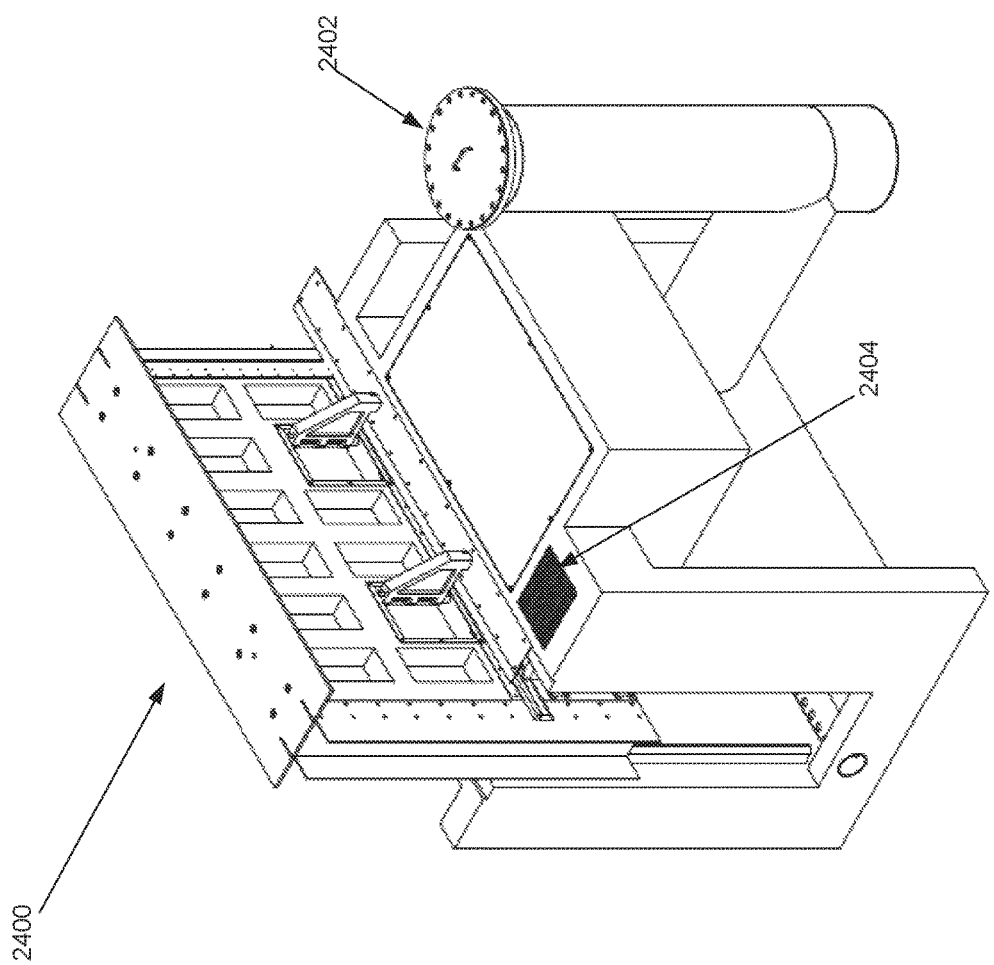
FIG. 24 illustrates a floodwall unit with a plumbing system according to an embodiment of the present invention.

FIG. 24 illustrates a floodwall unit with a plumbing system according to an embodiment of the present invention. The plumbing system 2402 is used to remove any water or deposits from the foundation unit. The plumbing system 2402 includes a pump unit at the dry side of the floodwall unit, a plurality of pipes in the foundation unit, and an outlet at the wet side of the floodwall unit. In one embodiment, the plumbing system is configured to remove any sediment at the bottom of the foundation unit. As flood water enters the foundation unit, it may also bring silt or mud into the system, which will deposit at the bottom of the foundation unit and could stop the floodwall panel from being fully lowered into the stowed position. The plumbing system 2402 may be connected with city water or other clean water sources and black flash the foundation unit to energize sediment or any deposits at the bottom back into the water and then pump the mixture of water and silt/deposit outside of the foundation unit. In another embodiment of the present invention, the plumbing system 2402 further includes an inlet 2404 at the dry side of the floodwall unit. It is likely that the dry side of the floodwall unit may have some excess water due to rain or the leakage of flood water from the wet side. Thus, there is a need to remove water from the dry side of the floodwall unit. The inlet 2404 allows water at the dry side of the floodwall unit to enter the plumbing system 2402 and being pumped into the wet side.

Figure 25:
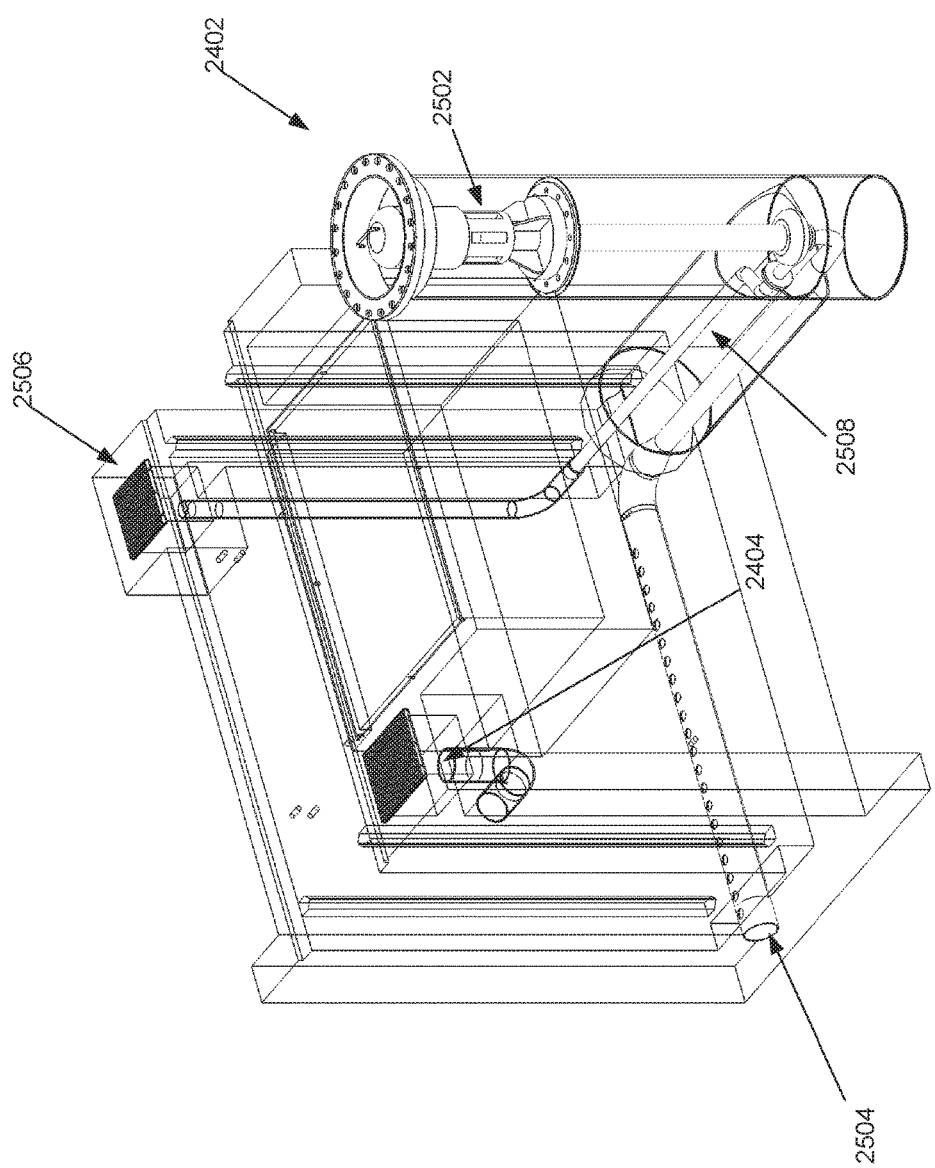
FIG. 25 illustrates mechanical components of the plumbing system of FIG. 24 according to an embodiment of the present invention.

FIG. 25 illustrates a configuration of the plumbing system 2402 according to an embodiment of the present invention. The plumbing system 2402 has a pump unit 2502, a plurality of inlet pipes 2504, a plurality of outlet pipes 2508, a wet side outlet 2506, and a dry side inlet 2404. In operation, the pump unit 2502 circulates water from the inlet pipes to the outlet pipes and eventually pumps the water through the outlet 2506 back to the wet side of the floodwall unit. In one embodiment, the outlet 2506 includes a one-way check valve that prevents water from reentering the plumbing system 2402. The plumbing system 2402 is capable of transferring both water in the foundation unit and water in the dry side to the wet side of the floodwall unit.

Figure 26:
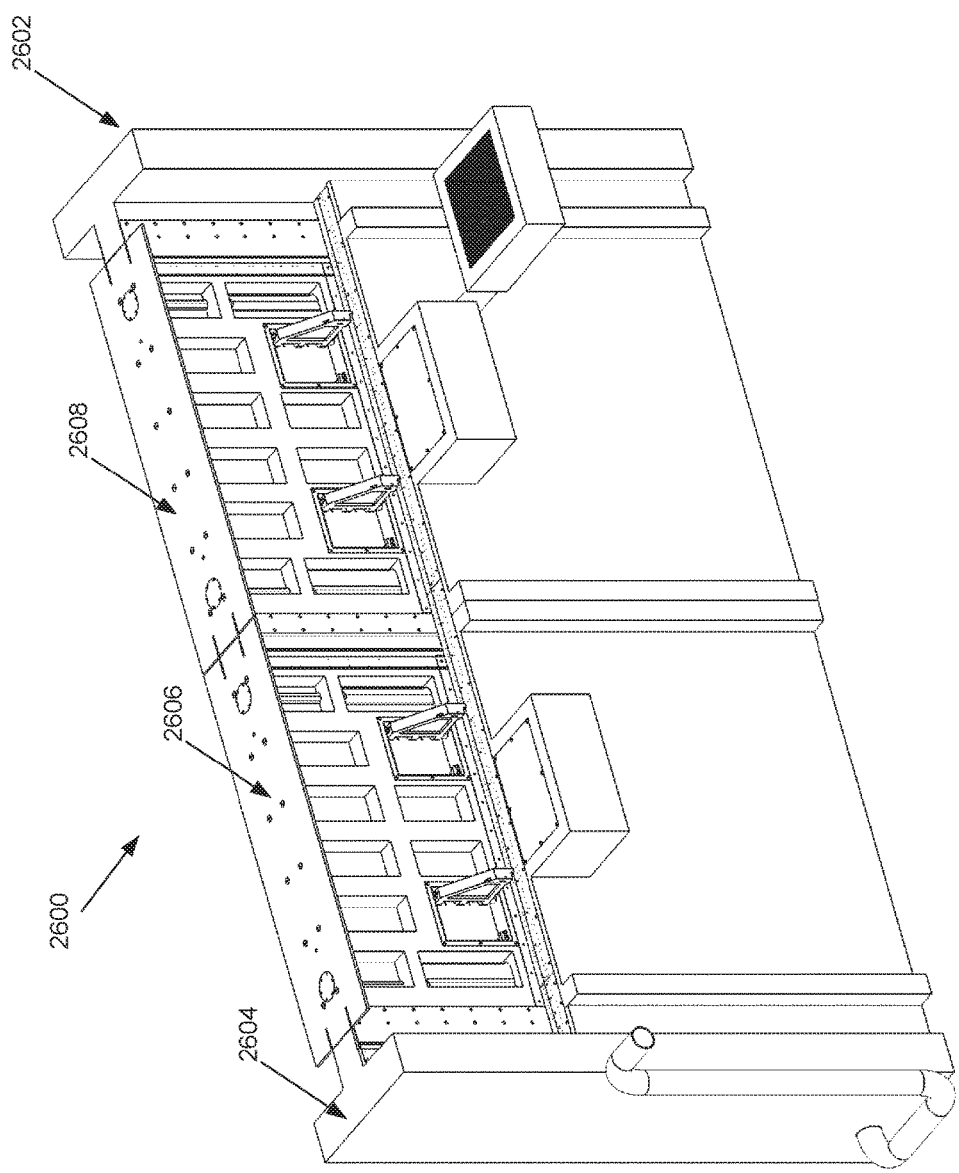
FIG. 26 illustrates an entrance unit with retractable floodwalls according to an embodiment of the present invention.
Figure 26A:
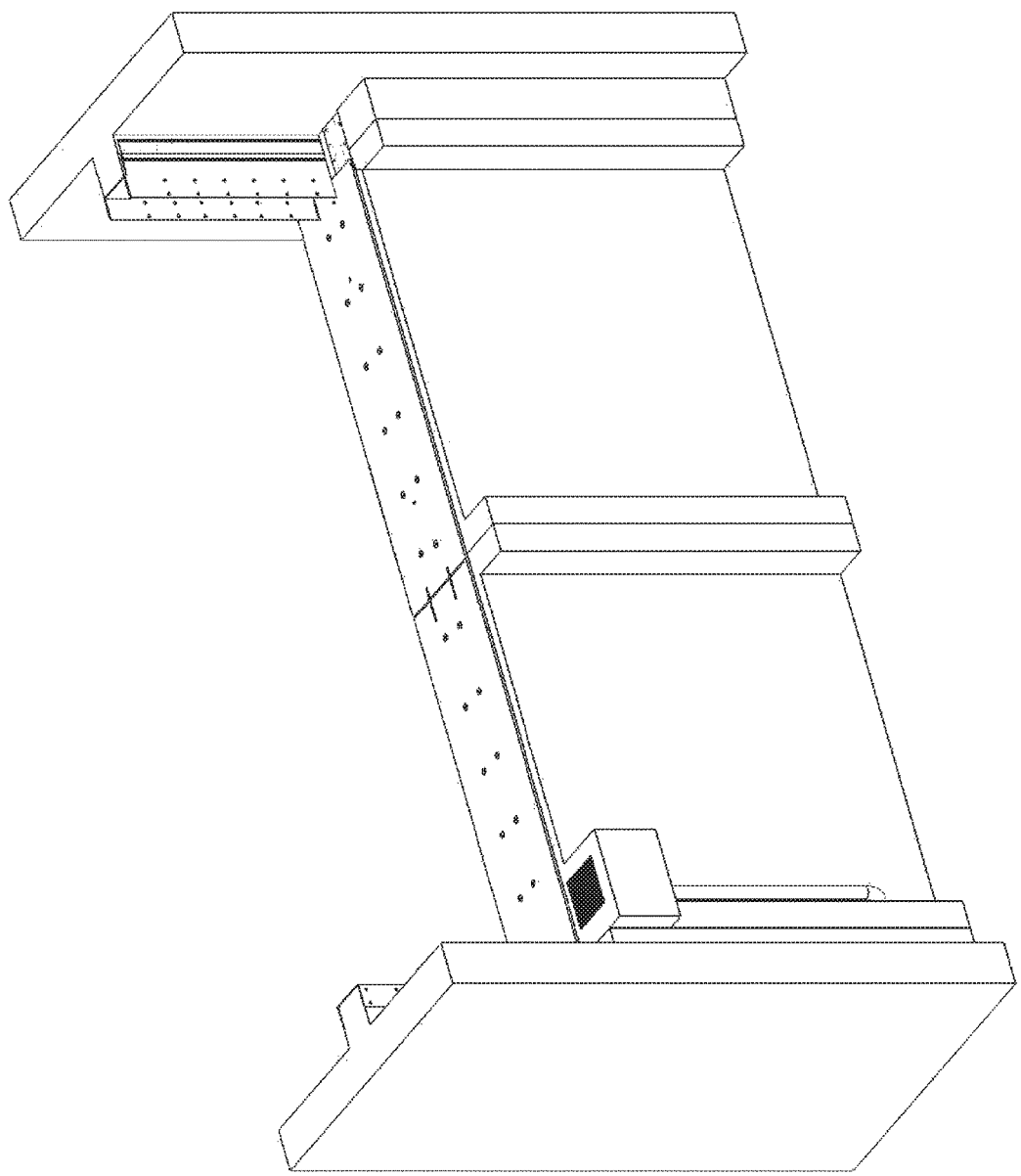
FIG. 26a illustrates the entrance unit with the retractable floodwalls in a stowed position according to an embodiment of the present invention.

FIG. 26 illustrates an entrance unit formed by a plurality of retractable floodwall units according to an embodiment of the present invention. The entrance unit 2600 includes a plurality of floodwall units 2606 and 2608 and a plurality of end columns 2602. The floodwall units 2606 and 2608 have retractable wall panels. The end columns 2602 and 2604 are standstill structures that provide a transition from the floodwall units 2606 and 2608 with other existing structures. The end columns 2602 or 2604 have a projection 2610 that is configured to from a watertight contact with the vertical seals of the floodwall unit. FIG. 26a illustrates the entrance unit when the floodwall units 2606 and 2608 are in the stowed position, which allows pedestrian and vehicular traffic to pass over.

Figure 27:
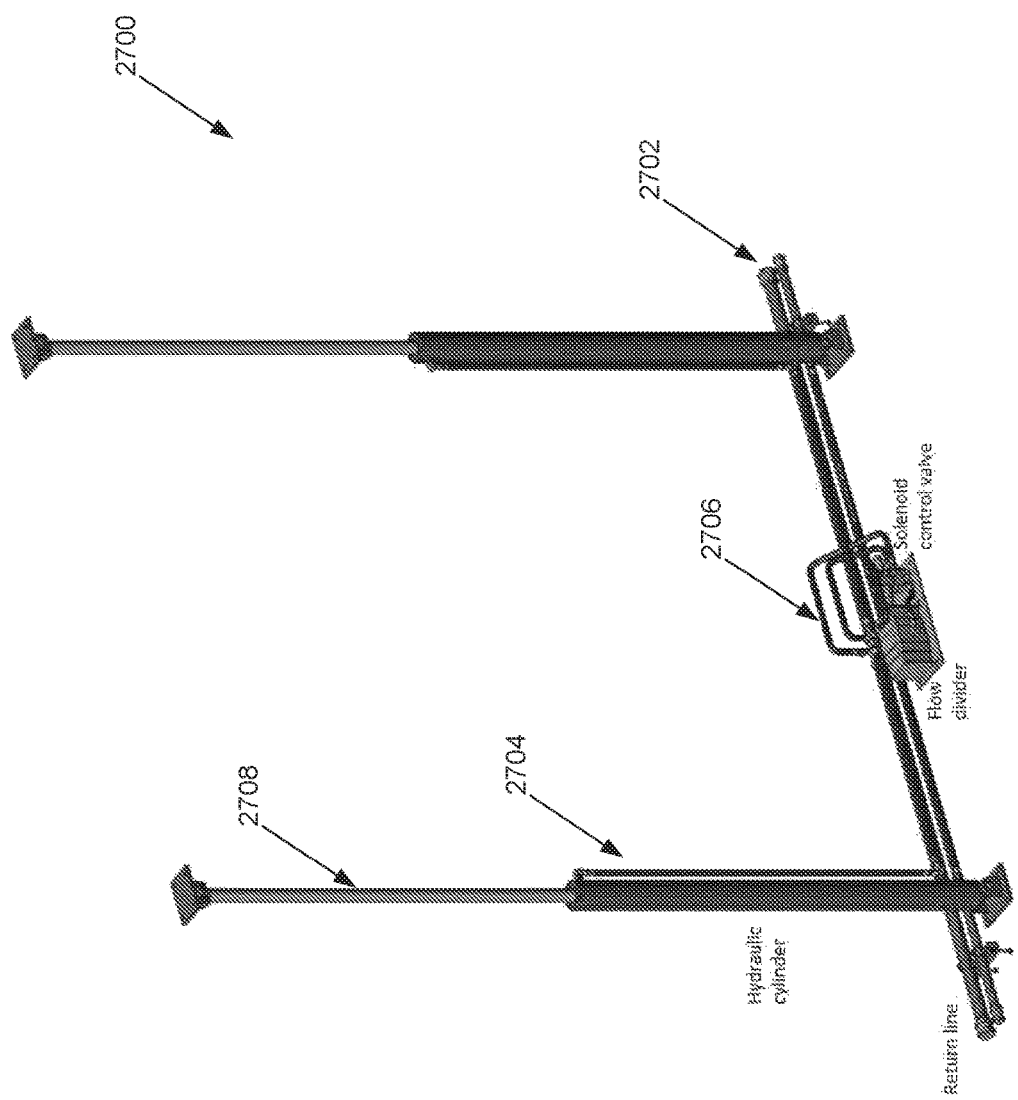
FIG. 27 illustrates a hydraulic system for a floodwall unit according to an embodiment of the present invention.

FIG. 27 illustrates a hydraulic system for the floodwall unit according to an embodiment of the present invention. The hydraulic system 2700 includes a controller, a pump unit, and fluid reservoir (not shown) in the housing unit 1508, a plurality of fluid lines 2702 and control valves 2706 sitting at the bottom of the foundation unit, and a plurality of hydraulic cylinders 2704 in a vertical position. When the pump unit is activated, the arms 2708 in the hydraulic cylinders 2704 are raised or lowered, which are used to raise or lower the floodwall panel. In a preferred embodiment, each floodwall unit has an independent and dedicated hydraulic system. In another embodiment, a plurality of floodwall units may share one hydraulic system.

Figure 27A:
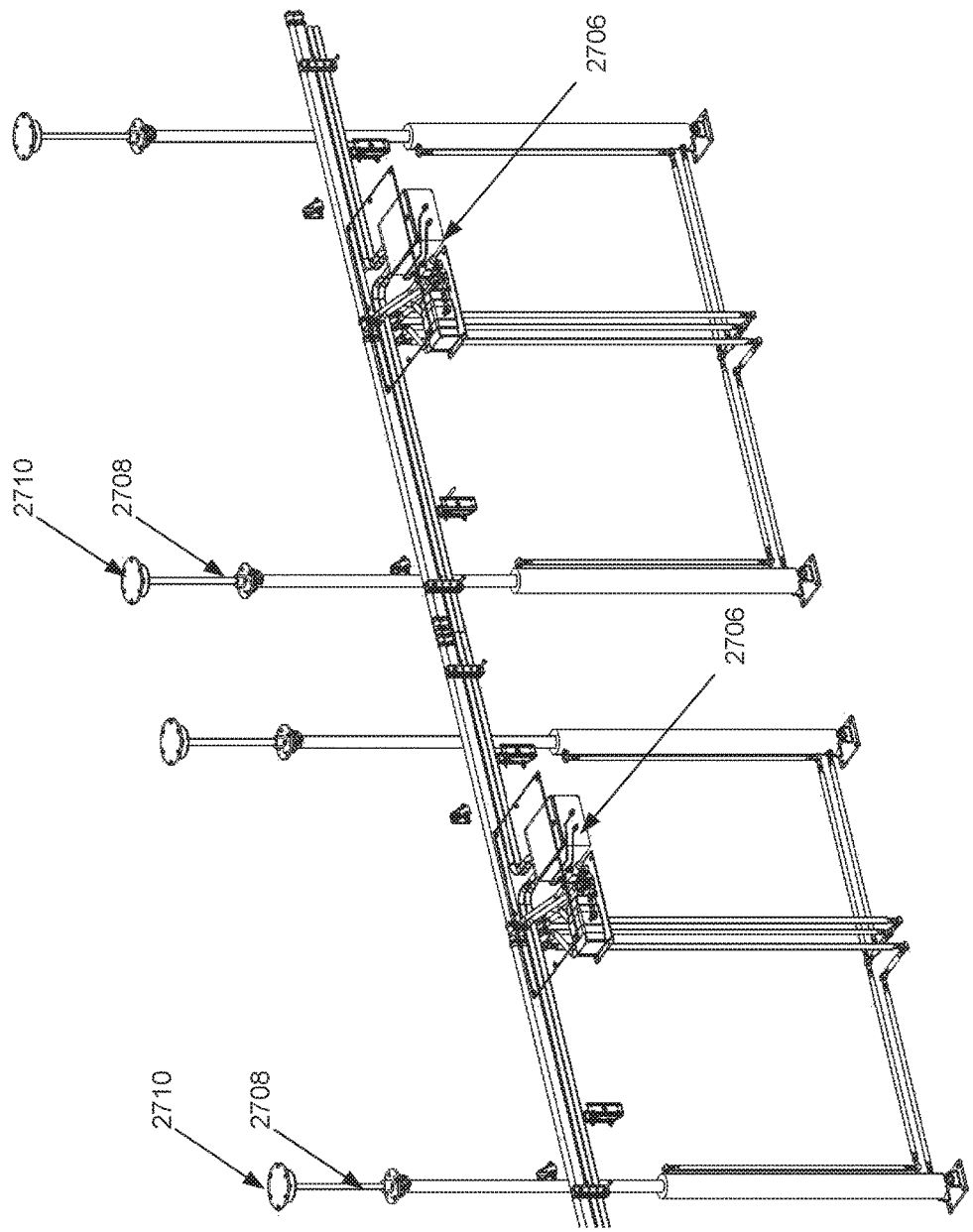
FIG. 27a illustrates a hydraulic system for a floodwall unit according to an embodiment of the present invention.

FIG. 27a illustrates another embodiment of the hydraulic system. According to this embodiment, the controller, the pump, the fluid reservoir, and the control valves 2706 are arranged in the housing unit 1508, which is accessible from the group, to ease the operation of these components. In addition, the arms 2708 of the hydraulic cylinders engage with the floodwall panels via a plurality of mechanical caps 2710. For example, the mechanical caps may be a plurality of bolts screwed into the steel inserts of the floodwall panel. The arms 2708 engage with the caps to raise and lower the floodwall panel. In one embodiment, the mechanical caps 2710 is configured to be removed from the steel inserts such that the arms 2708 are disengaged from the floodwall panel. In this way, the floodwall panel may be freely removed from the foundation unit.

Figure 28:
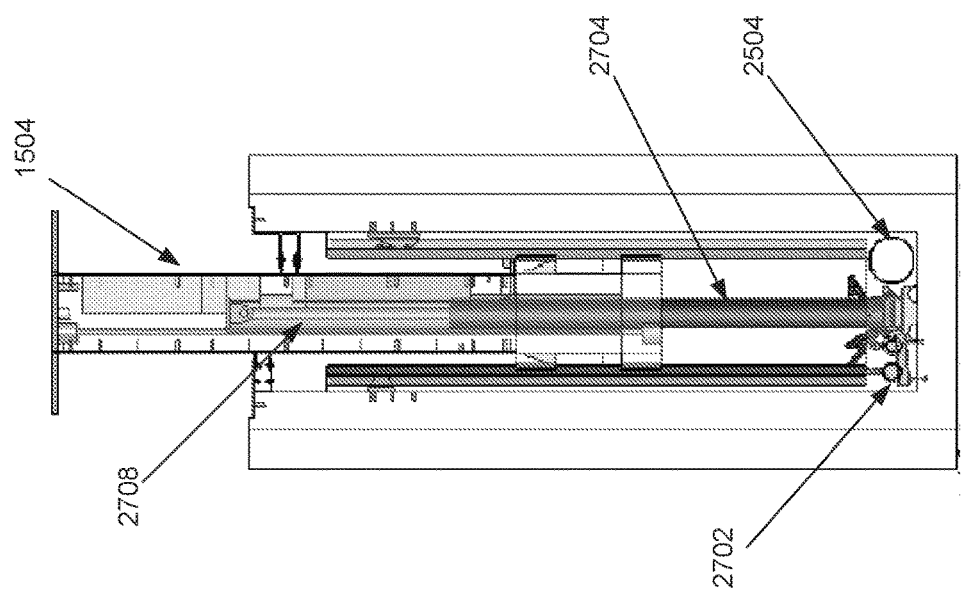
FIG. 28 illustrates an arrangement between the hydraulic system and the floodwall unit according to an embodiment of the present invention.

FIG. 28 illustrates an arrangement between the hydraulic system and the floodwall unit according to an embodiment of the present invention. The arms 2708 of the hydraulic cylinders 2704 are attached to the floodwall panel 1504. The floodwall panel 1504 is preferable to have a plurality of voids whose depth corresponds to the height of the hydraulic cylinders such that the hydraulic cylinders can be concealed inside the voids and do not substantially increase the size of the floodwall panel. As shown in FIG. 27b, the fluid lines 2702 and the sparger pipe 2504 are both sitting at the bottom of the foundation unit.

Figure 29:
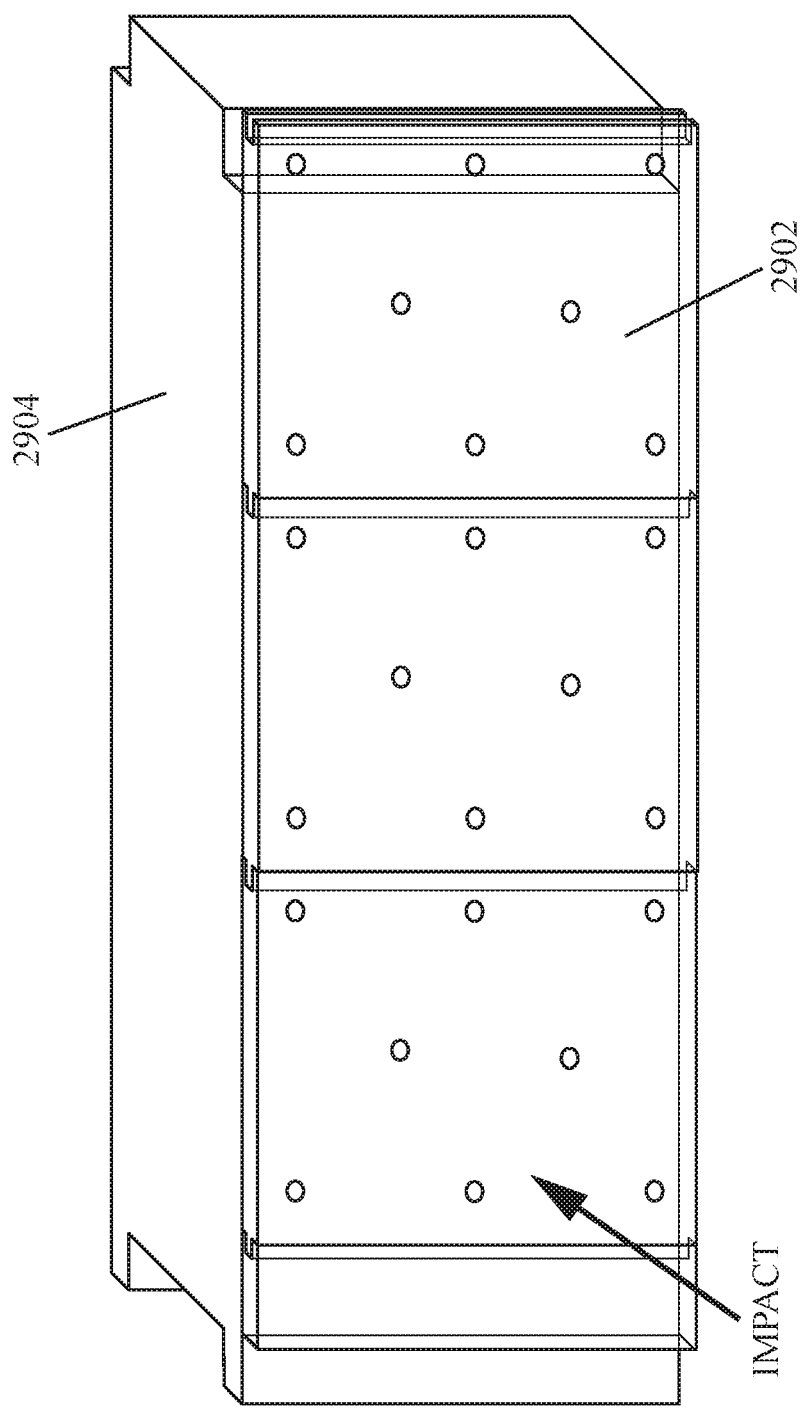
FIG. 29 illustrates a floodwall panel with protective panels against impact by the sea water according to an embodiment of the prevent invention.

FIG. 29 illustrates a floodwall unit with protection against sea water according to an embodiment of the prevent invention. When the floodwall units is mounted along the shorelines, they need to be protected against the impact and corrosion caused by the sea water. An embodiment of the present invention includes attaching a protective layer to the wet side of the floodwall unit to reduce the impact by the sea water. The protective layer 2902 may be attached to the wet side of the floodwall panel 2904 after it is raised. In another embodiment, the floodwall panel is treated with water repellent impregnant, such as PROTECTASILANE 100 (an octyltrithoxysilane based polymer). The water repellent impregnant is used to prevent water from penetrating the floodwall panel, thus slowing the corrosion process.

Figure 30:
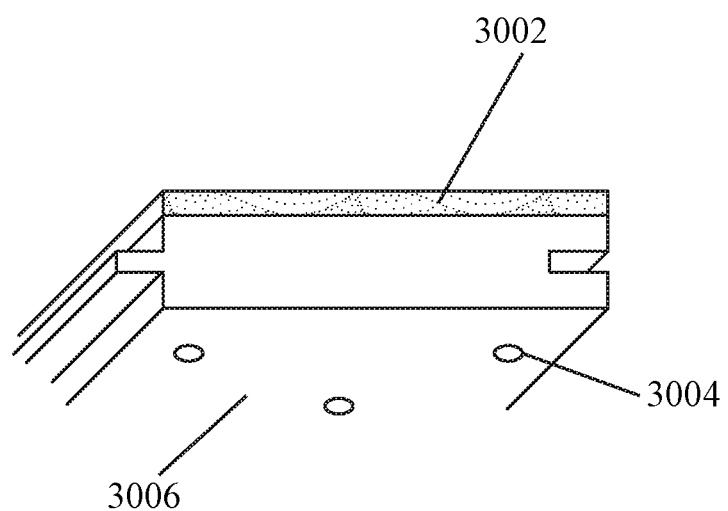
FIG. 30 illustrates a protective layer according to an embodiment of the present invention.

FIG. 30 illustrates a protective layer 2902 according to an embodiment of the present application. The protective layer 2902 may have a plurality of layers, including an impact resistant layer 3002 and an attachment layer 3004. The impact resistant layer 3002, such as a rubber layer, faces the sea water to absorb impact. The attachment layer 3004 has a plurality of attachment mechanisms to secure the proactive layer to the floodwall panel. In one embodiment, the attachment layer uses a plurality of openings that mate with inserts on the floodwall panel for the attachment.

Figures 31A, 31B:
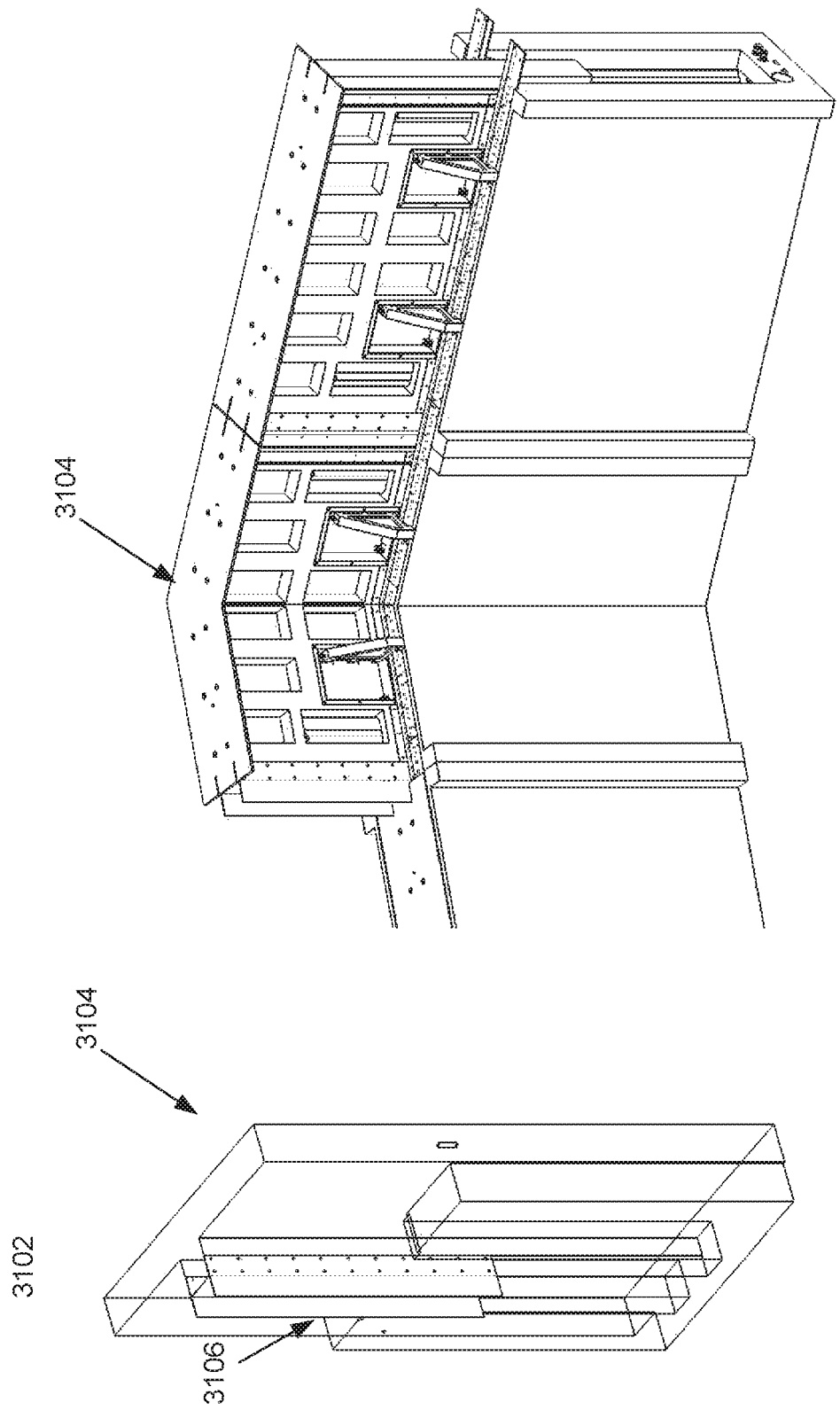
FIG. 31a illustrates an end unit of the floodwall system according to an embodiment of the present invention.
FIG. 31b illustrates a corner unit of the floodwall system according to an embodiment of the present invention.

FIG. 31*a* illustrates an end unit of the floodwall system according to an embodiment of the present invention. The floodwall system according to the present invention may be an independent structure or may be a structure attached to existing buildings or structures. The end unit 3102 as shown in FIG. 31*a* is configured to allow the floodwall system to be attached to an existing structure. The end unit 3102 has an attachment side 3104 that has an elastic surface to form a watertight contact with an existing structure. The other side 3106 of the end unit 3102 is configured to mate with the floodwall unit to form another watertight contact.

FIG. 31*b* illustrates a corner unit of the floodwall system according to an embodiment of the present invention. The corner unit 3108, which (the panel is not shown) is generally L-shaped, allows the floodwall unit establish a watertight perimeter for the protection of persons or property inside the perimeter.

Figure 32:
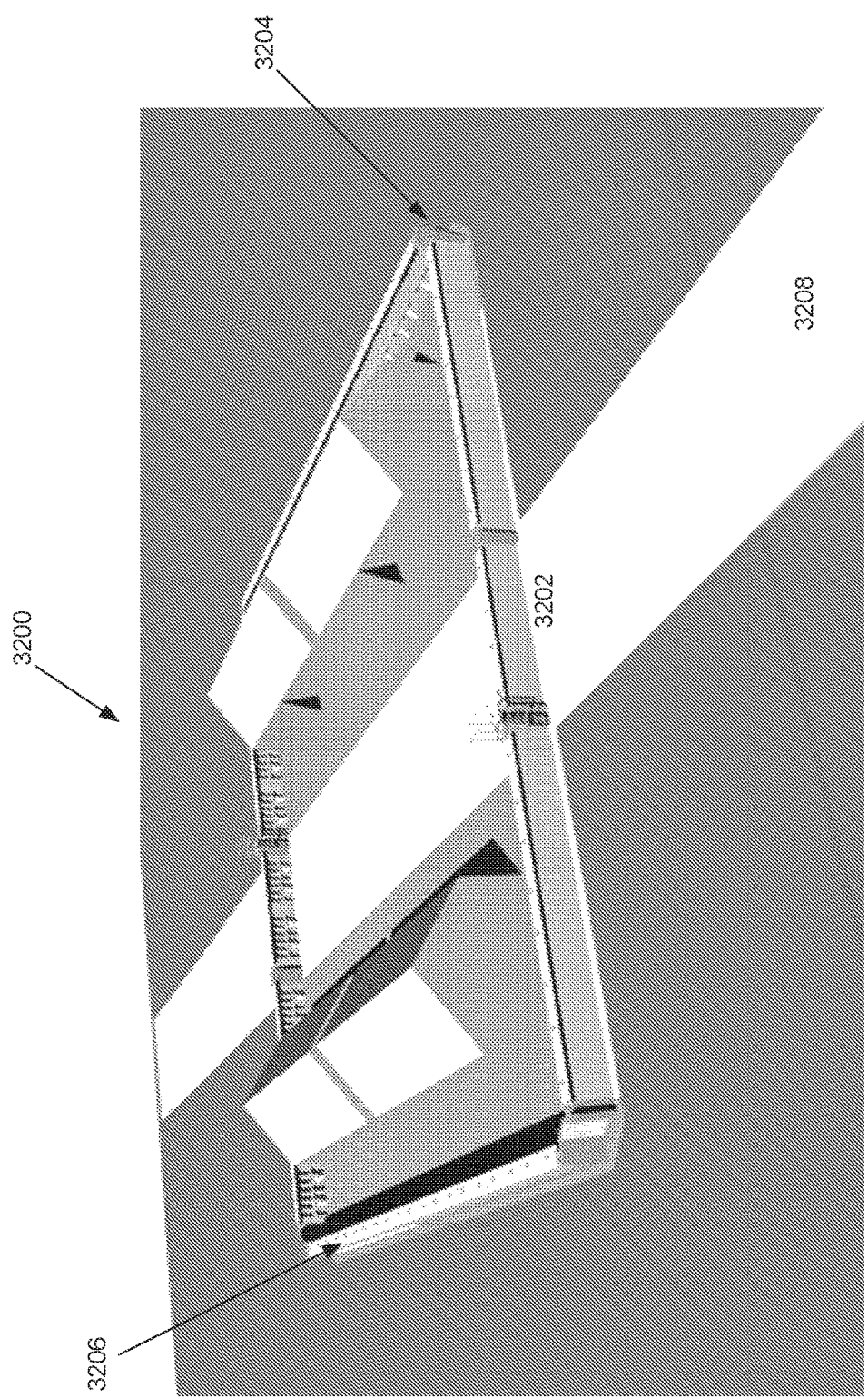
FIG. 32 illustrates a flood shelter according to an embodiment of the present invention.

FIG. 32 illustrates a flood shelter according to an embodiment of the present invention. A flood shelter 3200 may be needed to save human lives when a large scale of flooding occurs. The flood shelter 3200 may be understood as a structure or a perimeter that is independent from existing structures and is capable of establishing a flood free zone. The flood shelter 3200 is preferably easy to be accessed, such as build around a manor road artery such that in case of flood, people can reach the shelter quickly. The flood shelter 3200 is also preferable to provide utility services, such as water, electricity, gas, and sewer, so that people could stay in the shelter for days or weeks until the flood retreats. The present invention can satisfy such a need by establishing a water tight perimeter by using the straight floodwall units 3206, the entrance units 3202, and the corner units 3204. The entrance units 3202 may be built across the road 3208 for easy access. As discussed before, the perimeter allows utilities to be provided in the flood shelter. Furthermore, the reliability of such a flood shelter can by easily and economically test because the winch system is used for the operation.

According to an embodiment of the invention, a controller is used to control the floodwall system via wired or wireless communication system. The controller may be a control panel, a computer, a laptop, or a smartphone. The floodwall panels may be raised all together to rapidly deploy the system or may be raised one-by-one to reduce the demand of electric power required for lifting the panels. The controller may be configured to control the height of the floodwall system and control the operation of the valves, sump pumps, and fill pumps. When the floodwall system is operated in a manual mode, the controller may be configured to monitor the wall positions and valve positions.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A retractable floodwall unit comprising:
a foundation unit having a plurality of guide tracks along side walls of the foundation unit;
a floodwall panel stowed in the foundation unit; and
a power system having a winch system for raising and lowering the floodwall panel,
wherein the foundation unit includes a first housing unit enclosing the winch system of the power system, and
wherein the floodwall panel includes a plurality of guides that mate with the guide tracks of the foundation unit, the plurality of guides and the plurality of guide tracks being configured to keep the floodwall panel in an upright position when the floodwall panel is being raised or lowered,
wherein the retractable floodwall unit further comprises a plurality of support legs locked in a second housing unit of the floodwall panel, the plurality of support legs being spring loaded and having a latch bar configured to unlock the support legs, the plurality of support legs engaging with a surface of the foundation unit for supporting the retractable floodwall unit, and
wherein the side walls of the foundation unit include a plurality of first projections that engage with and trigger the latch bar to unlock the support legs when the floodwall panel is being raised,
wherein the winch system includes a winch connected with a plurality of cable terminations that are attached to the side walls of the foundation unit, and the winch system further includes a sheave attached to the bottom of the floodwall panel.

2. The retractable floodwall unit according to claim 1, wherein the foundation unit is formed by pre-cast concrete.

3. The retractable floodwall unit according to claim 2, wherein the foundation unit is supported by sheet piles.

4. The retractable floodwall unit according to claim 1, wherein the first housing unit includes a frame that secures the winch.

5. The retractable floodwall unit according to claim 1, wherein the plurality of the first projections are arranged at an upper portion of the side walls.

6. The retractable floodwall unit according to claim 5, wherein the side walls of the foundation unit further include a plurality of second projections that trigger the latch bar to relock the support legs.

7. The retractable floodwall unit according to claim 6, wherein the plurality of the second projections are arranged at a lower portion of the side walls.

8. The retractable floodwall unit according to claim 1, wherein the power system includes a single-purchase winch system.

9. The retractable floodwall unit according to claim 1, wherein the power system comprises a hydraulic system having a pump stored in the first housing unit, and wherein the hydraulic system further includes a plurality of hydraulic cylinders concealed in the floodwall panel.

10. The retractable floodwall unit according to claim 1 further comprising:
a plumbing system configured to remove water from the foundation unit to a wet side of the floodwall unit.

11. The retractable floodwall unit according to claim 10, wherein the plumbing system further includes a one-way check valve at an outlet of the wet side to prevent water from entering the plumbing system.

12. The retractable floodwall unit according to claim 11, wherein the plumbing system further includes an inlet at a dry side of the floodwall unit to let water in the dry side to enter the foundation unit.

13. The retractable floodwall unit according to claim 12, wherein the plumbing system is configured to back flash the foundation unit to remove silt or deposit from the foundation unit.

14. The retractable floodwall unit according to claim 13, wherein the plumbing system includes a sparger pipe arranged at the bottom of the foundation unit.

15. The retractable floodwall unit according to claim 1, wherein the retractable floodwall unit is concealed underground.

16. The retractable floodwall unit according to claim 1 further comprising:
a water repellent impregnant in the floodwall panel for slowing corrosion.

17. The retractable floodwall unit according to claim 16 further comprising:
an impact resistant layer at the wet side of the floodwall panel to absorb impact from sea water.

18. The retractable floodwall unit according to claim 1, wherein the power system is configured to be remotely controlled.

19. The retractable floodwall unit according to claim 1 further comprising a plurality of vertical seals along a side of the floodwall panel to prevent water leakage through gaps between adjacent floodwall panels.

20. The retractable floodwall unit according to claim 19, further comprising a plurality of horizontal seals along a horizontal direction of the floodwall panel to prevent water leakage through gaps between the floodwall panel and the foundation unit.

21. The retractable floodwall unit according to claim 20, wherein both the vertical seals and the horizontal seals of the floodwall unit are planar-shaped to ease fabrication and installation of these seals.

22. An entrance unit comprising the floodwall unit according to claim 1.

23. A flood shelter for establishing a flood-free area, comprising a plurality of floodwall units according to claim 1.

24. The flood shelter according to claim 23, further comprising:
underground posts that allow utility lines to enter the flood-free area.

25. The flood shelter according to claim 24, further comprising:
a hinged panel on top of the underground posts to form a watertight contact with adjacent floodwall units.

26. The flood shelter according to claim 23, further comprising:
an entrance unit across a road that and being formed by the plurality of the floodwall units according to claim 1.

27. The flood shelter according to claim 23, further comprising:
a corner unit having similar configurations with the floodwall unit according to claim 1.

28. The flood shelter according to claim 23, further comprising:
an end unit configured to form a watertight contact between the floodwall unit and an existing structure.

29. A retractable floodwall system comprising:
a foundation that supports the retractable floodwall system;
a power system arranged in the foundation for moving the retractable floodwall system, the power system including a winch system;
a floodwall section having a straight floodwall units, a corner unit, an entrance unit, and a hinged panel adjacent to the entrance unit; and
an underground post underneath the hinged panel that has a plurality of utility openings,
wherein each of the straight floodwall unit, the corner unit, and the entrance unit has a retractable floodwall panel, which, in a stowed position, is substantially underground, and
wherein the retractable floodwall panel includes a plurality of support legs being capable of engaging with a surface of the foundation and supporting the retractable floodwall panel in a raised position, a plurality of guides and a plurality of guide tracks being configured to keep the retractable floodwall panel in an upright position when the floodwall panel is being raised or lowered,
wherein the plurality of support legs are locked in a housing unit of the retractable floodwall panel, the plurality of support legs being spring loaded and having a latch bar configured to unlock the support legs, and
wherein the side walls of the foundation include a plurality of first projections that engage with and trigger the latch bar to unlock the support legs when the retractable floodwall panel is being raised,
wherein the winch system includes a winch connected with a plurality of cable terminations that are attached to the side walls of the foundation, and the winch system further includes a sheave attached to a bottom of the floodwall panel.

30. The retractable floodwall system according to claim 29,
wherein the power system is remotely controlled to raise or lower the retractable floodwall panel.

31. The retractable floodwall system according to claim 30,
wherein the retractable floodwall panels of the straight floodwall units, the corner unit, and the entrance unit are moved simultaneously.

32. The retractable floodwall system according to claim 30, wherein the retractable floodwall panels of the straight floodwall units, the corner unit, and the entrance unit are moved sequentially.

33. The retractable floodwall system according to claim 29, further comprising:

an engagement unit configured to engage with an external power system that is external to the retractable floodwall system, the engagement unit being connected with the floodwall panel with a pulley system to use the external power system to move the retractable floodwall panel.

34. The retractable floodwall system according to claim 29, wherein the retractable floodwall panel is capable of being manually raised or lowered, and wherein the power system is capable of being deactivated to allow a manual operation of the retractable floodwall panel.

* * * * *